United States Patent
Suzuki et al.

(10) Patent No.: US 11,207,968 B2
(45) Date of Patent: Dec. 28, 2021

(54) HYBRID VEHICLE CRUISE CONTROL DEVICE

(71) Applicant: HITACHI AUTOMOTIVE SYSTEMS, LTD., Hitachinaka (JP)

(72) Inventors: Kohei Suzuki, Tokyo (JP); Toshio Hori, Tokyo (JP); Yoshiaki Nagasawa, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 286 days.

(21) Appl. No.: 16/468,540

(22) PCT Filed: Jan. 29, 2018

(86) PCT No.: PCT/JP2018/002631
§ 371 (c)(1),
(2) Date: Jun. 11, 2019

(87) PCT Pub. No.: WO2018/155082
PCT Pub. Date: Aug. 30, 2018

(65) Prior Publication Data
US 2020/0086749 A1 Mar. 19, 2020

(30) Foreign Application Priority Data
Feb. 22, 2017 (JP) .............................. JP2017-030617

(51) Int. Cl.
*B60K 6/485* (2007.10)
*B60L 15/20* (2006.01)
(Continued)

(52) U.S. Cl.
CPC .............. *B60K 6/485* (2013.01); *B60L 15/20* (2013.01); *B60K 6/547* (2013.01); *F02D 29/06* (2013.01)

(58) Field of Classification Search
None
See application file for complete search history.

(56) References Cited

U.S. PATENT DOCUMENTS 9,126,596 B2 * 9/2015 Ando ................... F02N 11/0818
9,630,509 B2 * 4/2017 Cho ..................... B60L 15/2009
(Continued)

FOREIGN PATENT DOCUMENTS

JP 2009-166611 A 7/2009
JP 2013-086725 A 5/2013
(Continued)

OTHER PUBLICATIONS

International Search Report with English translation and Written Opinion issued in corresponding application No. PCT/JP2018/002631 dated Jun. 5, 2018.

*Primary Examiner* — Todd Melton
(74) *Attorney, Agent, or Firm* — Foley & Lardner LLP

(57) ABSTRACT

In a constant-speed traveling mode or a follow-up traveling mode, reduction of fuel consumption and improvement of drivability are both achieved.

An ECU 110 has an ISG connected to an engine and a battery connected to the ISG. The ECU 110 has an ISG control unit 606 that performs control for supplying power to the ISG from the battery to rotationally drive the ISG, or to drive the ISG to generate power for charging the battery. In one cycle of a traveling mode until completion of deceleration traveling after acceleration traveling is started so as to achieve a target vehicle speed, the ISG control unit 606 drives the ISG such that a remaining charge amount of the battery falls within a set range at completion of the deceleration traveling, and a traveling acceleration/deceleration falls within a predetermined requested acceleration/deceleration.

15 Claims, 39 Drawing Sheets

(51) Int. Cl.
*B60K 6/547* (2007.10)
*F02D 29/06* (2006.01)

(56) References Cited

U.S. PATENT DOCUMENTS

| | | | |
|---|---|---|---|
| 9,925,981 B2 * | 3/2018 | Asakura | B60W 30/16 |
| 10,464,548 B2 * | 11/2019 | Eo | B60W 30/143 |
| 2014/0214254 A1 | 7/2014 | Amano | |

FOREIGN PATENT DOCUMENTS

| | | |
|---|---|---|
| JP | 2013-099994 A | 5/2013 |
| JP | 2014-019323 A | 2/2014 |
| JP | 2014-151797 A | 8/2014 |
| JP | 2016-130105 A | 7/2016 |
| WO | WO2013/04631 | 4/2013 |
| WO | WO2015/159724 A1 | 10/2015 |

\* cited by examiner

FIG. 3
(A)
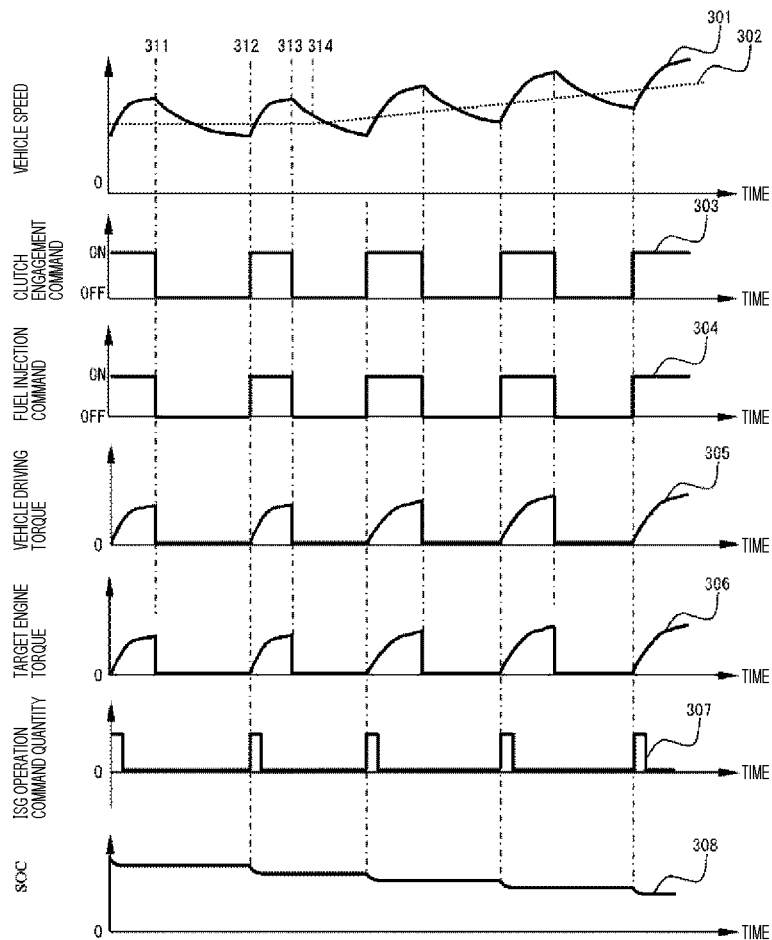
(B)
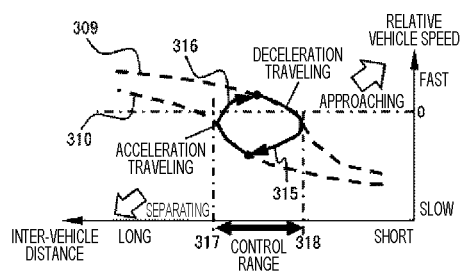

FIG. 4
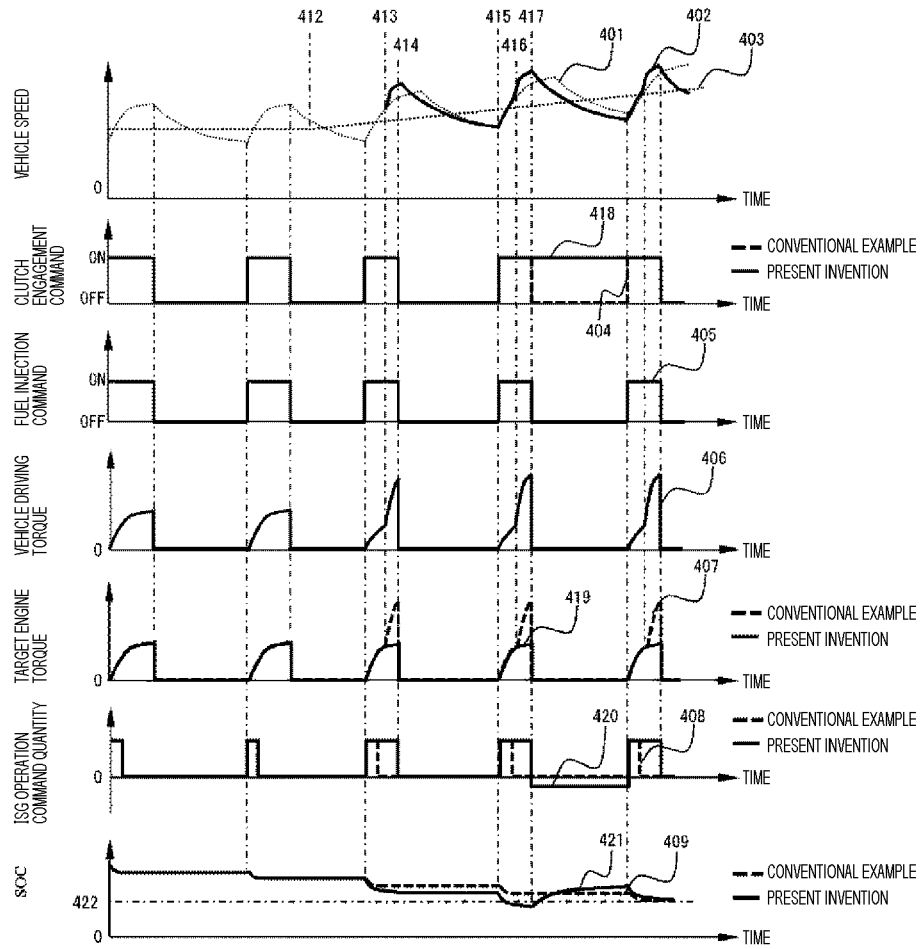
(A)
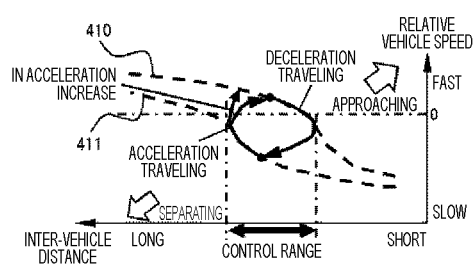
(B)

FIG. 5
(A)
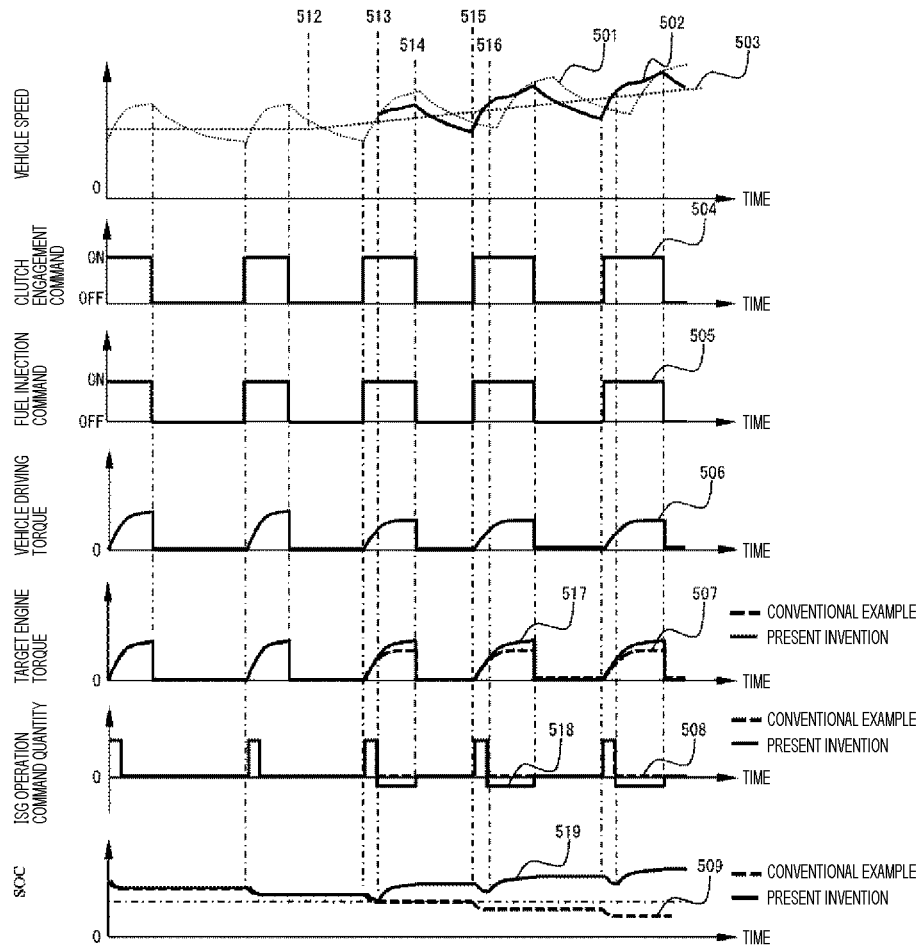
(B)
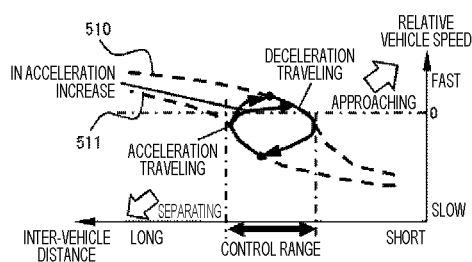

FIG. 12
(A)
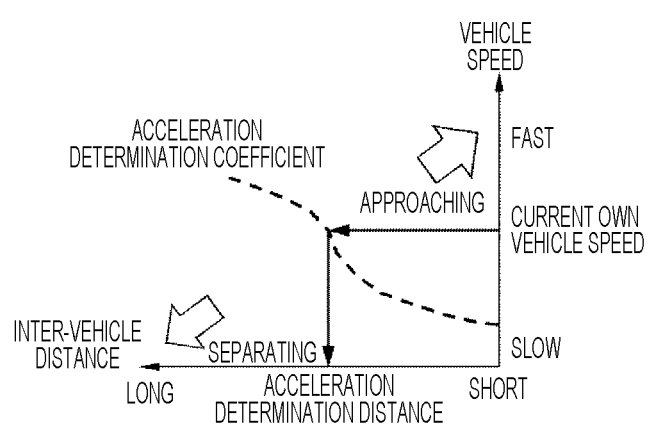
(B)
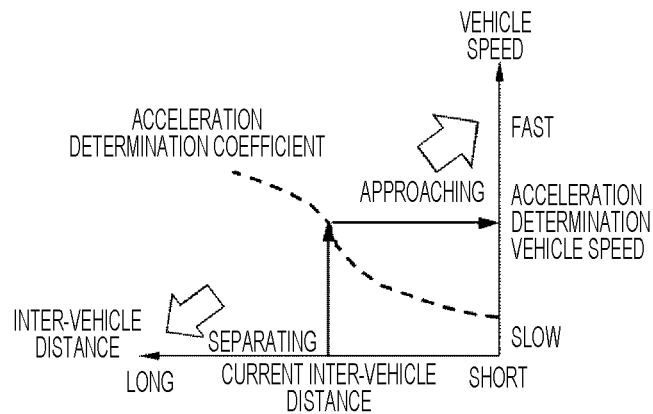

FIG. 22
(A) IN CASE OF REQUEST MODE1
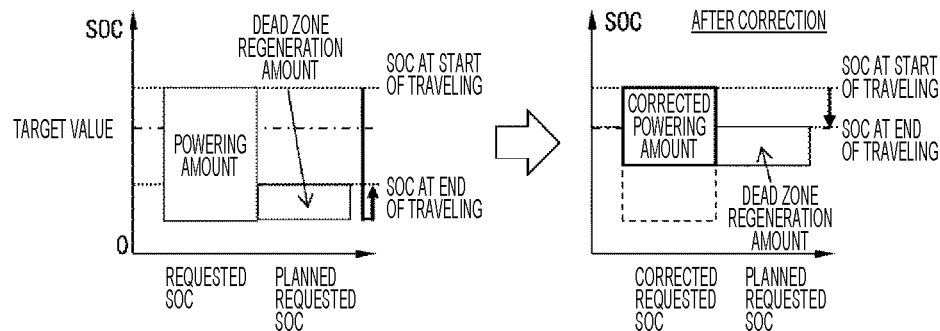
(B) IN CASE OF REQUEST MODE2
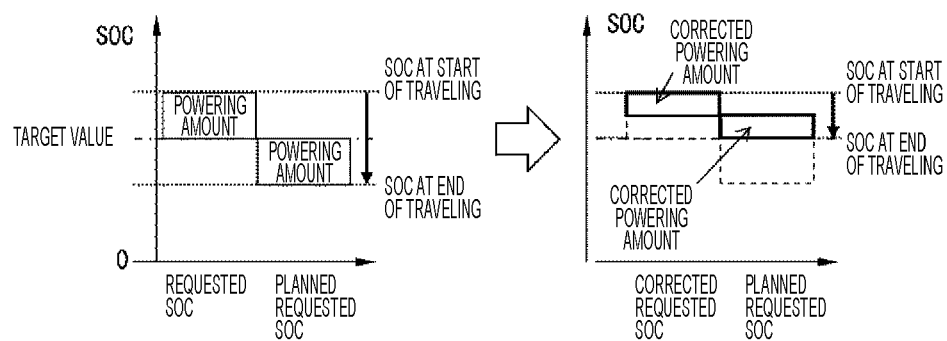
(C) IN CASE OF FORCED REGENERATION EXECUTION CONDITION
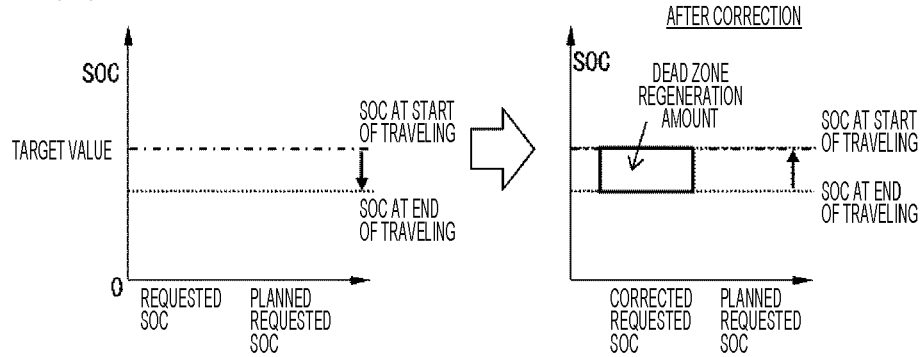

FIG. 29

| REQUEST MODE | FOLLOW-UP TRAVELING CONTROL REGION 3 | | FOLLOW-UP TRAVELING CONTROL REGION 1 | | ISG CONTROL CONTENTS | |
|---|---|---|---|---|---|---|
| | CURRENT TRAVELING MODE | NEXT TRAVELING MODE | CURRENT TRAVELING MODE | NEXT TRAVELING MODE | CURRENT TRAVELING MODE | NEXT TRAVELING MODE |
| | ACCELERATION | DECELERATION | DECELERATION | ACCELERATION | | |
| 1 | ACCELERATION INCREASE | — | DECELERATION DECREASE | — | POWERING | DEAD ZONE REGENERATION |
| 2 | | DECELERATION DECREASE | | ACCELERATION INCREASE | | POWERING |
| 3 | | DECELERATION INCREASE | | ACCELERATION DECREASE | | REGENERATION |
| 4 | ACCELERATION DECREASE | — | DECELERATION INCREASE | — | REGENERATION | — |
| 5 | | DECELERATION DECREASE | | ACCELERATION INCREASE | | POWERING |
| 6 | | DECELERATION INCREASE | | ACCELERATION DECREASE | | REGENERATION |
| 7 | — | — | — | — | — | — |
| 8 | | DECELERATION DECREASE | | ACCELERATION INCREASE | DEAD ZONE REGENERATION | POWERING |
| 9 | | DECELERATION INCREASE | | ACCELERATION DECREASE | — | REGENERATION |

FIG. 34
(A)
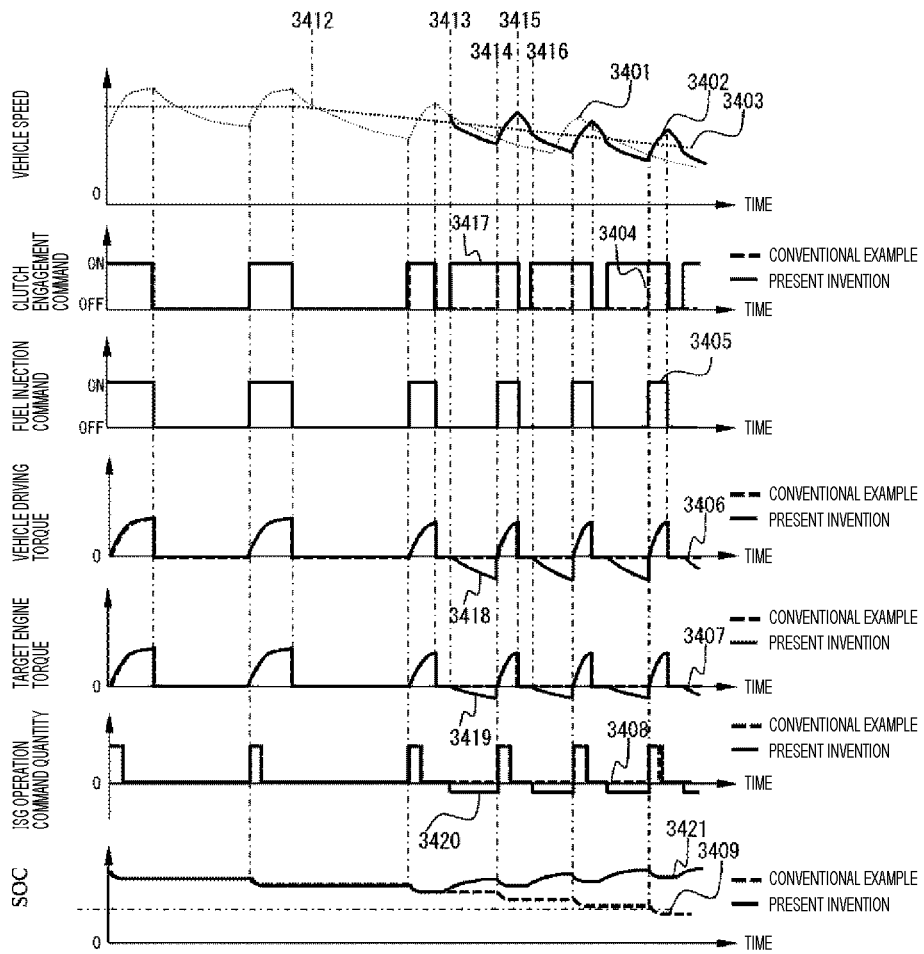
(B)
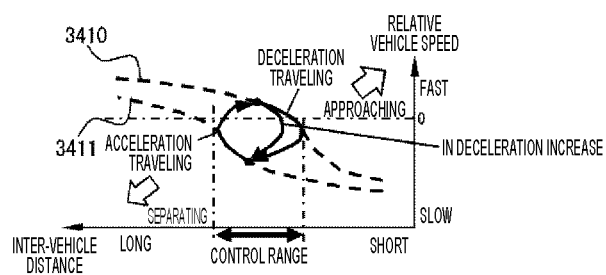

FIG. 35
(A)
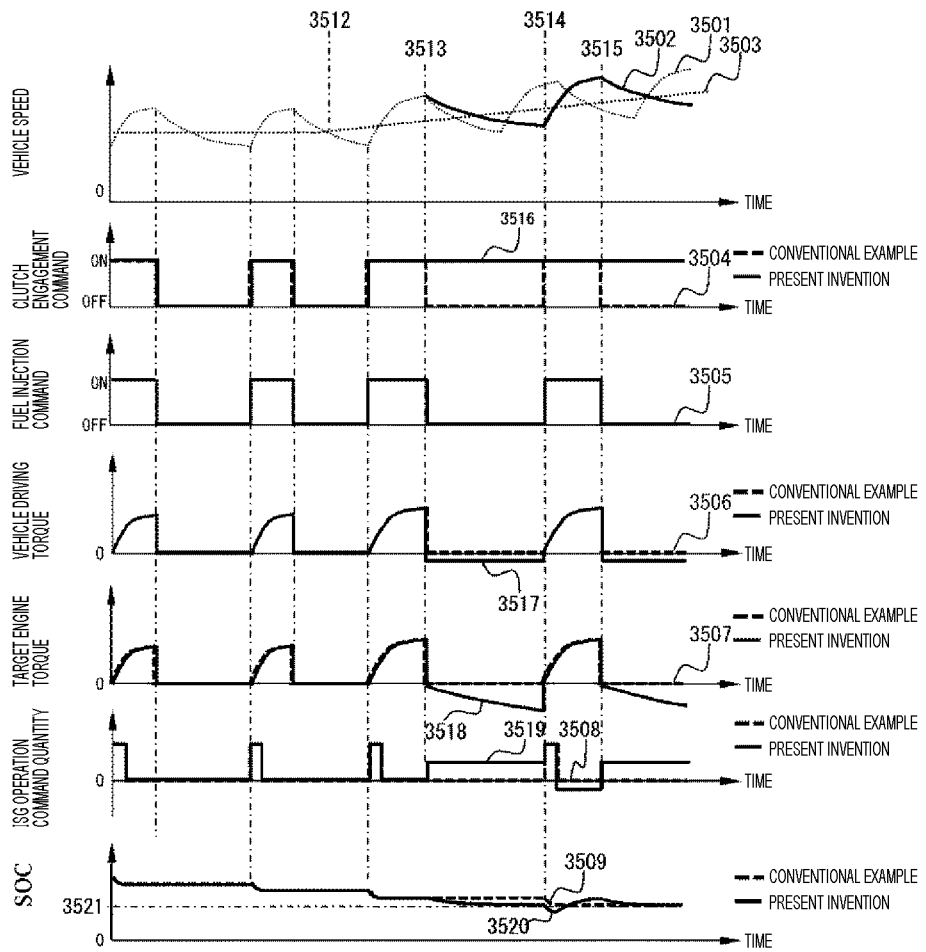
(B)
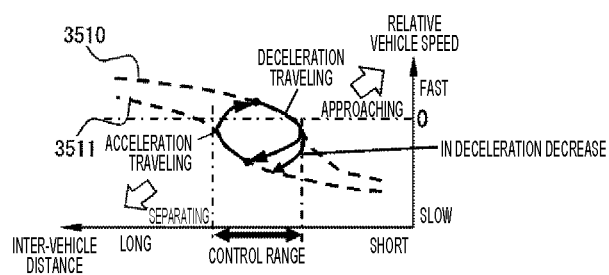

FIG. 36
(A)
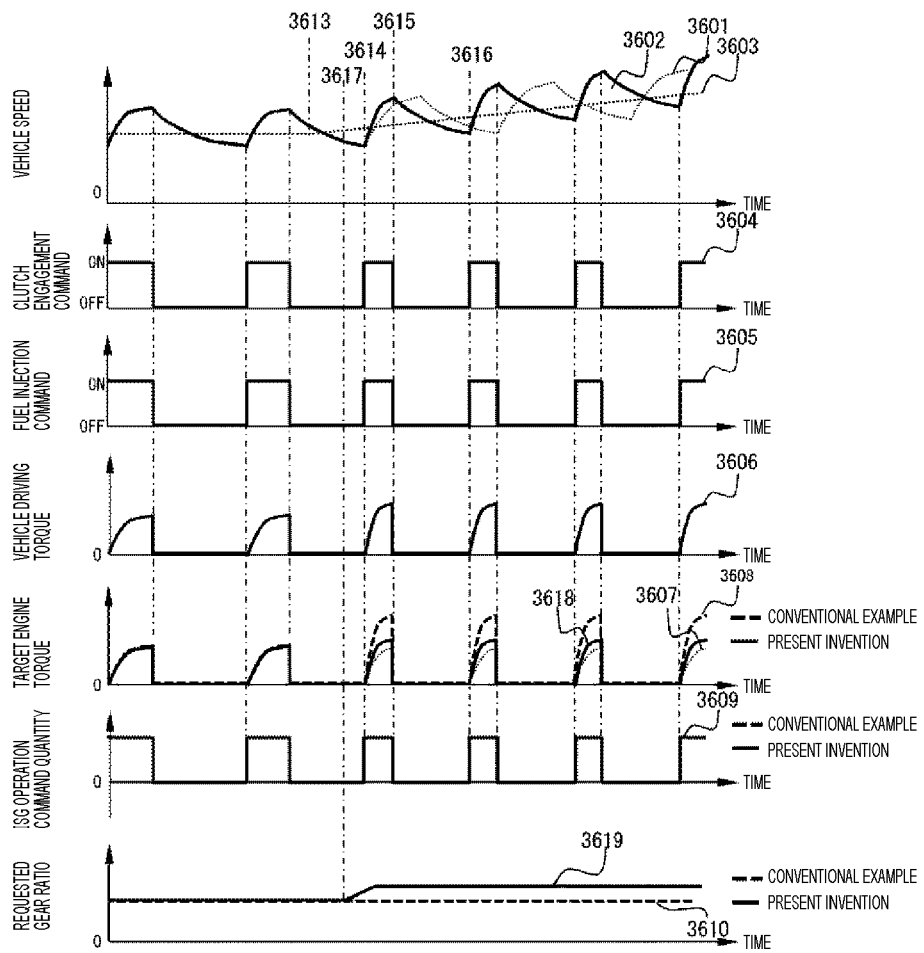
(B)
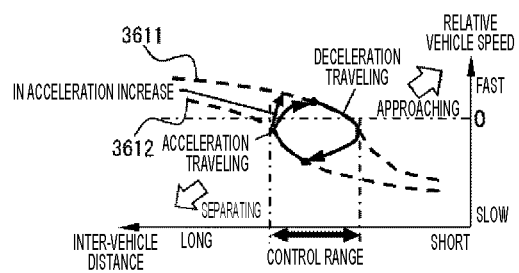

FIG. 37
(A)
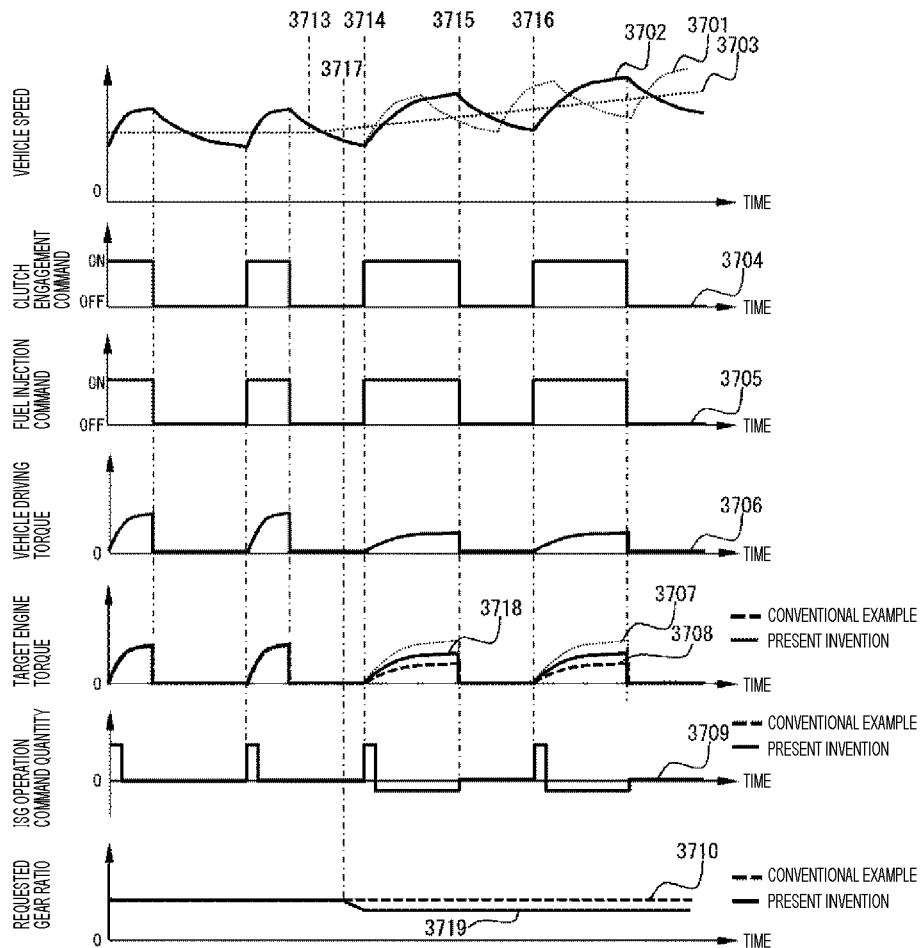
(B)
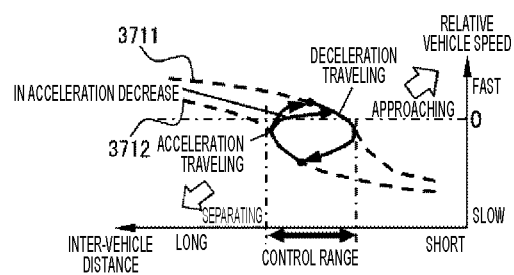

FIG. 38
(A)
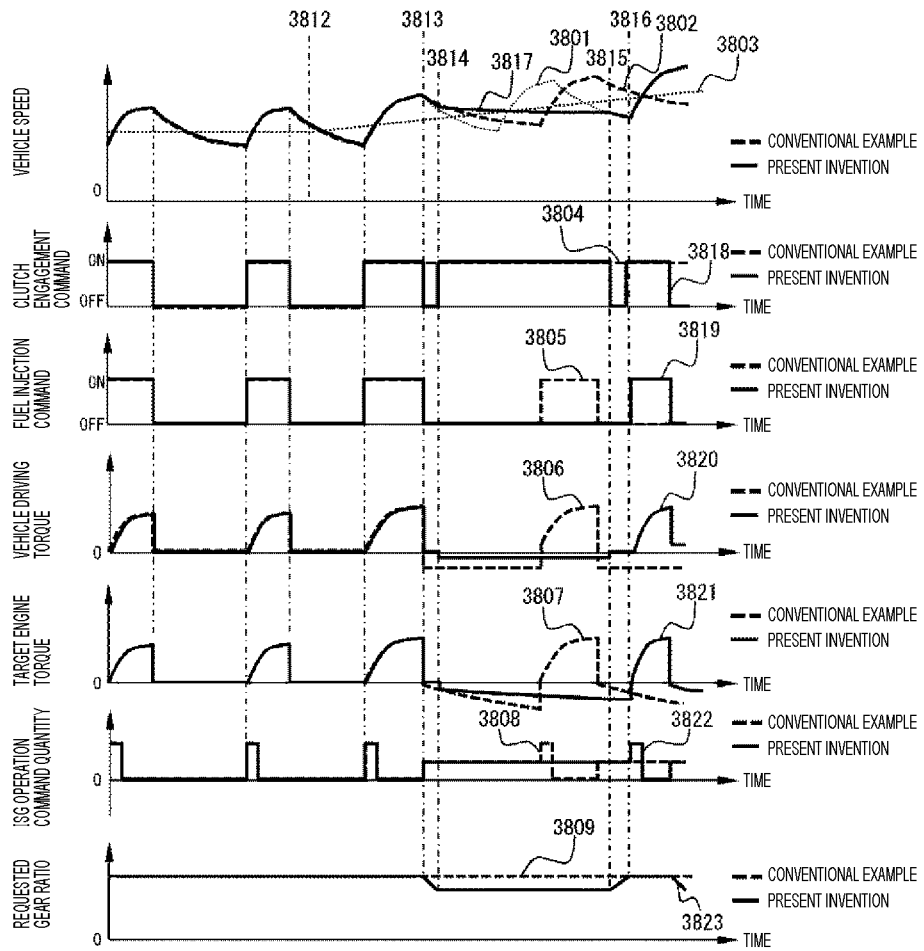
(B)
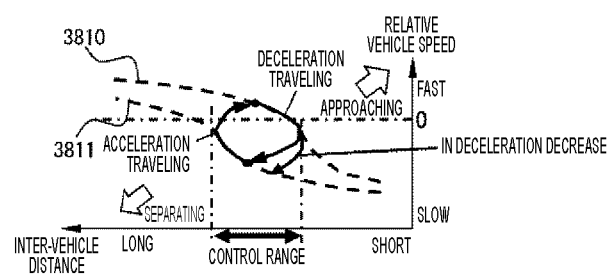

HYBRID VEHICLE CRUISE CONTROL DEVICE

TECHNICAL FIELD

The present invention relates to a vehicle control device.

BACKGROUND ART

Conventionally, as an additional function of an automobile, an automatic cruise control function (traveling control) has been put into practical use, which causes constant speed traveling of a vehicle at a set speed without continuous depression of an accelerator pedal by a driver. Furthermore, in an adaptive traveling control (ACC) in which control of an inter-vehicle distance is added to the automatic cruise function, it is possible to realize a mode of follow-up traveling to a preceding vehicle. In recent years, using this ACC, the practical use of preventive safety technology is advancing, which attempts reduction of damage by automatically braking when a forward collision is inevitable.

PTL 1 describes a technique for alternately and repeatedly performing, on a vehicle driven by an engine, acceleration traveling to accelerate to an upper-limit vehicle velocity by an engine after reaching a lower-limit vehicle velocity, and a coast traveling to cause the vehicle to travel with inertia to the lower limit vehicle velocity with the engine held stopped after reaching the upper limit vehicle velocity (acceleration/deceleration traveling). According to the technique, when reaching an intermediate vehicle velocity between the lower limit vehicle velocity and the upper limit vehicle velocity, switching is performed between motor assist control and power generation control of a motor generator such as an integrated starter generator (ISG).

PTL 2 describes a technique for generating an ISG assist torque on the basis of a driver requested torque. In this technique, it is determined whether or not the ISG can operate on the basis of a state of charge of a battery.

CITATION LIST

Patent Literature

PTL 1: JP 2014-019323 A
PTL 2: WO2015/159724

SUMMARY OF INVENTION

Technical Problem

In the constant-speed traveling mode described above, a target value of control is a set vehicle velocity of an own vehicle, and acceleration and deceleration are performed such that the target vehicle velocity is maintained. On the other hand, in the follow-up traveling mode described above, an inter-vehicle distance between with the preceding vehicle is controlled so as to be maintained at a preset distance. Therefore, in the follow-up traveling mode, a target value for control is a relative speed 0 of the own vehicle with respect to the preceding vehicle, and acceleration and deceleration are performed for this purpose. At this time, by causing the vehicle to travel with an engine torque at which fuel consumption is optimal during acceleration traveling, and stopping the engine during deceleration traveling to cause coasting of the vehicle, fuel consumption during acceleration/deceleration traveling is improved.

However, in a case where there is a difference between the acceleration/deceleration velocity during acceleration/deceleration traveling and the acceleration/deceleration velocity requested from the driver or external information, increasing and decreasing of the engine torque to achieve the requested acceleration/deceleration lead to deterioration of the fuel consumption.

An object of the present invention has been made in view of such problems, and is to provide a vehicle control device capable of achieving a requested acceleration/deceleration and suppressing deterioration of fuel consumption when an increase or a decrease occurs from a driver or external information for a set acceleration/deceleration in a traveling mode, in a constant-speed traveling mode or a follow-up traveling mode to a preceding vehicle.

Solution to Problem

In order to solve the above-mentioned problem, a vehicle control device of the present invention includes a motor generator connected to an engine, and a battery connected to the motor generator, and includes a motor generator control unit that performs control for rotationally driving the motor generator by supplying power from the battery to the motor generator, or for driving the motor generator to generate power in order to charge the battery. In one cycle of a traveling mode until completion of deceleration traveling after acceleration traveling is started so as to achieve a target vehicle speed, the motor generator control unit drives the motor generator such that a remaining charge amount of the battery falls within a set range at completion of the deceleration traveling, and a traveling acceleration/deceleration in the one cycle falls within a predetermined requested acceleration/deceleration.

In a case where an increase or a decrease occurs for the set acceleration/deceleration in the traveling mode as the requested acceleration/deceleration from the driver or external information during the constant-speed traveling mode or the follow-up traveling mode to a preceding vehicle, the requested acceleration/deceleration is achieved by driving an ISG without increasing or decreasing an engine torque. Therefore, since the requested acceleration/deceleration can be achieved without deterioration of fuel economy, it is possible to achieve both reduction of fuel consumption and improvement of drivability.

BRIEF DESCRIPTION OF DRAWINGS

FIG. 3 is an example of a traveling behavior of the vehicle 100 in a case where a preceding vehicle accelerates in a follow-up traveling mode.

FIG. 4 is an example of a traveling behavior in a case where acceleration of the vehicle 100 increases in the follow-up traveling mode.

FIG. 5 is an example of a traveling behavior in a case where acceleration of the vehicle 100 decreases in the follow-up traveling mode.

FIG. 12 is a view illustrating a processing image in step S1103.

FIG. 22 is a view illustrating processing images of steps S2101 to S2110.

FIG. 29 is a table showing request modes calculated by the request mode calculation unit 604.

FIG. 34 is an example of a traveling behavior in a case where deceleration of the vehicle 100 increases in the follow-up traveling mode.

FIG. 35 is an example of a traveling behavior in a case where deceleration of the vehicle 100 decreases in the follow-up traveling mode.

FIG. 36 is an example of a traveling behavior in a case where acceleration of the vehicle 100 increases in the follow-up traveling mode.

FIG. 37 is an example of a traveling behavior in a case where acceleration of the vehicle 100 decreases in the follow-up traveling mode.

FIG. 38 is an example of a traveling behavior in a case where deceleration of the vehicle 100 decreases in the follow-up traveling mode.

DESCRIPTION OF EMBODIMENTS

First Embodiment

Figure 1:
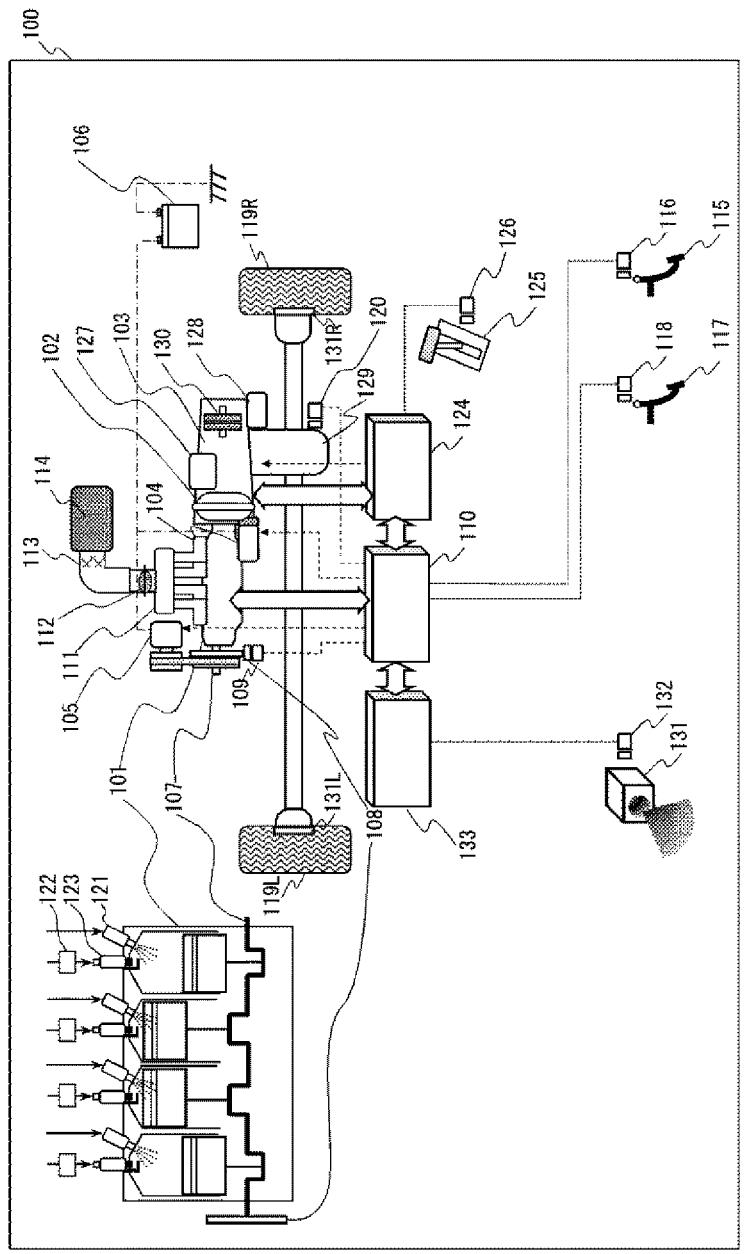
FIG. 1 is an overall configuration view of a vehicle 100 equipped with a vehicle control device according to a first embodiment.

FIG. 1 is an overall configuration view of a vehicle 100 equipped with a vehicle control device according to a first embodiment of the present invention. The vehicle control device in the first embodiment is constituted of a combination of three control units to be described later, but all or a part of them may be integrally formed.

In FIG. 1, the vehicle 100 has an engine 101 (simply referred to as an internal combustion engine or an engine) as a driving power source. A torque converter 102 is provided on an output side of the engine 101. A transmission 103 is connected to an output side of the torque converter 102. A type of the engine 101 may be any driving power source that causes the vehicle 100 to travel. For example, a port injection or cylinder injection gasoline engine, a diesel engine, and the like can be mentioned. Regarding a structure of the engine 101, in addition to a reciprocating engine, a Wankel rotary engine may be adopted.

The engine 101 includes, as a starting device, a starter motor 104 consisting of a DC motor, a gear mechanism, a pushing mechanism of the gear, and the like, and a belt-driven starter generator ISG 105 that is also used for a generator consisting of an induction generator, a rectifier, and a voltage adjustment mechanism, and these are driven by power supplied from a battery 106. As proper use of these, for example, the engine 101 is started by the starter motor 104 at a first start before the engine is warmed up, and the engine 101 is started by the ISG 105 at a time of engine restart from an idle stop and the like after the engine is warmed up. Further, the ISG 105 also has a regeneration function. For example, when the fuel injection to the engine 101 is stopped at a time of deceleration of the vehicle 100, kinetic energy of the vehicle 100 is converted into electrical energy and recovered to the battery 106. For the battery 106, for example, not only a lead battery can be preferably used, but also various types of secondary batteries including lithium ion secondary batteries, and electricity storage devices such as capacitors may be used. Further, as described above, power generated by the starter generator ISG 105 is stored, and power is supplied to starting devices such as the starter motor 104 and the starter generator ISG 105, and vehicle electrical components such as headlights and various controllers (not shown).

The engine 101 has a crankshaft 107. One side of the crankshaft 107 is attached with a signal plate 108 having a predetermined pattern made for detecting a crank angle signal. Another side is attached with a ring gear integrated with a drive plate (not shown) that transmits a driving force to the transmission 103. In the vicinity of the signal plate 108, a crank angle sensor 109 to detect unevenness of the pattern of the signal plate 108 and output a pulse signal is attached. An engine control unit (ECU) 110 calculates a rotation speed of the engine 101 (engine speed) on the basis of the pulse signal outputted from the crank angle sensor 109.

The engine 101 is attached with, as intake system parts, an intake manifold 111 that distributes intake air to each cylinder, a throttle valve 112, an air flow sensor 113, and an air cleaner 114. The throttle valve 112 is an electronically controlled throttle device that controls a throttle valve opening degree in accordance with an optimal throttle opening degree calculated by the ECU 110, on the basis of a signal of an accelerator pedal sensor 116 that detects a depression amount of an accelerator pedal 115, a signal of a brake pedal sensor 118 that detects a depression amount of a brake pedal 117, a signal of a vehicle speed sensor 120 that detects a speed of the vehicle from rotational speeds of wheels 119L and 119R, and a signal sent from each of other sensors. The air flow sensor 113 measures a flow rate of air taken in from the air cleaner 114, and outputs to the ECU 110. The ECU 110 calculates a fuel amount corresponding to the measured air amount, and outputs as a valve opening time to a fuel injection valve 121. A start timing of the valve opening is a timing set in advance within the ECU 110 on the basis of a signal of the crank angle sensor 109. As a result of this operation, air taken in and fuel injected from the fuel injection valve 121 are mixed in the cylinder of the engine 101 to form an air-fuel mixture. A timing to ignite the air-fuel mixture is a timing set in advance within the ECU 110 on the basis of a signal of the crank angle sensor 109. By energizing an ignition plug 123 via an ignition coil 122, the air-fuel mixture in the cylinder is ignited and burned explosively.

The engine 101 generates a rotational driving force by transmitting kinetic energy obtained by the combustion explosion described above to the crankshaft 107. A drive plate (not shown) is attached to the transmission 103 side of the crankshaft 107, and is directly connected to an input side of the torque converter 102. An output side of the torque converter 102 is inputted to the transmission 103. The transmission 103 has a stepped transmission mechanism, or a belt or disk stepless transmission mechanism. The transmission 103 is controlled by a transmission control unit (TCU) 124. The TCU 124 controls the transmission 103 to have an optimum gear ratio, by determining an appropriate transmission gear or gear ratio on the basis of engine information (an engine speed, a vehicle speed, a throttle opening degree) and gear range information 126 of a gear shift lever 125. The gear ratio control is realized by controlling a hydraulic pressure of transmission by a mechanical oil pump 127 while the engine 101 is starting, and is realized by an electric oil pump 128 while the engine 101 is stopped. A clutch 130 is disposed between the transmission mechanism and a differential mechanism 129. The clutch 130 is engaged at a time of driving a wheel 119 by transmitting a driving force from the transmission mechanism to the differential mechanism 129, and the clutch 130 is released at a time of disconnecting a reverse driving force from the wheel 119 so as to perform control such that a reverse driving force is not transmitted to the transmission mechanism.

Various preventive safety controls of the vehicle 100 including the ACC is integrally implemented by an advanced driving assistant system (ADAS) control unit 133, on the basis of recognition information of an external information recognition device 131 that recognizes external information from a detection signal of an external information recognition sensor 132. The ADAS control unit 133 transmits information required for control, to various units such as the ECU 110 and the TCU 124. Examples of the external information recognition device 131 include laser radar, millimeter wave radar, a monocular camera, a stereo camera, and the like. The ECU 110 and the TCU 124 receive information from the ADAS control unit 133, and perform necessary control on each of the engine 101 and the transmission 103.

Figure 2:
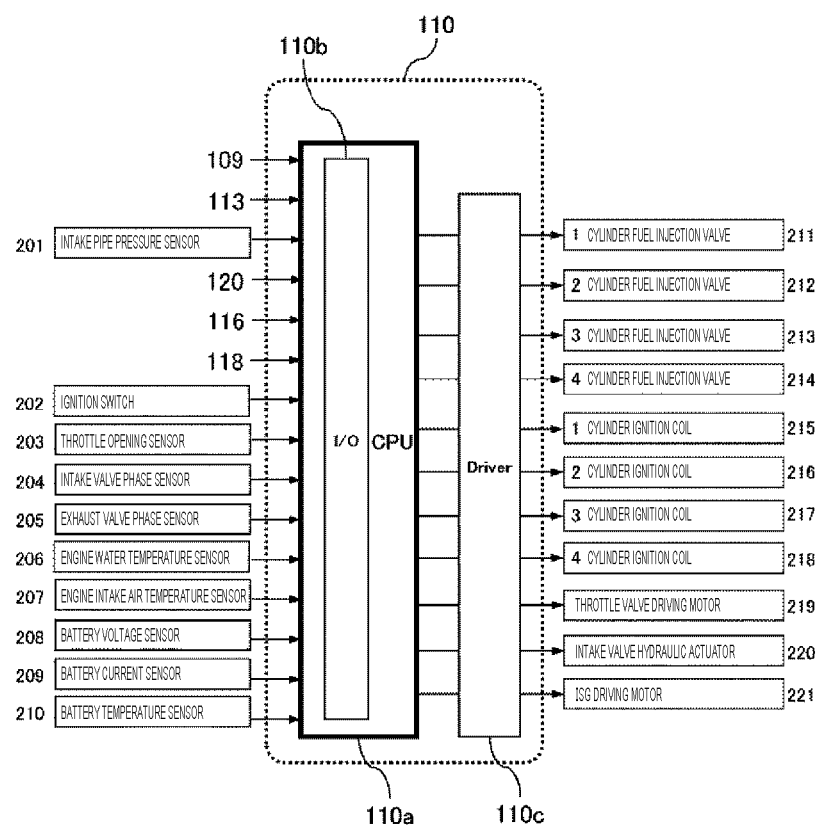
FIG. 2 is an internal configuration diagram of an ECU 110.

FIG. 2 is an internal configuration diagram of the ECU 110. The ECU 110 includes a central processing unit (CPU) 110a and a driver 110c. The CPU 110a includes an I/O 110b that converts electrical signals of individual sensors into digital signals, and converts the digital signals into driving signals of actual actuators.

The I/O unit 110b is inputted with a detection signal from each of the crank angle sensor 109, the air flow sensor 113, an intake pipe pressure sensor 201, the vehicle speed sensor 120, the accelerator pedal sensor 116, the brake pedal sensor 118, an ignition switch 202, a throttle opening sensor 203, an intake valve phase sensor 204, an exhaust valve phase sensor 205, an engine water temperature sensor 206, an engine intake air temperature sensor 207, a battery voltage sensor 208, a battery current sensor 209, and a battery temperature sensor 210. An output signal from the CPU 110a is individually transmitted via the driver 110c to fuel injection valves 211 to 214, ignition coils 215 to 218, a throttle driving motor 219, an intake valve hydraulic actuator 220, and an ISG driving motor 221.

FIG. 3 is an example of a traveling behavior of the vehicle 100 in a case where a preceding vehicle accelerates in a follow-up traveling mode. Here, a behavior in a case where the follow-up traveling mode is executed without a driver operating the accelerator pedal 115 and the brake pedal 117 will be exemplified.

Horizontal axes in FIG. 3(A) indicate time, while vertical axes individually indicate an own vehicle speed 301, a preceding vehicle speed 302, a clutch engagement command 303, a fuel injection command 304, a vehicle driving torque 305, a target engine torque 306, an ISG operation command quantity 307, and an SOC 308 of the battery 106. When a command quantity>0, the ISG operation command quantity 307 performs rotational driving (powering) of the crankshaft 107 by activating the ISG 105. Conversely, when the command quantity<0, kinetic energy of the vehicle 100 is recovered as electric energy by rotating the ISG 105 from the crankshaft 107, the ISG 105 performs power generation (regeneration), and the vehicle 100 is decelerated.

Horizontal axes in FIG. 3(B) indicate an inter-vehicle distance between a preceding vehicle and an own vehicle, while vertical axes individually indicate a relative vehicle speed 309 in switching of the vehicle 100 from acceleration traveling to deceleration traveling during the follow-up traveling mode, and a relative vehicle speed 310 in switching from deceleration traveling to acceleration traveling. The relative vehicle speed is a vehicle speed of the own vehicle with respect to the preceding vehicle. The own vehicle approaches the preceding vehicle when the inter-vehicle distance is short and the relative vehicle speed is fast, and separates from the preceding vehicle when the inter-vehicle distance is long and the relative vehicle speed is slow. The relative vehicle speed 309 is set on the basis of an inter-vehicle distance with which the driver feels that the vehicle 100 is approaching the preceding vehicle, and an inter-vehicle distance with which prevention of collision with the preceding vehicle can be ensured by the braking performance of the vehicle 100. The relative vehicle speed 310 is set on the basis of the inter-vehicle distance with which the driver feels that the vehicle 100 is separating from the preceding vehicle.

In traveling of the vehicle 100 in the follow-up traveling mode, a relative vehicle speed becomes the relative vehicle speed 309 and acceleration traveling is switched to deceleration traveling at a time 311 during traveling. At this time, when the clutch engagement command 303 is turned OFF to disengage the clutch 130, a driving force due to rotation of the engine 101 is not transmitted. This causes coasting, which is traveling with a traveling resistance alone. Further, at this time, fuel injection may be stopped by turning OFF the fuel injection command 304, to stop the engine 101. This leads to a reduction of fuel consumption during coasting.

At a time 312, a relative vehicle speed becomes the relative vehicle speed 310, and deceleration traveling is switched to acceleration traveling. At this time, in a case of coasting, engagement of the clutch 130 is started by turning ON of the clutch engagement command 303, and coasting is ended. Further, at this time, in a case where the fuel injection is stopped, the ISG 105 is activated by the ISG operation command quantity 307>0 to crank the engine 101, and the fuel injection is restarted to restart the engine 101 by turning ON of the fuel injection command 304. After engagement of the clutch 130 is completed, the vehicle 100 starts acceleration traveling by a driving force accompanying rotation of the engine 101. The target engine torque 306 during acceleration traveling leads to a reduction of fuel consumption during acceleration traveling by setting a torque (high-efficiency engine torque) with a highest combustion efficiency of the engine.

At a time 313, a relative vehicle speed becomes the relative vehicle speed 309 similarly to the time 311, and acceleration traveling is switched to deceleration traveling. Thereafter, this switching is also repeated after a time 314 at which the preceding vehicle accelerates.

FIG. 4 is an example of a traveling behavior in a case where acceleration of the vehicle 100 increases in the follow-up traveling mode. Here, there is shown a behavior in a case where an acceleration increase request occurs in acceleration traveling after the preceding vehicle accelerates. Horizontal and vertical axes in FIG. 4(A) and horizontal and vertical axes in FIG. 4(B) each are similar to those in FIG. 3.

In FIG. 4(A), an own vehicle speed 401 is an own vehicle speed in a case where no acceleration increase request occurs, and an own vehicle speed 402 is an own vehicle speed in a case where the acceleration increase request occurs. A preceding vehicle speed 403, a clutch engagement command 404, a fuel injection command 405, a vehicle driving torque 406, a target engine torque 407, an ISG operation command quantity 408, and an SOC 409 of the battery 106 each are similar to those in FIG. 3. Further, in FIG. 4(B), relative vehicle speeds 410 and 411 are set similarly to the relative vehicle speeds 309 and 310 in FIG. 3, respectively.

When the preceding vehicle speed 403 is accelerated at a time 412 in traveling in the follow-up traveling mode, and then the acceleration increase request occurs at a time 413 when the vehicle 100 is in acceleration traveling, the vehicle driving torque 406 is increased by increasing the target engine torque 407, and the own vehicle speed 402 is accelerated further than the own vehicle speed 401. Further, even in a case where the preceding vehicle speed 403 is not accelerated, the vehicle driving torque 406 and the target engine torque 407 behave similarly when the acceleration increase request occurs.

When a relative vehicle speed becomes the relative vehicle speed 410 at a time 414, acceleration traveling is switched to deceleration traveling. At a time 415, a relative vehicle speed becomes the relative vehicle speed 411, and deceleration traveling is switched to acceleration traveling. At a time 416 during acceleration traveling, an acceleration increase request occurs similarly to the time 413, and a similar operation is also repeatedly generated during the subsequent acceleration traveling. This accelerates the own vehicle speed 402 further than the own vehicle speed 401, and consequently increases the target engine torque 407. That is, the target engine torque 407 increases from the high-efficiency engine torque, leading to deterioration of fuel consumption during acceleration traveling.

FIG. 5 is an example of a traveling behavior in a case where acceleration of the vehicle 100 decreases in the follow-up traveling mode. Here, there is shown a behavior in a case where an acceleration decrease request occurs in acceleration traveling after the preceding vehicle accelerates. Horizontal and vertical axes in FIG. 5(A) and horizontal and vertical axes in FIG. 5(B) each are similar to those in FIG. 3.

In FIG. 5(A), an own vehicle speed 501 is an own vehicle speed in a case where no acceleration decrease request occurs, and an own vehicle speed 502 is an own vehicle speed in a case where the acceleration decrease request occurs. A preceding vehicle speed 503, a clutch engagement command 504, a fuel injection command 505, a vehicle driving torque 506, a target engine torque 507, an ISG operation command quantity 508, and an SOC 509 of the battery 106 each are similar to those in FIG. 3. Further, in FIG. 5(B), relative vehicle speeds 510 and 511 are set similarly to the relative vehicle speeds 309 and 310 in FIG. 3, respectively.

In a case where the preceding vehicle speed 503 is accelerated at a time 512 in traveling in the follow-up traveling mode, and then an acceleration decrease request occurs at a time 513 in acceleration traveling of the vehicle 100, the own vehicle speed 502 is decelerated further than the own vehicle speed 501 by suppressing an increase of the vehicle driving torque 506 by suppressing an increase of the target engine torque 507. Further, even in a case where the preceding vehicle speed 503 is not accelerated, the vehicle driving torque 506 and the target engine torque 507 behave similarly when the acceleration decrease request occurs.

When a relative vehicle speed becomes the relative vehicle speed 510 at a time 514, acceleration traveling is switched to deceleration traveling. At a time 515, a relative vehicle speed becomes the relative vehicle speed 511, and deceleration traveling is switched to acceleration traveling. At a time 516 during acceleration traveling, an acceleration decrease request occurs similarly to the time 513, and a similar operation is also repeatedly generated during the subsequent acceleration traveling. This decelerates the own vehicle speed 502 more than the own vehicle speed 501, and consequently suppresses an increase of the target engine torque 507. That is, the target engine torque 507 decreases from the high-efficiency engine torque, leading to deterioration of fuel consumption during acceleration traveling.

In the present embodiment, an object is to provide a vehicle control device capable of achieving a requested acceleration/deceleration and preventing deterioration of fuel consumption when an acceleration increase/decrease request occurs from the driver or external information for a set acceleration/deceleration in the traveling mode.

Figure 6:
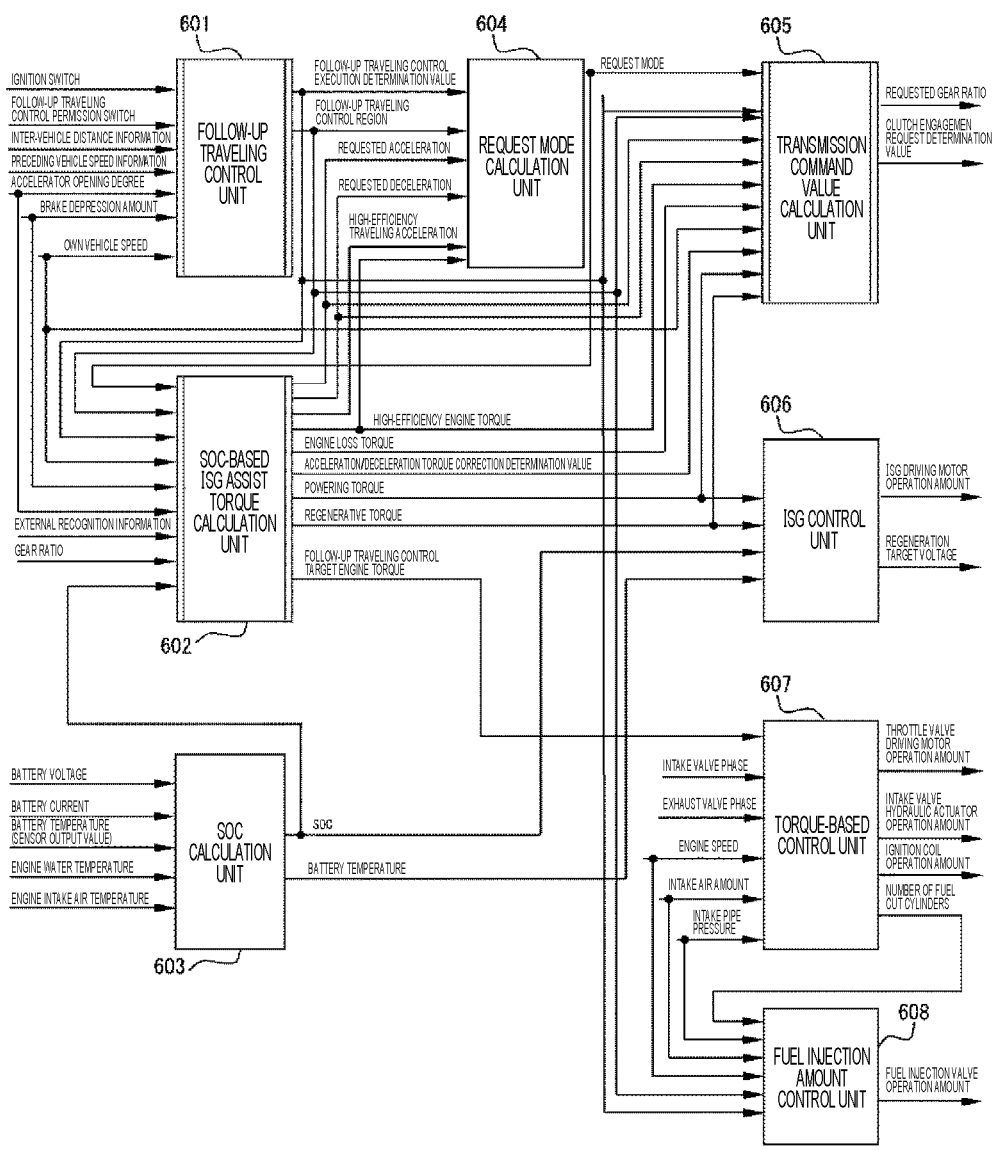
FIG. 6 is an internal configuration diagram of the ECU 110.

Hereinafter, with reference to FIGS. 6 to 33, the vehicle control device of the present embodiment will be described. FIG. 6 shows an example of a control block configuration of the central processing unit (CPU) 110a included in the vehicle control device (ECU 110) of FIG. 1.

FIG. 6 is an internal configuration diagram of the ECU 110. The ECU 110 includes a follow-up traveling control unit 601, an SOC-based ISG assist torque calculation unit 602, an SOC calculation unit 603, a request mode calculation unit 604, a transmission command value calculation unit 605, an ISG control unit 606, a torque-based control unit 607, and a fuel injection amount control unit 608.

The follow-up traveling control unit 601 uses the ignition switch, a follow-up traveling control permission switch, an accelerator opening degree, a brake depression amount, an own vehicle speed, and preceding vehicle speed information and inter-vehicle distance information obtained from an output of the ADAS control unit 133, to control follow-up traveling. The follow-up traveling control unit 601 outputs a follow-up traveling control region (a state value representing a relationship of relative vehicle speed/inter-vehicle distance between the preceding vehicle and the own vehicle, which will be explained again in FIG. 15 described later) and a result of determination on the basis of this as to whether or not to execute the follow-up control (a follow-up traveling control execution determination value). Details of the follow-up traveling control unit 601 will be explained again with reference to FIG. 7 described later.

The SOC-based ISG assist torque calculation unit 602 uses a follow-up traveling control execution determination value, a follow-up traveling control region, an own vehicle speed, an accelerator opening degree, a brake depression amount, a request mode calculated by the request mode calculation unit 604 described later, external recognition information obtained from an output of the ADAS control unit 133 via the external information recognition device 131, gear ratio information obtained from an output of the TCU 124, and an SOC, which is a charge capacity of the battery 106 calculated by the SOC calculation unit 603 described later, to calculate: a requested acceleration and a requested deceleration for a set acceleration/deceleration of the follow-up traveling mode from outside including a driver; a high-efficiency engine torque, which is a set torque of the engine 101 during acceleration traveling; a high-efficiency traveling acceleration in a case of acceleration traveling with this torque; an engine loss torque due to mechanical loss and intake loss of the engine 101 when a fuel injection command is stopped; a powering torque and a regenerative torque that are required in activating the ISG 105 to achieve the requested acceleration/deceleration; an acceleration/deceleration torque correction determination value to determine whether or not the requested acceleration or the requested deceleration can be achieved by the powering torque or the regenerative torque; and a follow-up traveling control target engine torque, which is a target torque of the engine 101 requested in follow-up traveling control. Details of the SOC-based ISG assist torque calculation unit 602 will be explained again with reference to FIG. 8 described later.

The SOC calculation unit 603 uses a battery voltage, a battery current, an output value of the battery temperature sensor, an engine water temperature, and an engine intake air temperature, to calculate a temperature of the battery 106 and the SOC. Details of the SOC calculation unit 603 will be explained again with reference to FIG. 26 described later.

The request mode calculation unit 604 uses a follow-up traveling control execution determination value, a follow-up traveling control region, a requested acceleration, a requested deceleration, a high-efficiency traveling acceleration, and a high-efficiency engine torque, to calculate a request mode to determine whether or not there is an increase or decrease of the requested acceleration/deceleration from outside including the driver, for the set acceleration/deceleration in the follow-up traveling mode. Details of the request mode calculation unit 604 will be explained again with reference to FIG. 27 described later.

The transmission command value calculation unit 605 uses an own vehicle speed, a request mode, a follow-up traveling control execution determination value, a follow-up traveling control region, a requested acceleration, a requested deceleration, a high-efficiency engine torque, an engine loss torque, an acceleration/deceleration torque correction determination value, a powering torque, and a regenerative torque, to calculate a requested gear ratio required in a case of shifting the transmission 103 during the follow-up traveling mode, and outputs a result of determination as to whether or not engagement of the clutch 130 is necessary (a clutch engagement request determination value). These are transmitted to the TCU 124, and the TCU 124 optimally controls those such as a gear ratio of the transmission 103, an engagement release timing of the clutch 130 on the basis of transmission information from the engine 101 side, and on the basis of information on the transmission 103 side. Details of the transmission command value calculation unit 605 will be explained again with reference to FIG. 9 described later.

The ISG control unit 606 uses a powering torque, a regenerative torque, an SOC, and a battery temperature, to calculate an ISG driving motor operation amount and a regeneration target voltage required for assisting increase/decrease of the requested acceleration/deceleration by activation of the ISG 105 during the follow-up traveling mode. Details of the ISG control unit 606 will be explained again with reference to FIG. 32 described later.

The torque-based control unit 607 uses a follow-up traveling control target engine torque, an intake valve phase, an exhaust valve phase, an engine speed, an intake air amount, and an intake pipe pressure, to operate peripheral devices of the engine 101 in order to control an output torque of the engine 101 through torque-based control.

For example, for increasing the torque, in order to increase an air amount flowing into the engine 101, an operation amount of the throttle valve driving motor and an operation amount of the intake valve hydraulic actuator required for this are determined. For decreasing the torque, in order to control an ignition timing or a fuel injection amount of the engine 101, an ignition coil operation amount and the number of fuel cut cylinders required for this are determined.

The fuel injection amount control unit 608 uses information on a requested number of fuel cut cylinders, an engine speed, an intake pipe pressure, an intake air amount, an intake pipe pressure, a follow-up traveling control determination value, and a follow-up traveling control region, to control a fuel injection amount. Therefore, an operation amount of the fuel injection valve required for the control is determined. Details of the fuel injection amount control unit 608 will be explained again with reference to FIG. 33 described later.

Figure 7:
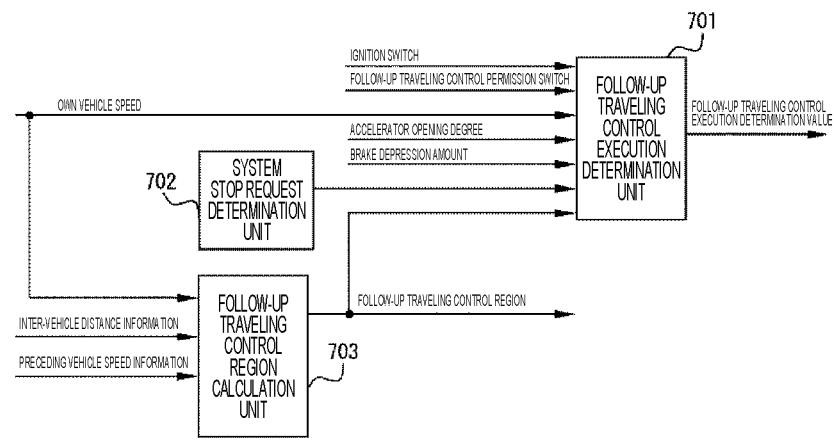
FIG. 7 is a detailed diagram of a follow-up traveling control unit 601.

FIG. 7 is a detailed diagram of the follow-up traveling control unit 601. The follow-up traveling control unit 601 includes a follow-up traveling control execution determination unit 701, a system stop request determination unit 702, and a follow-up traveling control region calculation unit 703.

The follow-up traveling control execution determination unit 701 uses the ignition switch, the follow-up traveling control permission switch, an own vehicle speed, an accelerator opening degree, a brake depression amount, a system stop request determination value calculated by the system stop request determination unit 702, and a follow-up control region calculated by the follow-up traveling control region calculation unit 703, to determine whether or not to execute follow-up traveling control. Specifically, it is determined whether or not to execute the follow-up traveling mode using the ACC and a sailing mode. Details of the follow-up traveling control execution determination unit 701 will be explained again with reference to FIG. 10 described later.

The system stop request determination unit 702 determines a system stop request. The system stop request determination unit 702 is to determine a stop request of the follow-up traveling control on the system side. During follow-up traveling control, it is generally necessary to stop the follow-up traveling control of the vehicle 100 in at least one of (1) a case where performance degradation or abnormality detection occurs for system components or functions of the vehicle 100, (2) a case where an operation of an air conditioner or a power generation request of the ISG 105 occurs during coasting while the clutch 130 is released and the fuel injection is stopped, and (3) a case where a deceleration increase request required for stopping the vehicle occurs in order to avoid collision of the preceding vehicle on the ADAS control unit 133 side. The system stop request determination unit 702 determines whether or not it is necessary to stop the follow-up traveling control of the vehicle 100, in an operation of the accelerator pedal 115 or the brake pedal 117 other than the above.

The follow-up traveling control region calculation unit 703 calculates the follow-up traveling control region by using an own vehicle speed, and inter-vehicle distance information and preceding vehicle speed information obtained from an output of the ADAS control unit 133. The follow-up traveling control region represents which of regions explained in FIG. 15 described later a relative relationship between the preceding vehicle and the own vehicle is in, and control is not performed in the regions 10 and 20. Details of the follow-up traveling control region calculation unit 703 will be explained again with reference to FIG. 11 described later.

Figure 8:
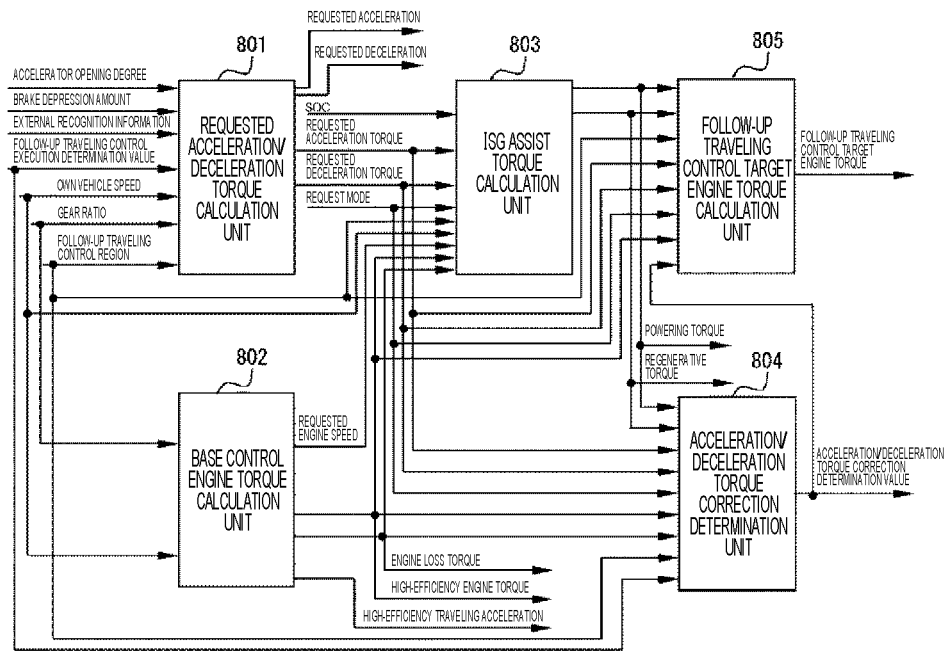
FIG. 8 is a detailed diagram of an SOC-based ISG assist torque calculation unit 602.

FIG. 8 is a detailed diagram of the SOC-based ISG assist torque calculation unit 602. The SOC-based ISG assist torque calculation unit 602 includes a requested acceleration/deceleration torque calculation unit 801, a base control engine torque calculation unit 802, an ISG assist torque calculation unit 803, an acceleration/deceleration torque correction determination unit 804, and a follow-up traveling control target engine torque calculation unit 805.

The requested acceleration/deceleration torque calculation unit 801 uses a follow-up traveling control execution determination value, a follow-up traveling control region, an accelerator opening degree, a brake depression amount, an own vehicle speed, external recognition information obtained from an output of the ADAS control unit 133 via the external information recognition device 131, and gear ratio information obtained from an output of the TCU 124, to calculate a requested acceleration and a requested deceleration for a set acceleration/deceleration of the follow-up traveling mode from outside including a driver, and a requested acceleration torque and a requested deceleration torque that are torques of the engine 101 required to realize these. Details of the requested acceleration torque calculation unit 801 will be explained again with reference to FIG. 16 described later.

The base control engine torque calculation unit 802 uses an own vehicle speed and gear ratio information obtained from an output of the TCU 124, to calculate a requested engine speed that is a speed of the engine 101 in the follow-up traveling mode, a high-efficiency engine torque that is a set torque of the engine 101 during acceleration traveling, a high-efficiency traveling acceleration in a case of acceleration traveling with this torque, and an engine loss torque due to mechanical loss and intake loss of the engine 101 when a fuel injection command is stopped. Details of the base control engine torque calculation unit 802 will be explained again with reference to FIG. 17 described later.

The ISG assist torque calculation unit 803 uses an SOC, a requested acceleration torque, a requested deceleration torque, a request mode, an own vehicle speed, a follow-up traveling control region, a requested engine speed, a high-efficiency engine torque, and an engine loss torque, to calculate a powering torque and a regenerative torque that are required in activating the ISG 105 to achieve the requested acceleration/deceleration. Details of the ISG assist torque calculation unit 803 will be explained again with reference to FIG. 18 described later.

The acceleration/deceleration torque correction determination unit 804 uses a powering torque, a regenerative torque, a requested acceleration torque, a requested deceleration torque, a request mode, a high-efficiency engine torque, an engine loss torque, a follow-up traveling control execution determination value, and a follow-up traveling control region, to determine whether or not the requested acceleration or the requested deceleration can be achieved by the powering torque or the regenerative torque that are assist torques of the ISG 105. Details of the acceleration/deceleration torque correction determination unit 804 will be explained again with reference to FIG. 24 described later.

The follow-up traveling control target engine torque calculation unit 805 uses a powering torque, a regenerative torque, a requested acceleration torque, a requested deceleration torque, a follow-up traveling control region, a high-efficiency engine torque, a request mode, and an acceleration/deceleration torque correction determination value, to calculate a target torque of the engine 101, which is requested in follow-up traveling control. Details of the follow-up traveling control target engine torque calculation unit 805 will be explained again with reference to FIG. 25 described later.

Figure 9:
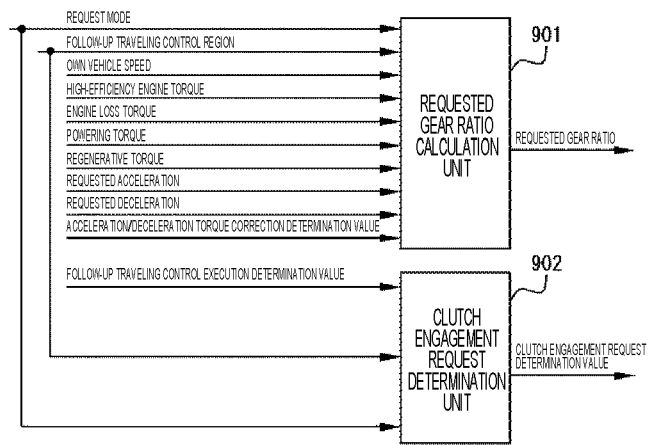
FIG. 9 is a detailed diagram of a transmission command value calculation unit 605.

FIG. 9 is a detailed diagram of the transmission command value calculation unit 605. The transmission command value calculation unit 605 includes a requested gear ratio calculation unit 901 and a clutch engagement request determination unit 902.

The requested gear ratio calculation unit 901 uses a request mode, a follow-up traveling control region, a follow-up traveling control execution determination value, an own vehicle speed, a high-efficiency engine torque, a powering torque, a regenerative torque, a requested acceleration torque, a requested deceleration torque, and gear ratio information obtained from an output of the TCU 124, to calculate a requested gear ratio required in a case of shifting the transmission 103 during the follow-up traveling mode. Details of the requested gear ratio calculation unit 901 will be explained again with reference to FIG. 30 described later.

The clutch engagement request determination unit 902 determines whether or not engagement of the clutch 130 is necessary during the follow-up traveling mode, by using a follow-up traveling control execution determination value, an accelerator opening degree, and a brake depression amount. Details of the clutch engagement request determination unit 902 will be explained again with reference to FIG. 31 described later.

Figure 10:
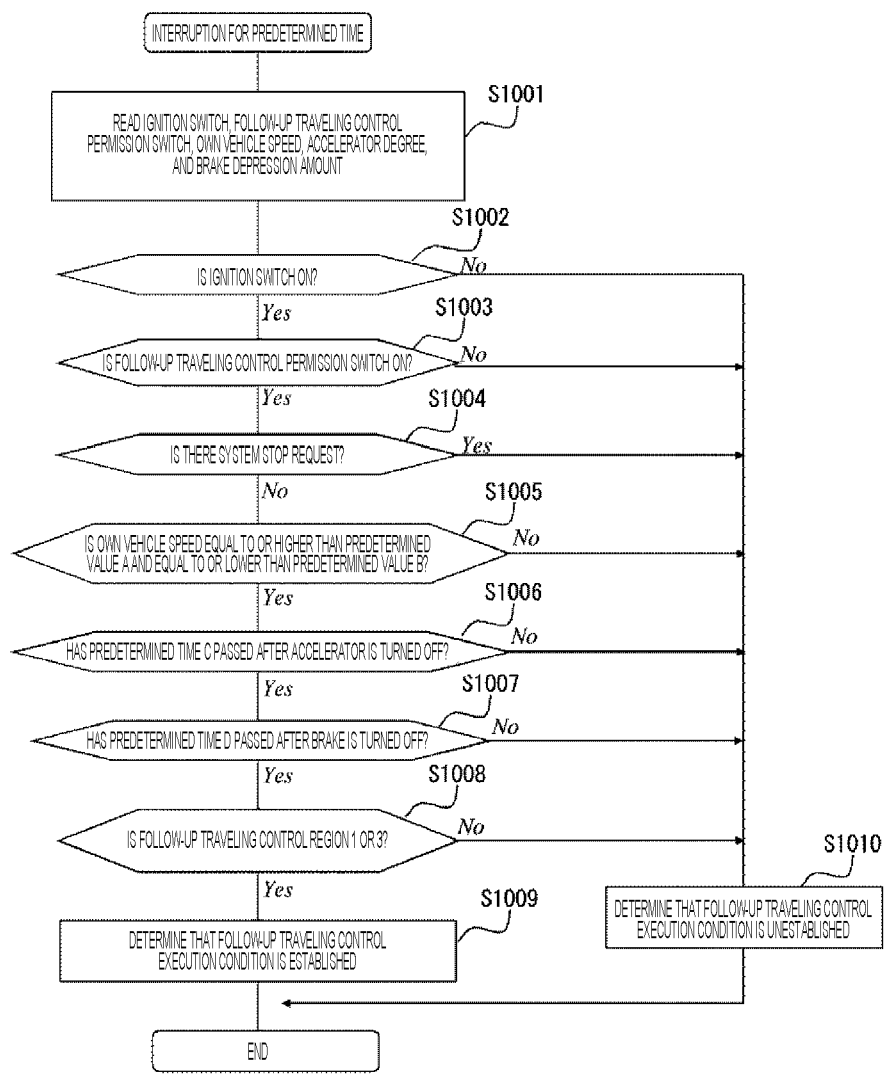
FIG. 10 is a flowchart for explaining an operation of a follow-up traveling control execution determination unit 701.

FIG. 10 is a flowchart for explaining an operation of the follow-up traveling control execution determination unit 701. The follow-up traveling control execution determination unit 701 executes this flowchart by, for example, interruption processing at predetermined time intervals. Each step of FIG. 10 is described below.

(FIG. 10: Step S1001)

The follow-up traveling control execution determination unit 701 reads the ignition switch, the follow-up traveling control permission switch, an own vehicle speed, an accelerator opening degree, and a brake depression amount.

(FIG. 10: Step S1002)

The follow-up traveling control execution determination unit 701 determines whether or not the ignition switch is ON. The process proceeds to step S1003 when the determination is established, otherwise the process proceeds to step S1010.

(FIG. 10: Step S1003)

The follow-up traveling control execution determination unit 701 determines whether or not the follow-up traveling control permission switch is ON. The process proceeds to step S1004 when the determination is established, otherwise the process proceeds to step S1010.

(FIG. 10: Step S1004)

The follow-up traveling control execution determination unit 701 determines whether or not there is a system stop request. The process proceeds to step S1010 when the determination is established, otherwise the process proceeds to step S1005.

(FIG. 10: Step S1005)

The follow-up traveling control execution determination unit 701 determines whether or not an own vehicle speed is equal to or higher than a predetermined value A and equal to or lower than B. The process proceeds to step S1006 when the determination is established, otherwise the process proceeds to step S1010. The predetermined value A is a lower limit value of the own vehicle speed for performing the follow-up traveling control. For example, the predetermined value A is determined in advance in consideration of durability of the clutch 130 in association with an increase in the number of releasing and the number of engagement when the vehicle 100 is coasting with the clutch 130 released during follow-up traveling. The predetermined value B is an upper limit value of the own vehicle speed for performing the follow-up traveling control. For example, the predetermined value B is determined in advance in consideration of a braking performance of the vehicle 100 from the viewpoint of collision safety prevention. In addition to these, the predetermined values A and B may be determined in consideration of drivability. Further, the predetermined values A and B may be determined dynamically on the basis of road information of a limited vehicle speed in the traveling environment read by the external information recognition sensor 132.

(FIG. 10: Step S1006)

The follow-up traveling control execution determination unit 701 determines whether or not a predetermined time C or more has passed after the accelerator is turned OFF, on the basis of an accelerator opening degree. The process proceeds to step S1007 when the determination is established, otherwise the process proceeds to step S1010. For example, the predetermined time C is to be a value required for determining as being not caused by being in the middle of shifting from the accelerator OFF state to the brake ON. The determination result is to be reset when the accelerator is turned ON.

(FIG. 10: Step S1007)

The follow-up traveling control execution determination unit 701 determines whether or not a predetermined time D or more has passed after the brake is turned OFF, on the basis of a brake depression amount. The process proceeds to step S1008 when the determination is established, otherwise the process proceeds to step S1010. For example, the predetermined time D is to be a value required for determining as being not caused by being in the middle of shifting from the brake OFF state to the accelerator ON. The determination result is to be reset when the brake is turned ON.

(FIG. 10: Step S1008)

The follow-up traveling control execution determination unit 701 determines whether or not the follow-up traveling control region is 1 or 3. The process proceeds to step S1009 when the determination is established, otherwise the process proceeds to step S1010.

(FIG. 10: Steps S1009 and S1010)

In step S1009, the follow-up traveling control execution determination unit 701 determines to execute the follow-up traveling control. In step S1010, the follow-up traveling control execution determination unit 701 determines not to execute the follow-up traveling control. These determination results are outputted as follow-up traveling control execution determination values.

Figure 11:
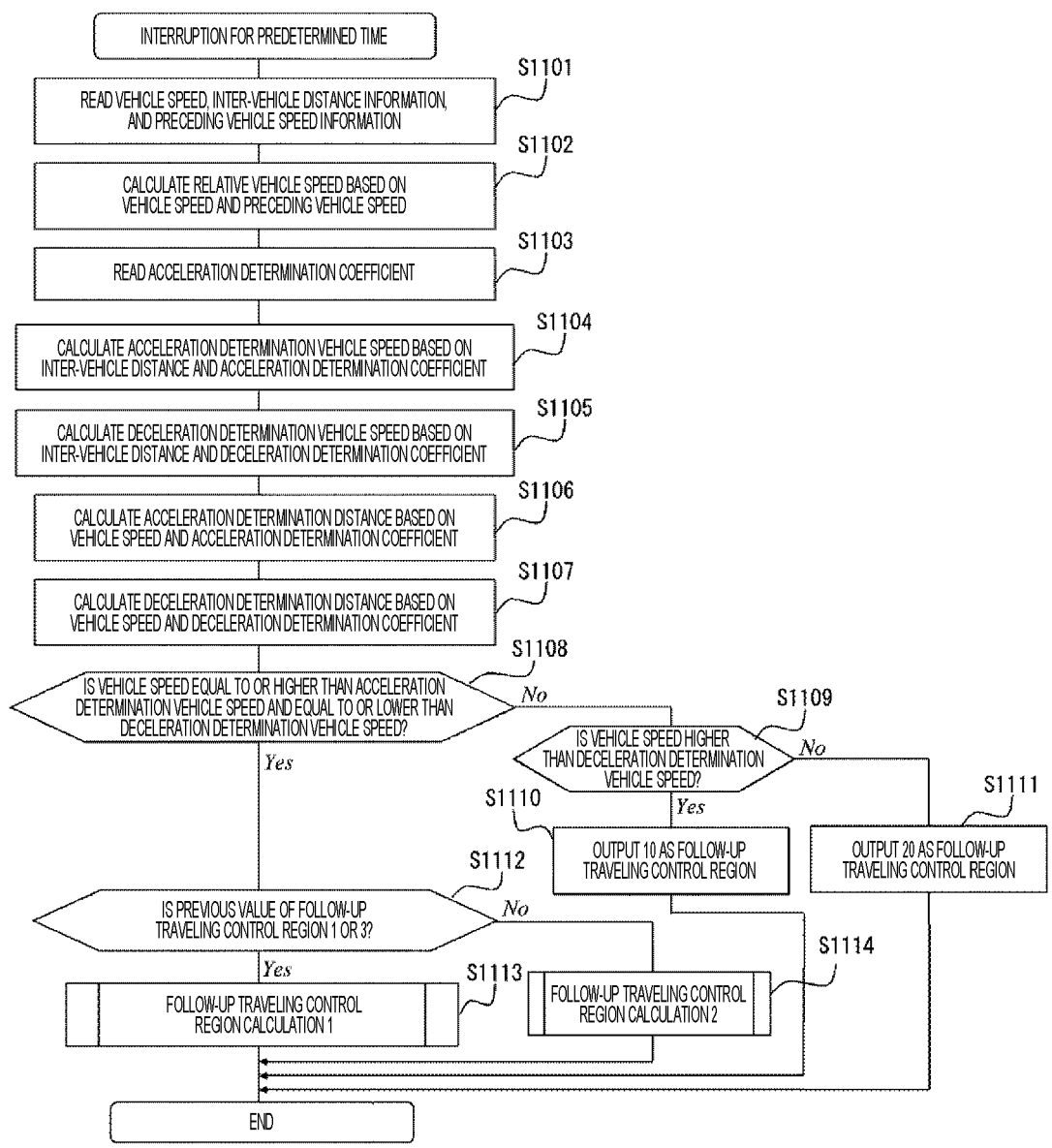
FIG. 11 is a flowchart for explaining an operation of a follow-up traveling control region calculation unit 703.

FIG. 11 is a flowchart for explaining an operation of the follow-up traveling control region calculation unit 703. The follow-up traveling control region calculation unit 703 executes this flowchart by, for example, interruption processing at predetermined time intervals. Each step of FIG. 11 is described below.

(FIG. 11: Steps S1101 and S1102)

In step S1101, the follow-up traveling control region calculation unit 703 reads an own vehicle speed, inter-vehicle distance information, and preceding vehicle speed information. In step S1102, the follow-up traveling control region calculation unit 703 calculates a relative vehicle speed by obtaining a difference between the own vehicle speed and the preceding vehicle speed.

(FIG. 11: Steps S1103 to S1105)

In step S1103, the follow-up traveling control region calculation unit 703 reads an acceleration determination coefficient. Since the acceleration determination coefficient describes both a behavior during acceleration traveling and a behavior during deceleration traveling, the acceleration determination coefficient also has significance as a deceleration determination coefficient. In the following description, unless otherwise mentioned, they are used as being substantially synonymous with each other. Details of the acceleration determination coefficient will be explained again in FIG. 12 described later. In step S1104, the follow-up traveling control region calculation unit 703 calculates an acceleration determination vehicle speed by referring to the acceleration determination coefficient with the inter-vehicle distance as a key. In step S1105, the follow-up traveling control region calculation unit 703 calculates a deceleration determination vehicle speed by referring to the deceleration determination coefficient with the inter-vehicle distance as a key.

(FIG. 11: Steps S1106 and S1107)

In step S1106, the follow-up traveling control region calculation unit 703 calculates an acceleration determination distance by referring to the acceleration determination coefficient with the own vehicle speed as a key. In step S1107, the follow-up traveling control region calculation unit 703 calculates a deceleration determination distance by referring to the deceleration determination coefficient with the own vehicle speed as a key.

(FIG. 11: Step S1108)

The follow-up traveling control region calculation unit 703 determines whether or not the own vehicle speed is equal to or higher than the acceleration determination vehicle speed and equal to or lower than the deceleration determination vehicle speed. The process proceeds to step S1112 when the determination is established, otherwise the process proceeds to step S1109.

(FIG. 11: Step S1109)

The follow-up traveling control region calculation unit 703 determines whether or not the own vehicle speed is higher than the deceleration determination vehicle speed. The process proceeds to step S1110 when the determination is established, otherwise the process proceeds to step S1111.

(FIG. 11: Steps S1110 and S1111)

In step S1110, the follow-up traveling control region calculation unit 703 outputs 10 as the follow-up traveling control region. In step S1111, the follow-up traveling control region calculation unit 703 outputs 20 as the follow-up traveling control region.

(FIG. 11: Step S1112)

The follow-up traveling control region calculation unit 703 determines whether or not a previous value of the follow-up traveling control region is 1 or 3. The process proceeds to step S1113 when the determination is established, otherwise the process proceeds to step S1114.

(FIG. 11: Steps S1113 and S1114)

Figure 13:
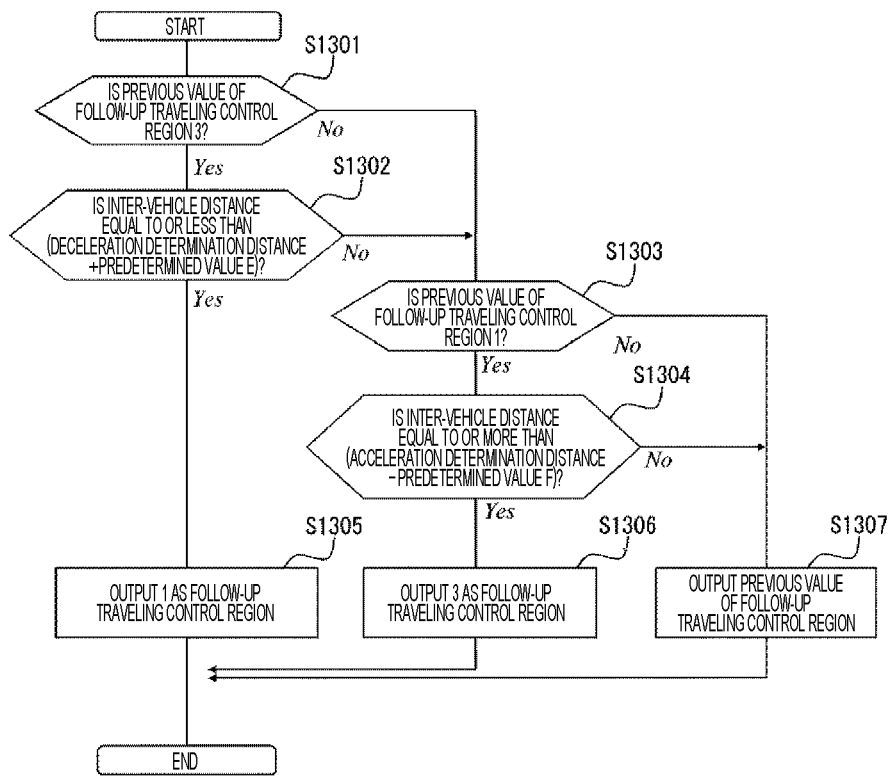
FIG. 13 is a flowchart for explaining details of step S1113.

In step S1113, the follow-up traveling control region calculation unit 703 executes the flowchart of FIG. 13. In step S1114, the follow-up traveling control region calculation unit 703 executes the flowchart of FIG. 14.

FIG. 12 is a view illustrating a processing image in step S1103. The acceleration determination coefficient is a curve describing a scene in which acceleration traveling should be performed and a scene in which deceleration traveling should be performed, in accordance with a relative relationship between the own vehicle and the preceding vehicle, as shown in FIGS. 3(B), 4(B), and 5(B). An inter-vehicle distance corresponding to the current own vehicle speed can be obtained as shown in FIG. 12(A), and a vehicle speed corresponding to the current inter-vehicle distance can be obtained as shown in FIG. 12(B). Instead of the own vehicle speed, the acceleration determination coefficient may be described using the relative vehicle speed.

FIG. 13 is a flowchart for explaining details of step S1113. This flowchart is to determine whether or not there has been transition to any one of the regions this time, in a case where the previous follow-up traveling control region is either 1 or 3. Each step of FIG. 13 is described below.

(FIG. 13: Step S1301)

The follow-up traveling control region calculation unit 703 determines whether or not a previous value of the follow-up traveling control region is 3. The process proceeds to step S1302 when the determination is established, otherwise the process proceeds to step S1303.

(FIG. 13: Step S1302)

The follow-up traveling control region calculation unit 703 determines whether or not the inter-vehicle distance is equal to or less than (deceleration determination distance+ predetermined value E). The process proceeds to step 1305 when the determination is established, otherwise the process proceeds to step S1303. The predetermined value E is, for example, such a value that the inter-vehicle distance becomes equal to or more than the deceleration determination distance when acceleration traveling is switched to deceleration traveling during follow-up traveling control.

(FIG. 13: Step S1303)

The follow-up traveling control region calculation unit 703 determines whether or not a previous value of the follow-up traveling control region is 1. The process proceeds to step S1304 when the determination is established, otherwise the process proceeds to step S1307.

(FIG. 13: Step S1304)

The follow-up traveling control region calculation unit 703 determines whether or not the inter-vehicle distance is equal to or more than (acceleration determination distance– predetermined value F). The process proceeds to step S1306 when the determination is established, otherwise the process proceeds to step S1303. The predetermined value F is, for example, such a value that the inter-vehicle distance becomes equal to or less than the acceleration determination distance when deceleration traveling is switched to acceleration traveling during follow-up traveling control.

(FIG. 13: Steps S1305 and S1306)

In step S1305, the follow-up traveling control region calculation unit 703 outputs 1 as the follow-up traveling control region. In step 1306, the follow-up traveling control region calculation unit 703 outputs 3 as the follow-up traveling control region.

(FIG. 13: Step S1307)

In a case where the follow-up traveling control region cannot be determined by the above procedure, the follow-up traveling control region calculation unit 703 outputs the previous value.

Figure 14:
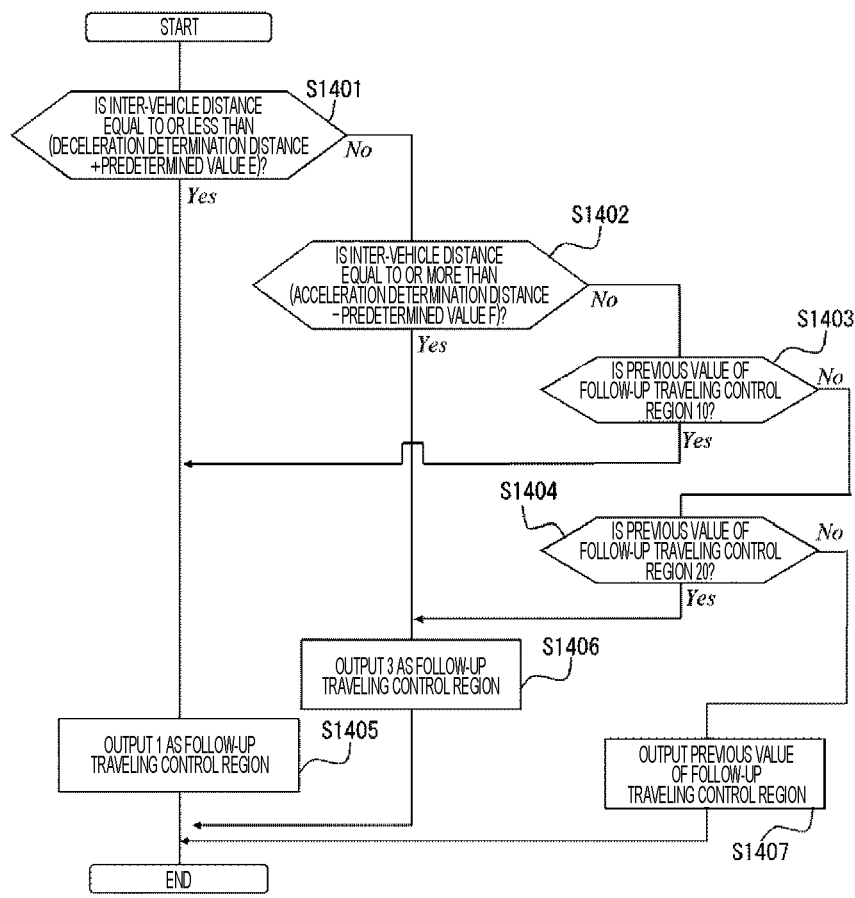
FIG. 14 is a flowchart for explaining details of step S1114.

FIG. 14 is a flowchart for explaining details of step S1114. This flowchart is to determine to which region the current transition has been made, in a case where the previous follow-up traveling control region is either 10 or 20. Each step of FIG. 14 is described below.

(FIG. 14: Step S1401)

The follow-up traveling control region calculation unit 703 determines whether or not the inter-vehicle distance is equal to or less than (deceleration determination distance+ predetermined value E). The process proceeds to step S1405 when the determination is established, otherwise the process proceeds to step S1402. The predetermined value E is to be the same value as in step S1302.

(FIG. 14: Step S1402)

The follow-up traveling control region calculation unit 703 determines whether or not the inter-vehicle distance is equal to or more than (acceleration determination distance– predetermined value F). The process proceeds to step S1403 when the determination is established, otherwise the process proceeds to step S1406. The predetermined value F is to be the same value as in step S1304.

(FIG. 14: Step S1403)

The follow-up traveling control region calculation unit 703 determines whether or not a previous value of the follow-up traveling control region is 10. The process proceeds to step S1405 when the determination is established, otherwise the process proceeds to step S1404.

(FIG. 14: Step S1404)

The follow-up traveling control region calculation unit 703 determines whether or not a previous value of the follow-up traveling control region is 20. The process proceeds to step S1406 when the determination is established, otherwise the process proceeds to step S1407.

(FIG. 14: Steps S1405 and S1406)

In step S1405, the follow-up traveling control region calculation unit 703 outputs 1 as the follow-up traveling control region. In step 1406, the follow-up traveling control region calculation unit 703 outputs 3 as the follow-up traveling control region.

(FIG. 14: Step S1407)

In a case where the follow-up traveling control region cannot be determined by the above procedure, the follow-up traveling control region calculation unit 703 outputs the previous value.

Figure 15:
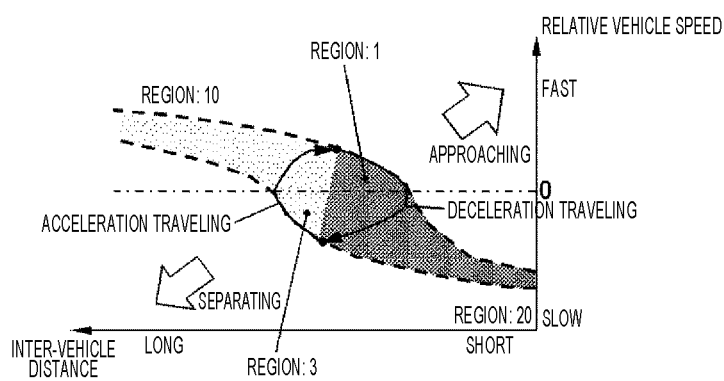
FIG. 15 is a view showing a follow-up control region determined by the follow-up traveling control region calculation unit 703.

FIG. 15 is a view showing a follow-up control region determined by the follow-up traveling control region calculation unit 703. The ECU 110 executes follow-up traveling control when the follow-up traveling control region is 1 or 3. This allows traveling within a range in which the driver can tolerate a change of the inter-vehicle distance.

Figure 16:
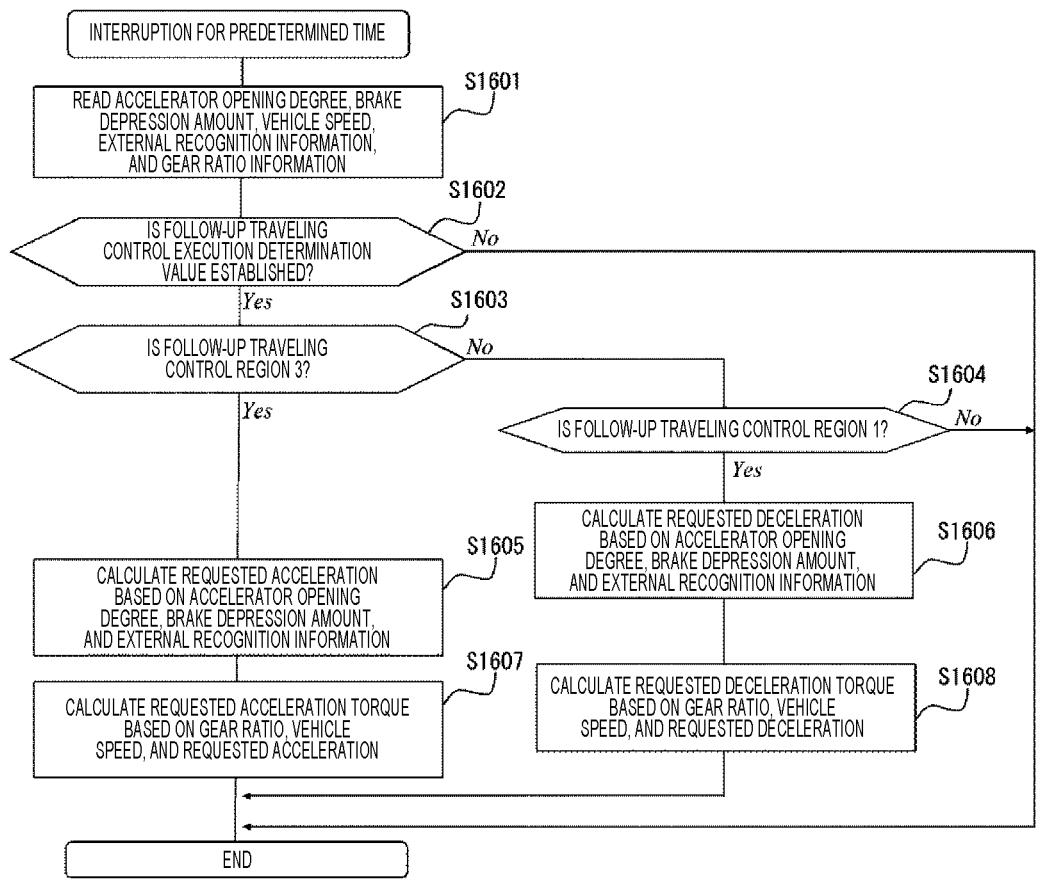
FIG. 16 is a flowchart for explaining an operation of a requested acceleration/deceleration torque calculation unit 801.

FIG. 16 is a flowchart for explaining an operation of the requested acceleration/deceleration torque calculation unit 801.

The requested acceleration/deceleration torque calculation unit 801 executes this flowchart by, for example, interruption processing at predetermined time intervals. Each step of FIG. 16 is described below.

(FIG. 16: Step S1601)

The requested acceleration/deceleration torque calculation unit 801 reads an accelerator opening degree, a brake depression amount, an own vehicle speed, external recognition information, and gear ratio information.

(FIG. 16: Step S1602)

The requested acceleration/deceleration torque calculation unit 801 determines whether or not the follow-up traveling control execution determination value is established. The process proceeds to step S1603 when the determination is established, otherwise this flowchart is ended.

(FIG. 16: Step S1603)

The requested acceleration/deceleration torque calculation unit 801 determines whether or not the follow-up traveling control region is 3.

The process proceeds to step S1605 when the determination is established, otherwise the process proceeds to step S1604.

(FIG. 16: Step S1604)

The requested acceleration/deceleration torque calculation unit 801 determines whether or not the follow-up traveling control region is 1.

The process proceeds to step S1606 when the determination is established, otherwise this flowchart is ended.

(FIG. 16: Steps S1605 and S1606)

In step S1605, the requested acceleration/deceleration torque calculation unit 801 calculates the requested acceleration by using, for example, one or more of an accelerator opening degree, a brake depression amount, and external recognition information. The requested acceleration is obtained by increasing or decreasing the set acceleration during acceleration traveling in the follow-up traveling mode, and calculated on the basis of, for example, (1) an accelerator opening degree by accelerator ON or a brake depression amount by the brake ON by the driver during acceleration traveling, or an amount of change of an accelerator opening degree or a brake depression amount, and (2) a gradient change and the like of a traveling path detected by the external information recognition sensor 132.

For example, when the vehicle 100 accelerates with a high-efficiency engine torque, the set acceleration corresponds to a high-efficiency traveling acceleration explained in FIG. 17 described later. In step S1606, the requested acceleration/deceleration torque calculation unit 801 calculates the requested deceleration by using, for example, one or more of an accelerator opening degree, a brake depression amount, and external recognition information. The requested deceleration is obtained by increasing or decreasing the set deceleration during deceleration traveling in the follow-up traveling mode, and calculated on the basis of either one of the above (1) or (2), for example, similarly to the requested acceleration. For example, when the vehicle 100 is coasting, the set deceleration corresponds to a coasting deceleration explained in FIG. 27 described later.

(FIG. 16: Steps S1607 and S1608)

In step S1607, the requested acceleration/deceleration torque calculation unit 801 calculates the requested acceleration torque by using a gear ratio, an own vehicle speed, and a requested acceleration. The requested acceleration torque can be calculated, for example, in accordance with the following Equation 1.

[Formula 1]

$$\alpha = T_E i \frac{e}{DM} - \frac{1}{M} C_d S V^2 - \mu g - g\sin\theta \quad \text{(Equation 1)}$$

Here, α represents an acceleration, $T_E$ represents an engine torque, i represents a total reduction ratio (=final reduction ratio×gear ratio), e represents a transmission efficiency, D represents a wheel outer diameter, M represents a vehicle weight, $C_d$ represents an air resistance coefficient, S represents a front projection area, V represents a vehicle speed, μ represents a rolling resistance coefficient, g represents an acceleration of gravity, and θ represents a road surface gradient. Therefore, $T_E$ of Equation 1 corresponds to the requested acceleration torque. Further, since Equation 1 describes both a behavior during acceleration traveling and a behavior during deceleration traveling, Equation 1 also has significance as calculation of the requested deceleration torque. In the following description, unless otherwise mentioned, they are used as being substantially synonymous with each other. In step S1608, the requested acceleration/deceleration torque calculation unit 801 calculates the requested deceleration torque by using a gear ratio, an own vehicle speed, and a requested deceleration. The requested deceleration torque can be calculated by using the above Equation 1, similarly to the requested acceleration torque in S1607.

Figure 17:
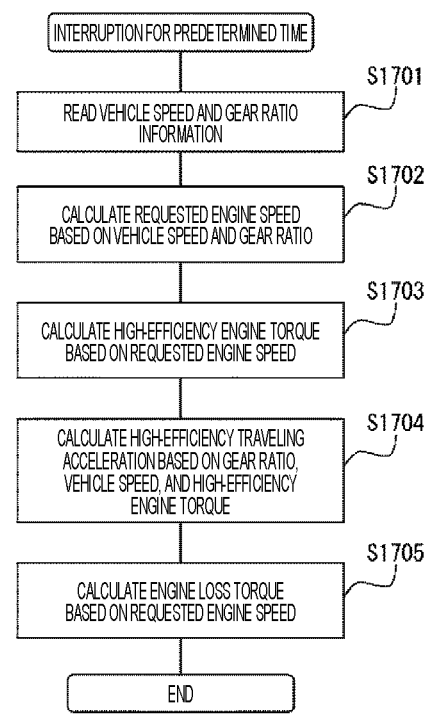
FIG. 17 is a flowchart for explaining an operation of a base control engine torque calculation unit 802.

FIG. 17 is a flowchart for explaining an operation of the base control engine torque calculation unit 802. The base control engine torque calculation unit 802 executes this flowchart by, for example, interruption processing at predetermined time intervals. Each step of FIG. 17 is described below.

(FIG. 17: Step S1701)

The base control engine torque calculation unit 802 reads an own vehicle speed and gear ratio information.

(FIG. 17: Step S1702)

The base control engine torque calculation unit 802 calculates a requested engine speed by using the own vehicle speed and the gear ratio. The requested engine speed may be obtained by describing a value in advance as a map for each set of an own vehicle speed and a gear ratio and referring to this map.

(FIG. 17: Step S1703)

The base control engine torque calculation unit 802 calculates a high-efficiency engine torque by using the requested engine speed. The high-efficiency engine torque may be obtained by describing a value in advance as a table for each requested engine speed and referring to this table.

(FIG. 17: Step S1704)

The base control engine torque calculation unit 802 calculates a high-efficiency traveling acceleration by using the gear ratio, the own vehicle speed, and the high-efficiency engine torque. The high-efficiency traveling acceleration can be calculated, for example, in accordance with the above Equation 1.

(FIG. 17: Step S1705)

The base control engine torque calculation unit 802 calculates an engine loss torque by using the requested engine speed. The engine loss torque may be obtained by describing a value in advance as a table for each requested engine speed and referring to this table. The engine loss torque represents a loss torque of the engine in an engaged state of the torque converter 102 and the clutch 130 after stopping of fuel supply to the engine 101, and varies with the engine speed.

Figure 18:
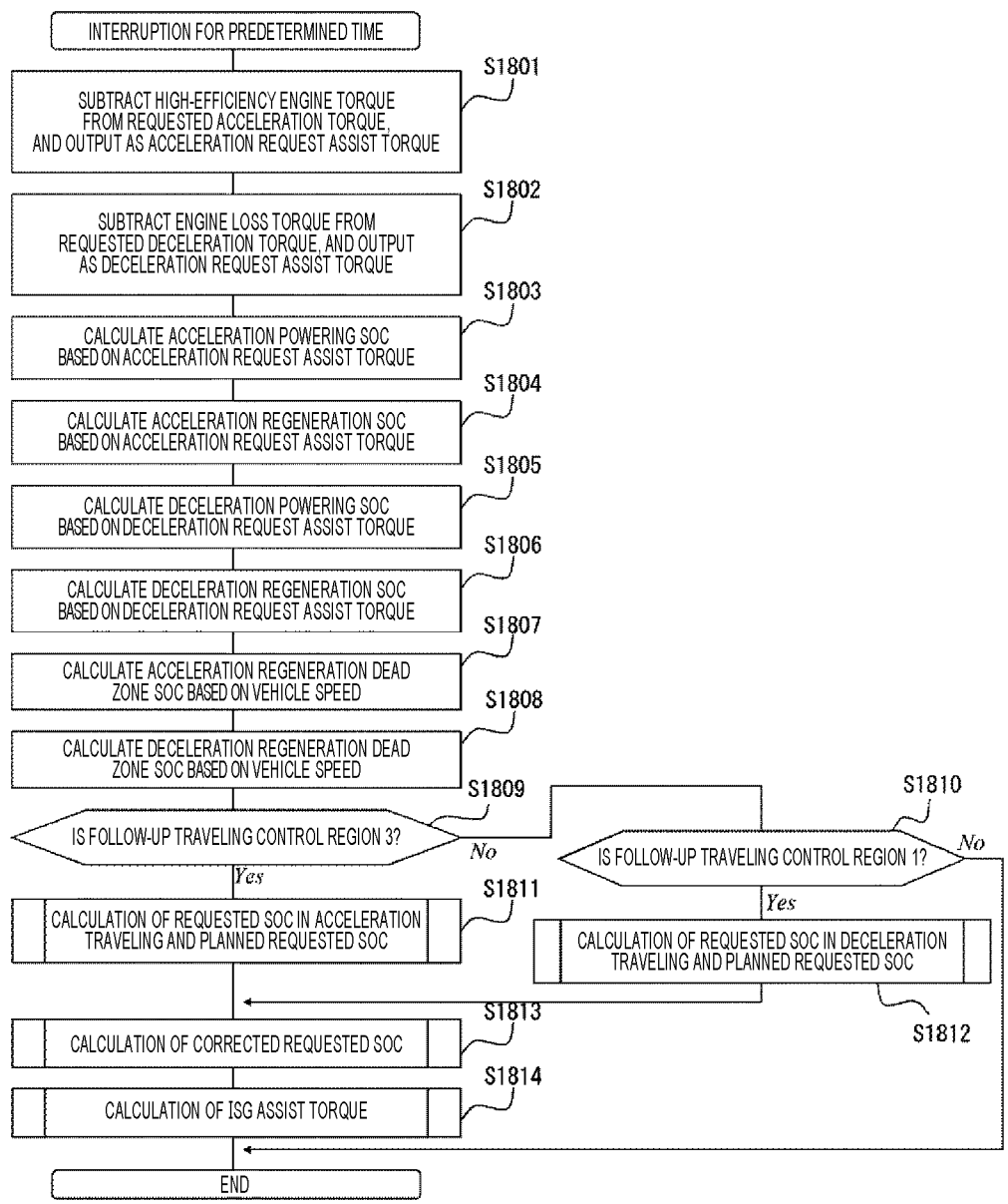
FIG. 18 is a flowchart for explaining an operation of an ISG assist torque calculation unit 803.

FIG. 18 is a flowchart for explaining an operation of the ISG assist torque calculation unit 803. The ISG assist torque calculation unit 803 executes this flowchart by, for example, interruption processing at predetermined time intervals. Each step of FIG. 18 is described below.

(FIG. 18: Step S1801)

The ISG assist torque calculation unit 803 outputs a value obtained by subtracting the high-efficiency engine torque from the requested acceleration torque, as an acceleration request assist torque.

(FIG. 18: Step S1802)

The ISG assist torque calculation unit 803 outputs a value obtained by subtracting the engine loss torque from the requested deceleration torque, as a deceleration request assist torque.

(FIG. 18: Steps S1803 and S1804)

In step S1803, the ISG assist torque calculation unit 803 calculates an acceleration powering SOC by using the acceleration request assist torque. The acceleration powering SOC may be obtained by describing a value in advance as a table for each acceleration request assist torque and referring to this table. In step S1804, the ISG assist torque calculation unit 803 calculates an acceleration regeneration SOC by using the acceleration request assist torque. The acceleration regeneration SOC may be obtained by describing a value in advance as a table for each acceleration request assist torque and referring to this table. In addition, a powering SOC is defined as a positive side standard, a regenerative SOC is defined as a negative side standard, and the subsequent powering SOC and regenerative SOC are based on this definition. This means that the powering SOC increases in value in accordance with an increase of the SOC consumed by activation of the electrical components including the ISG 105, and means that the regenerative SOC conversely decreases in value (increase on a minus side) as a charge amount increases.

(FIG. 18: Steps S1805 and S1806)

In step S1805, the ISG assist torque calculation unit 803 calculates a deceleration powering SOC by using the deceleration request assist torque. The deceleration powering SOC may be obtained by describing a value in advance as a table for each deceleration request assist torque and referring to this table. In step S1806, the ISG assist torque calculation unit 803 calculates a deceleration regeneration SOC by using a deceleration request assist torque. The deceleration regeneration SOC may be obtained by describing a value in advance as a table for each deceleration request assist torque and referring to this table.

(FIG. 18: Steps S1807 and S1808)

In step S1807, the ISG assist torque calculation unit 803 calculates a deceleration regeneration dead zone SOC for calculating an acceleration regeneration dead zone SOC, by using the own vehicle speed. The deceleration regeneration dead zone SOC may be obtained by describing a value in advance as a table for each own vehicle speed and referring to this table. The deceleration regeneration dead zone SOC is set on the basis of a regeneration amount determined that the driver can tolerate deceleration accompanying the regeneration, for example, when the ISG 105 regenerates during deceleration traveling.

(FIG. 18: Step S1809)

The ISG assist torque calculation unit 803 determines whether or not the follow-up control region is 3. The process proceeds to step S1811 when the determination is established, otherwise the process proceeds to step S1810.

(FIG. 18: Step S1810)

The ISG assist torque calculation unit 803 determines whether or not the follow-up control region is 1. The process proceeds to step S1812 when the determination is established, otherwise this flowchart is ended.

(FIG. 18: Steps S1811 and S1812)

Figure 19:
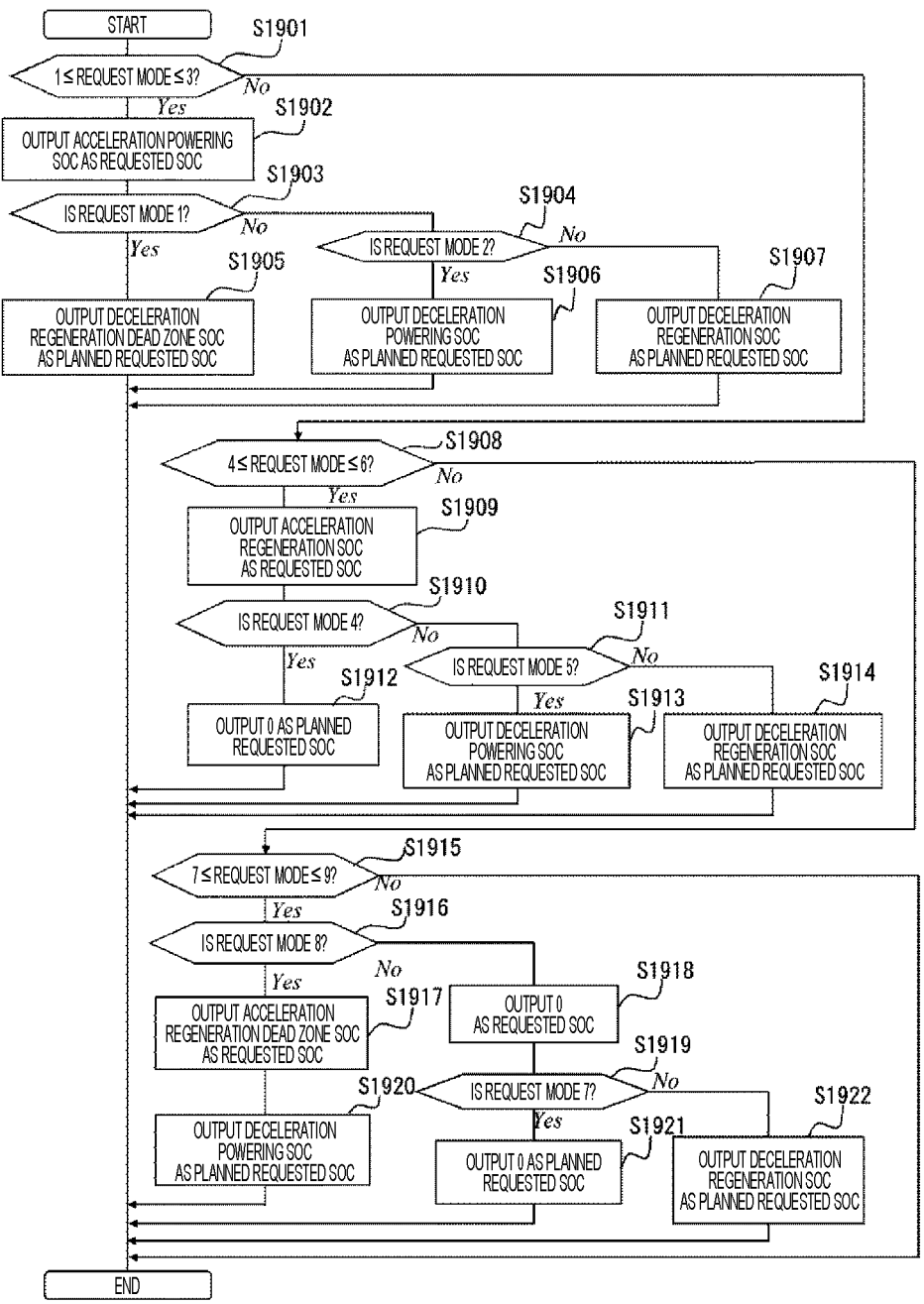
FIG. 19 is a flowchart for explaining details of step S1811.

In step S1811, the ISG assist torque calculation unit 803 executes the flowchart of FIG. 19. In step S1812, the ISG assist torque calculation unit 803 executes the flowchart of FIG. 20.

(FIG. 18: Step S1813)

Figure 21:
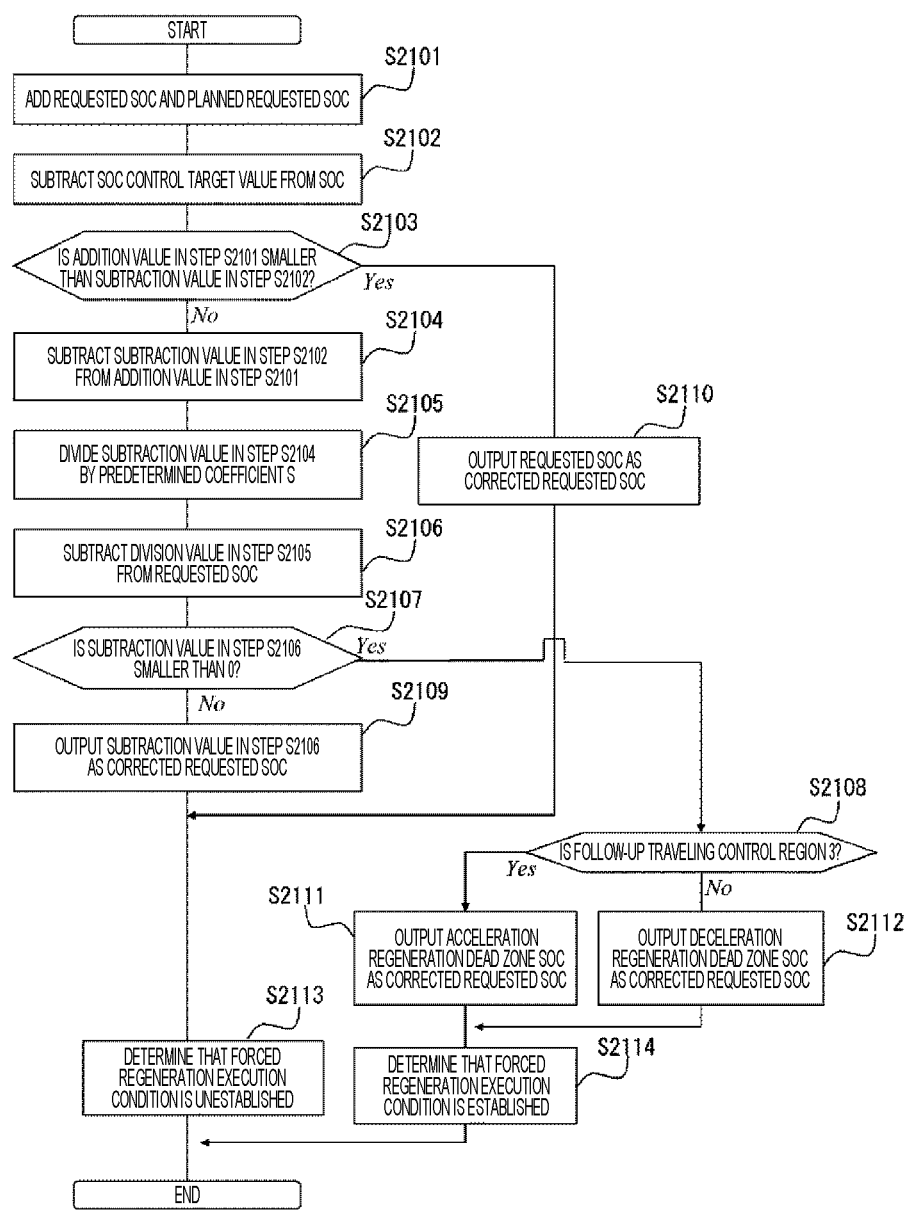
FIG. 21 is a flowchart for explaining details of step S1813.

The ISG assist torque calculation unit 803 executes the flowchart of FIG. 21.

(FIG. 18: Step S1814)

Figure 23:
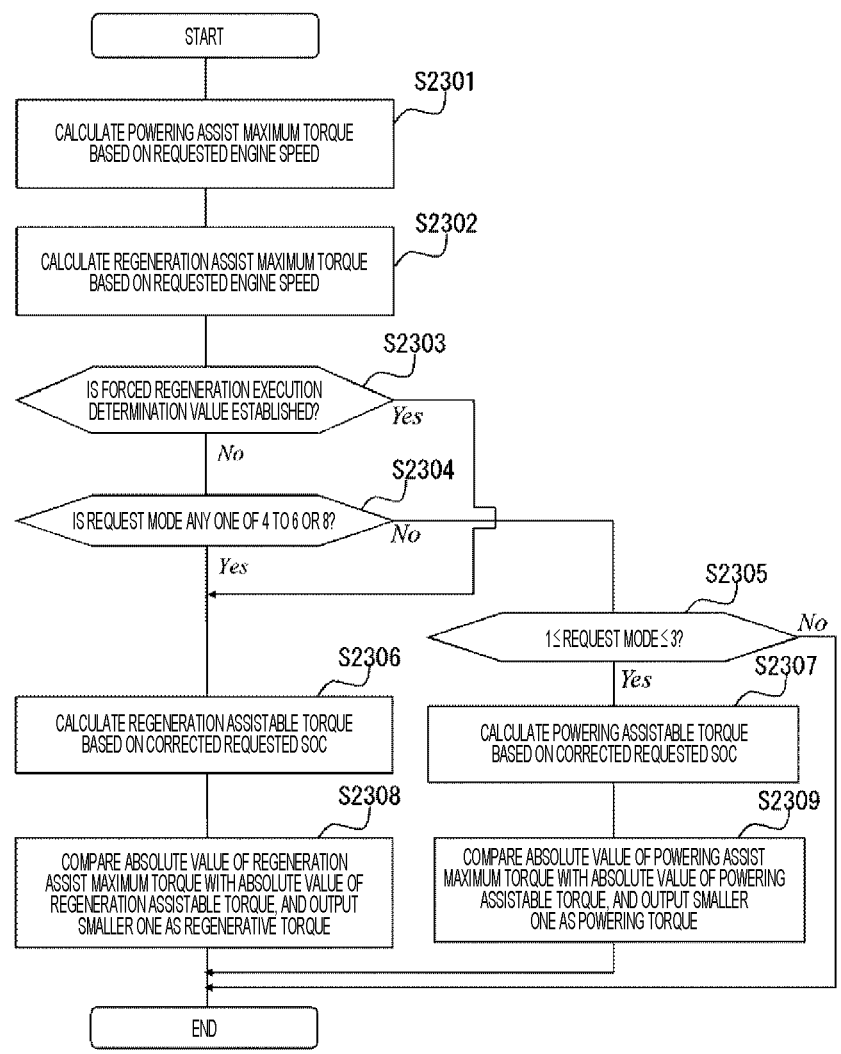
FIG. 23 is a flowchart for explaining details of step S1814.

The ISG assist torque calculation unit 803 executes the flowchart of FIG. 23.

FIG. 19 is a flowchart for explaining details of step S1811. This flowchart is to calculate a requested SOC at the time of acceleration traveling and a planned requested SOC at the next deceleration traveling. Each step of FIG. 19 is described below.

(FIG. 19: Step S1901)

The ISG assist torque calculation unit 803 determines whether or not the request mode is 1 or more and 3 or less. The process proceeds to step S1902 when the determination is established, otherwise the process proceeds to step S1908.

(FIG. 19: Step S1902)

The ISG assist torque calculation unit 803 outputs the acceleration powering SOC as the requested SOC.

(FIG. 19: Step S1903)

The ISG assist torque calculation unit 803 determines whether or not the request mode is 1. The process proceeds to step S1905 when the determination is established, otherwise the process proceeds to step S1904.

(FIG. 19: Step S1904)

The ISG assist torque calculation unit 803 determines whether or not the request mode is 2. The process proceeds to step S1906 when the determination is established, otherwise the process proceeds to step S1907.

(FIG. 19: Steps S1905 to S1907)

In step S1905, the ISG assist torque calculation unit 803 outputs the deceleration regeneration dead zone SOC as the planned requested SOC. In step S1906, the ISG assist torque calculation unit 803 outputs the deceleration powering SOC as the planned requested SOC. In step S1907, the ISG assist torque calculation unit 803 outputs the deceleration regeneration SOC as the planned requested SOC.

(FIG. 19: Step S1908)

The ISG assist torque calculation unit 803 determines whether or not the request mode is 4 or more and 6 or less. The process proceeds to step S1909 when the determination is established, otherwise the process proceeds to step S1915.

(FIG. 19: Step S1909)

The ISG assist torque calculation unit 803 outputs the acceleration regeneration SOC as the requested SOC.

(FIG. 19: Step S1910)

The ISG assist torque calculation unit 803 determines whether or not the request mode is 4. The process proceeds to step S1912 when the determination is established, otherwise the process proceeds to step S1911.

(FIG. 19: Step S1911)

The ISG assist torque calculation unit 803 determines whether or not the request mode is 5. The process proceeds to step S1913 when the determination is established, otherwise the process proceeds to step S1914.

(FIG. 19: Steps S1912 to S1914)

In step S1912, the ISG assist torque calculation unit 803 outputs 0 as the planned requested SOC. In step S1913, the ISG assist torque calculation unit 803 outputs the deceleration powering SOC as the planned requested SOC. In step 1914, the ISG assist torque calculation unit 803 outputs the deceleration regeneration SOC as the planned requested SOC.

(FIG. 19: Step S1915)

The ISG assist torque calculation unit 803 determines whether or not the request mode is 7 or more and 9 or less. The process proceeds to step S1916 when the determination is established, otherwise this flowchart is ended.

(FIG. 19: Step S1916)

The ISG assist torque calculation unit 803 determines whether or not the request mode is 8. The process proceeds to step S1917 when the determination is established, otherwise the process proceeds to step S1918.

(FIG. 19: Step S1917)

The ISG assist torque calculation unit 803 outputs the acceleration regeneration dead zone SOC as the requested SOC.

(FIG. 19: Step S1918)

The ISG assist torque calculation unit 803 outputs 0 as the requested SOC.

(FIG. 19: Step S1919)

The ISG assist torque calculation unit 803 determines whether or not the request mode is 7. The process proceeds to step S1921 when the determination is established, otherwise the process proceeds to step S1922.

(FIG. 19: Steps S1920 to S1922)

In step S1920, the ISG assist torque calculation unit 803 outputs the deceleration powering SOC as the planned requested SOC. In step S1921, the ISG assist torque calculation unit 803 outputs 0 as the planned requested SOC. In step S1922, the ISG assist torque calculation unit 803 outputs the deceleration regeneration SOC as the planned requested SOC.

Figure 20:
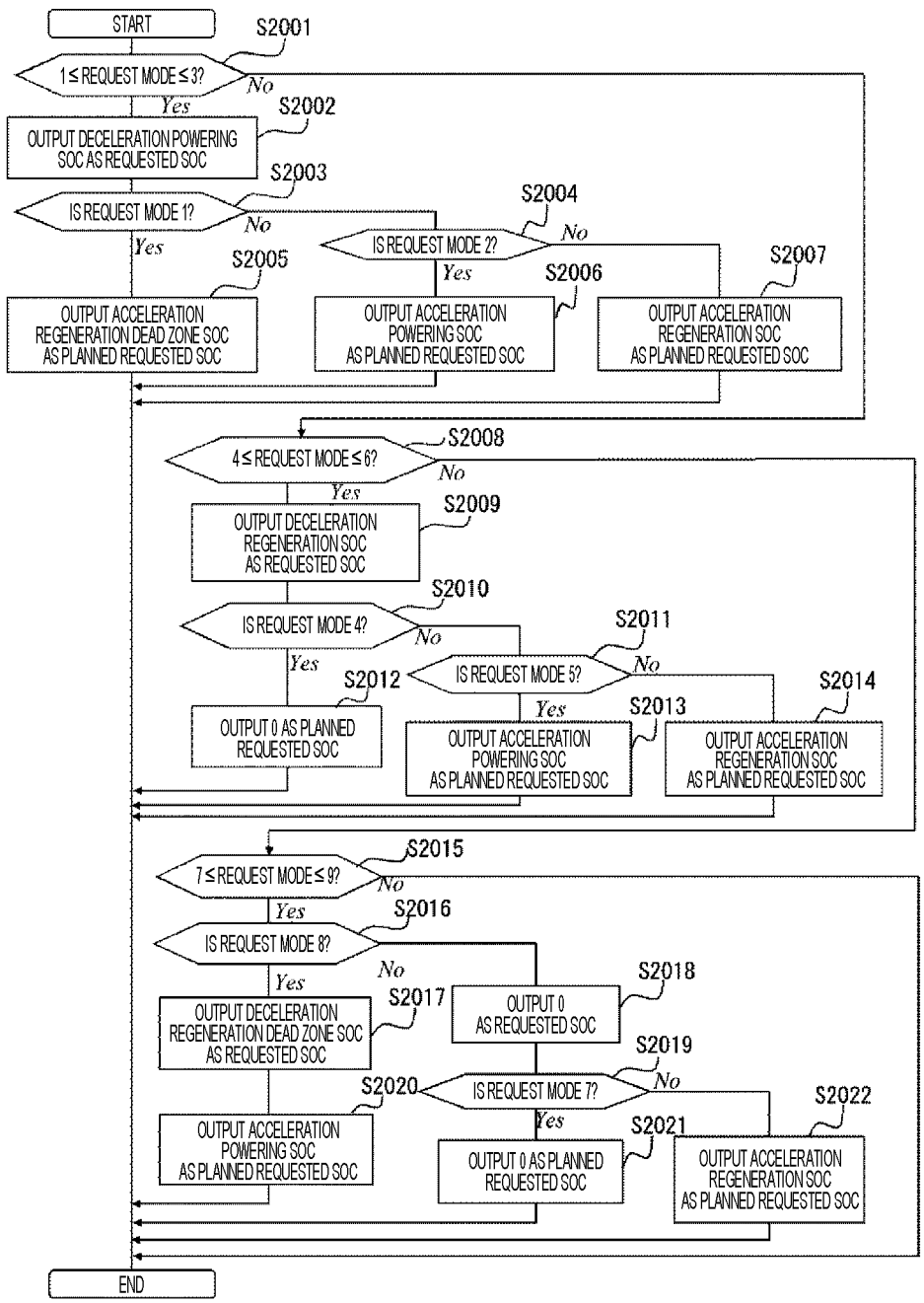
FIG. 20 is a flowchart for explaining details of step S1812.

FIG. 20 is a flowchart for explaining details of step S1812. This flowchart is to calculate a requested SOC at the time of deceleration traveling and a planned requested SOC at the next acceleration traveling. Each step of FIG. 20 is described below.

(FIG. 20: Step S2001)

The ISG assist torque calculation unit 803 determines whether or not the request mode is 1 or more and 3 or less. The process proceeds to step S2002 when the determination is established, otherwise the process proceeds to step S2008.

(FIG. 20: Step S2002)

In the ISG assist torque calculation unit 803, the ISG assist torque calculation unit 803 outputs the deceleration powering SOC as the requested SOC.

(FIG. 20: Step S2003)

The ISG assist torque calculation unit 803 determines whether or not the request mode is 1. The process proceeds to step S2005 when the determination is established, otherwise the process proceeds to step S2004.

(FIG. 20: Step S2004)

The ISG assist torque calculation unit 803 determines whether or not the request mode is 2. The process proceeds to step S2006 when the determination is established, otherwise the process proceeds to step S2007.

(FIG. 20: Steps S2005 to S2007)

In step S2005, the ISG assist torque calculation unit 803 outputs an acceleration regeneration dead zone SOC as the planned requested SOC. In step S2006, the ISG assist torque calculation unit 803 outputs the acceleration powering SOC as the planned requested SOC. In step S2007, the ISG assist torque calculation unit 803 outputs the acceleration regeneration SOC as the planned requested SOC.

(FIG. 20: Step S2008)

The ISG assist torque calculation unit 803 determines whether or not the request mode is 4 or more and 6 or less. The process proceeds to step S2009 when the determination is established, otherwise the process proceeds to step S2015.

(FIG. 20: Step S2009)

The ISG assist torque calculation unit 803 outputs the deceleration regeneration SOC as the requested SOC.

(FIG. 20: Step S2010)

The ISG assist torque calculation unit 803 determines whether or not the request mode is 4. The process proceeds to step S2012 when the determination is established, otherwise the process proceeds to step S2011.

(FIG. 20: Step S2011)

The ISG assist torque calculation unit 803 determines whether or not the request mode is 5 (S2012). The process proceeds to step S2013 when the determination is established, otherwise the process proceeds to step S2014.

(FIG. 20: Steps S2012 to S2014)

In step S2012, the ISG assist torque calculation unit 803 outputs 0 as the planned requested SOC. In step S2013, the ISG assist torque calculation unit 803 outputs the acceleration powering SOC as the planned requested SOC. In step S2014, the ISG assist torque calculation unit 803 outputs the acceleration regeneration SOC as the planned requested SOC.

(FIG. 20: Step S2015)

The ISG assist torque calculation unit 803 determines whether or not the request mode is 7 or more and 9 or less. The process proceeds to step S2016 when the determination is established, otherwise this flowchart is ended.

(FIG. 20: Step S2016)

The ISG assist torque calculation unit 803 determines whether or not the request mode is 8. The process proceeds to step S2017 when the determination is established, otherwise the process proceeds to step S2018.

(FIG. 20: Step S2017)

The ISG assist torque calculation unit 803 outputs the deceleration regeneration dead zone SOC as the requested SOC.

(FIG. 20: Step S2018)

The ISG assist torque calculation unit 803 outputs 0 as the requested SOC.

(FIG. 20: Step S2019)

The ISG assist torque calculation unit 803 determines whether or not the request mode is 7. The process proceeds to step S2021 when the determination is established, otherwise the process proceeds to step S2022.

(FIG. 20: Steps S2020 to S2022)

In step S2020, the ISG assist torque calculation unit 803 outputs the acceleration powering SOC as the planned requested SOC. In step S2021, the ISG assist torque calculation unit 803 outputs 0 as the planned requested SOC. In step S2022, the ISG assist torque calculation unit 803 outputs the acceleration regeneration SOC as the planned requested SOC.

FIG. 21 is a flowchart for explaining details of step S1813. This flowchart is to calculate a corrected requested SOC by using the requested SOC and the planned requested SOC. Each step of FIG. 21 is described below.

(FIG. 21: Step S2101)

The ISG assist torque calculation unit 803 adds the requested SOC and the planned requested SOC.

(FIG. 21: Step S2102)

The ISG assist torque calculation unit 803 subtracts an SOC control target value from the SOC. The SOC control target value may be determined in consideration of either one or both of prevention of output reduction of the battery 106 and securing of drivability by activation of the ISG 105.

(FIG. 21: Step S2103)

The ISG assist torque calculation unit 803 determines whether or not the addition value in step S2101 is equal to or lower than the subtraction value in step S2102. The process proceeds to step S2110 when the determination is established, otherwise the process proceeds to step S2104.

(FIG. 21: Step S2104)

The ISG assist torque calculation unit 803 subtracts the subtraction value of step S2102 from the addition value of step S2101.

(FIG. 21: Step S2105)

The ISG assist torque calculation unit 803 divides the subtraction value in step S2104 by a predetermined coefficient S. The predetermined coefficient S may be set to a value equal to or larger than 1, and may be determined in consideration of either one or both of prevention of output reduction of the battery 106 and securing of drivability by activation of the ISG 105, similarly to the above SOC control target value. Further, the predetermined coefficient S may be set for each request mode, and in this case, the predetermined coefficient S may be obtained by describing a value in advance as a table for each request engine mode and referring to this table.

(FIG. 21: Step S2106)

The ISG assist torque calculation unit 803 subtracts the division value of step S2105 from the requested SOC.

(FIG. 21: Step S2107)

The ISG assist torque calculation unit 803 determines whether or not the subtraction value in step S2106 is smaller than 0. The process proceeds to step S2108 when the determination is established, otherwise the process proceeds to step S2109.

(FIG. 21: Step S2108)

The ISG assist torque calculation unit 803 determines whether or not the follow-up traveling control region is 3. The process proceeds to step S2111 when the determination is established, otherwise the process proceeds to step S2112.

(FIG. 21: Steps S2109 to 2112)

In step S2109, the ISG assist torque calculation unit 803 outputs the subtraction value in step S2106 as the corrected requested SOC. In step S2110, the ISG assist torque calculation unit 803 outputs the requested SOC as the corrected requested SOC. In step S2111, the ISG assist torque calculation unit 803 outputs the acceleration regeneration dead zone SOC as the corrected requested SOC. In step S2111, the ISG assist torque calculation unit 803 outputs the deceleration regeneration dead zone SOC as the corrected requested SOC.

(FIG. 21: Steps S2113 to 2114)

In step S2113, the ISG assist torque calculation unit 803 determines not to execute forced regeneration. In step S2114, the ISG assist torque calculation unit 803 determines to execute forced regeneration. These determination results are outputted as forced regeneration execution determination values.

FIG. 22 is a view illustrating processing images of steps S2101 to S2110, and is a view showing changes of the SOC at the start of traveling and the SOC at the end of traveling between the start of acceleration traveling and the end of deceleration traveling, or between the start of deceleration traveling to the end of acceleration traveling, which is one cycle in the follow-up traveling mode.

FIG. 22(A) is an example of a correction method for the SOC at the start of traveling in a case of the request mode 1. In this mode, since powering and dead zone regeneration of the ISG 105 are performed during one cycle of the SOC, the SOC may fall below the target value at the end of one cycle, as shown in the figure on the left of FIG. 22(A). On the other hand, as shown in the figure on the right, by correcting a powering amount of the ISG 105 as the corrected requested SOC, the SOC at the end can be controlled to be equal to or higher than the target value.

FIG. 22(B) is an example of a correction method for the SOC at the start of traveling in a case of the request mode 2. In this mode, since powering of the ISG 105 is continuously performed during one cycle of the SOC, the SOC may fall below the target value at the end of one cycle, as shown in the figure on the left of FIG. 11(B). On the other hand, as shown in the figure on the right, by correcting a powering amount of the ISG 105 as the corrected requested SOC, the SOC at the end can be controlled to be equal to or higher than the target value.

FIG. 22 (C) is an example of a correction method based on forced regeneration execution determination when the SOC at the start of traveling is lower than the target value. In this case, even when there is no increase or decrease of the SOC during one cycle of the SOC, the SOC at the end of traveling remains below the target value. On the other hand, as shown in the figure on the right, by outputting the dead zone regeneration SOC as the corrected requested SOC, it is possible to control the SOC at the end to be equal to or higher than a target value, by causing regeneration of the SOC in a state without affecting drivability.

FIG. 23 is a flowchart for explaining details of step S1814. This flowchart is to calculate an assist torque by powering or regeneration of the ISG 105. Each step of FIG. 23 is described below.

(FIG. 23: Step S2301)

The ISG assist torque calculation unit 803 calculates a powering assist maximum torque by using the requested engine speed. The powering assist maximum torque may be obtained by describing a value in advance as a table for each requested engine speed and referring to this table.

(FIG. 23: Step S2302)

The ISG assist torque calculation unit 803 calculates a regeneration assist maximum torque by using the requested engine speed. The regeneration assist maximum torque may be obtained by describing a value in advance as a table for each requested engine speed and referring to this table.

(FIG. 23: Step S2303)

The ISG assist torque calculation unit 803 determines whether or not the forced regeneration execution determination value is established. The process skips to step S2306 when the determination is established, otherwise the process proceeds to step S2304.

(FIG. 23: Step S2304)

The ISG assist torque calculation unit 803 determines whether or not the request mode is any one of 4 to 6 or 8.

The process proceeds to step S2306 when the determination is established, otherwise the process proceeds to step S2305 otherwise.

(FIG. 23: Step S2305)

The ISG assist torque calculation unit 803 determines whether or not the request mode is 1 or more and 3 or less. The process proceeds to step S2307 when the determination is established, otherwise this flowchart is ended.

(FIG. 23: Steps S2306 and S2307)

In step S2306, the ISG assist torque calculation unit 803 calculates a regeneration assistable torque by using the corrected requested SOC. The regeneration assistable torque may be obtained by describing a value in advance as a table for each corrected requested SOC and referring to this table. In step S2307, the ISG assist torque calculation unit 803 calculates a powering assistable torque by using the corrected requested SOC. The powering assistable torque may be obtained by describing a value in advance as a table for each corrected requested SOC and referring to this table.

(FIG. 23: Steps S2308 and S2309)

In step S2308, the ISG assist torque calculation unit 803 compares an absolute value of the regeneration assist maximum torque with an absolute value of the regeneration assistable torque, and outputs the smaller one as the regenerative torque. In step S2309, the ISG assist torque calculation unit 803 compares an absolute value of the powering assist maximum torque with an absolute value of the powering assistable torque, and outputs the smaller one as the powering torque.

Figure 24:
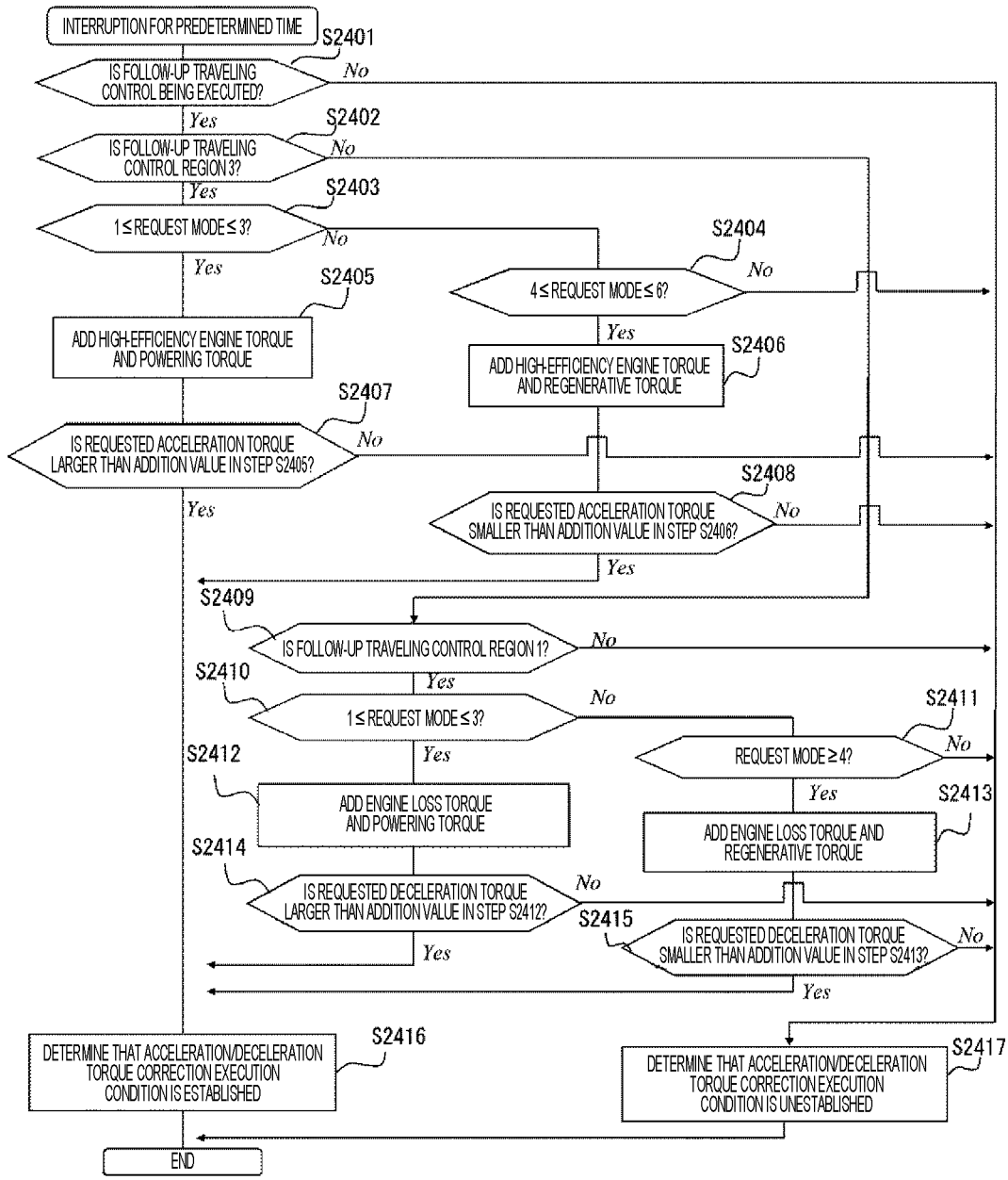
FIG. 24 is a flowchart for explaining an operation of an acceleration/deceleration torque correction determination unit 804.

FIG. 24 is a flowchart for explaining an operation of the acceleration/deceleration torque correction determination unit 804.

The acceleration/deceleration torque correction determination unit 804 executes this flowchart by, for example, interruption processing at predetermined time intervals. Each step of FIG. 24 is described below.

(FIG. 24: Step S2401)

The acceleration/deceleration torque correction determination unit 804 determines whether or not follow-up traveling control is being executed.

The process proceeds to step S2402 when the determination is established, otherwise the process proceeds to step S2417.

(FIG. 24: Step S2402)

The acceleration/deceleration torque correction determination unit 804 determines whether or not the follow-up traveling control region is 3.

The process proceeds to step S2403 when the determination is established, otherwise the process proceeds to step S2409.

(FIG. 24: Step S2403)

The acceleration/deceleration torque correction determination unit 804 determines whether or not the request mode is 1 or more and 3 or less. The process proceeds to step S2405 when the determination is established, otherwise the process proceeds to step S2404.

(FIG. 24: Step S2404)

The acceleration/deceleration torque correction determination unit 804 determines whether or not the request mode is 4 or more and 6 or less. The process proceeds to step S2406 when the determination is established, otherwise the process proceeds to step S2417.

(FIG. 24: Steps S2405 and S2406)

In step S2405, the acceleration/deceleration torque correction determination unit 804 adds the powering torque to the high-efficiency engine torque. In step S2406, the acceleration/deceleration torque correction determination unit 804 adds the regenerative torque to the high-efficiency engine torque.

(FIG. 24: Step S2407)

The acceleration/deceleration torque correction determination unit 804 determines whether or not the requested acceleration torque is larger than the addition value in step S2405. The process proceeds to step S2416 when the determination is established, otherwise the process proceeds to step S2417.

(FIG. 24: Step S2408)

The acceleration/deceleration torque correction determination unit 804 determines whether or not the requested acceleration torque is smaller than the addition value in step S2406. The process proceeds to step S2416 when the determination is established, otherwise the process proceeds to step S2417.

(FIG. 24: Step S2409)

The acceleration/deceleration torque correction determination unit 804 determines whether or not the follow-up traveling control region is 1.

The process proceeds to step S2410 when the determination is established, otherwise the process proceeds to step S2417.

(FIG. 24: Step S2410)

The acceleration/deceleration torque correction determination unit 804 determines whether or not the request mode is 1 or more and 3 or less. The process proceeds to step S2412 when the determination is established, otherwise the process proceeds to step S2411.

(FIG. 24: Step S2411)

The acceleration/deceleration torque correction determination unit 804 determines whether or not the request mode is 4 or more and 6 or less. The process proceeds to step S2413 when the determination is established, otherwise the process proceeds to step S2417.

(FIG. 24: Steps S2412 and S2413)

In step S2412, the acceleration/deceleration torque correction determination unit 804 adds the powering torque to the engine loss torque. In step S2413, the acceleration/deceleration torque correction determination unit 804 adds the regenerative torque to the engine loss torque.

(FIG. 24: Step S2414)

The acceleration/deceleration torque correction determination unit 804 determines whether or not the requested deceleration torque is larger than the addition value of step S2412. The process proceeds to step S2416 when the determination is established, otherwise the process proceeds to step S2417.

(FIG. 24: Step S2415)

The acceleration/deceleration torque correction determination unit 804 determines whether or not the requested deceleration torque is smaller than the addition value of step S2413. The process proceeds to step S2416 when the determination is established, otherwise the process proceeds to step S2417.

(FIG. 24: Steps S2416 and S2417)

In step S2416, the acceleration/deceleration torque correction determination unit 804 determines to execute acceleration/deceleration torque correction. In step S2417, the acceleration/deceleration torque correction determination unit 804 determines not to execute acceleration/deceleration torque correction. These determination results are outputted as acceleration/deceleration torque correction determination values.

Figure 25:
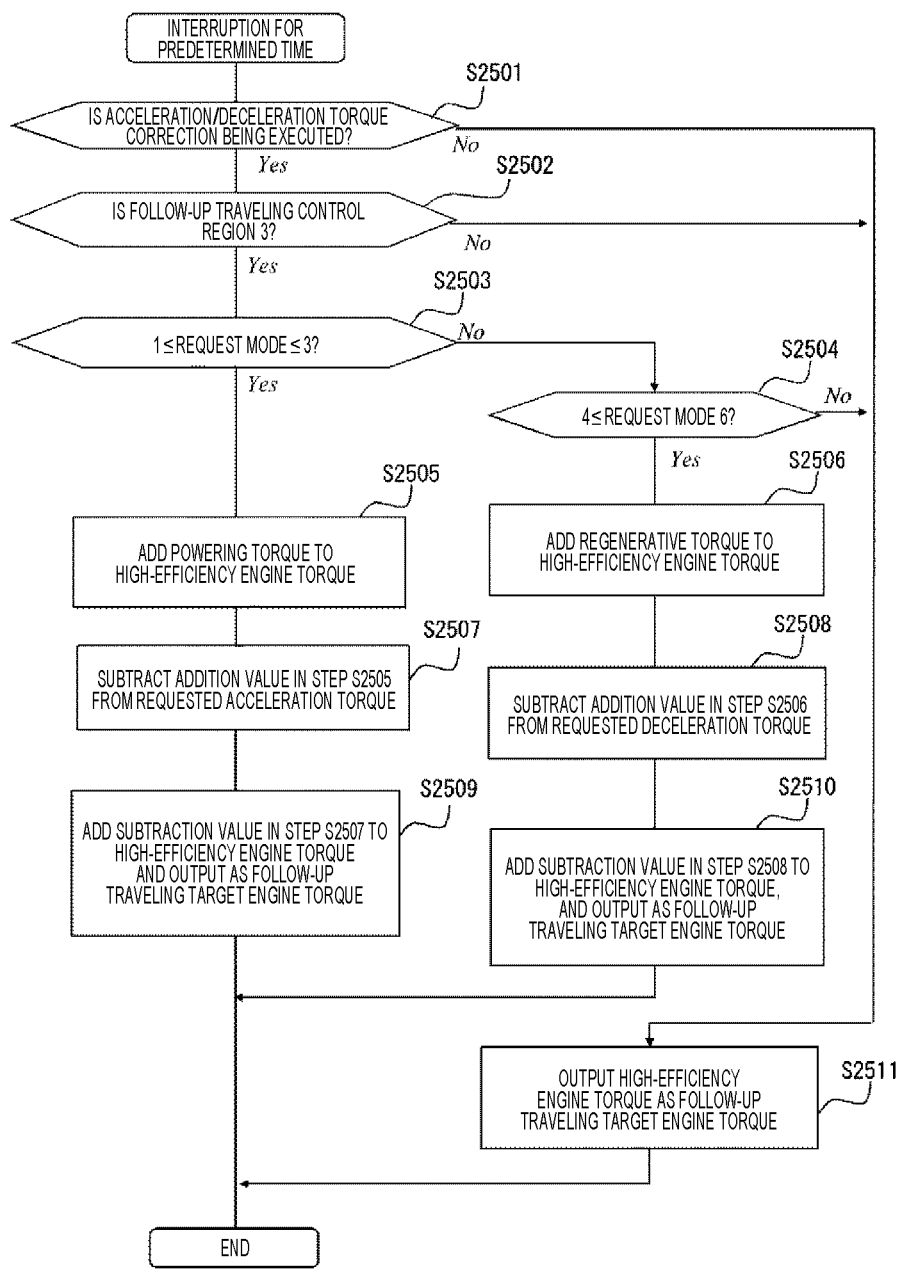
FIG. 25 is a flowchart for explaining an operation of a follow-up traveling control target engine torque calculation unit 805.

FIG. 25 is a flowchart for explaining an operation of the follow-up traveling control target engine torque calculation unit 805. The follow-up traveling control target engine torque calculation unit 805 executes this flowchart by, for example, interruption processing at predetermined time intervals. Each step of FIG. 25 is described below.

(FIG. 25: Step S2501)

The follow-up traveling control target engine torque calculation unit 805 determines whether or not acceleration/deceleration torque correction is being executed. The process proceeds to step S2502 when the determination is established, otherwise the process proceeds to step S2511.

(FIG. 25: Step S2502)

The follow-up traveling control target engine torque calculation unit 805 determines whether or not the follow-up traveling control region is 3. The process proceeds to step S2503 when the determination is established, otherwise the process proceeds to step S2511.

(FIG. 25: Step S2503)

The follow-up traveling control target engine torque calculation unit 805 determines whether or not the request mode is 1 or more and 3 or less. The process proceeds to step S2505 when the determination is established, otherwise the process proceeds to step S2504.

(FIG. 25: Step S2504)

The follow-up traveling control target engine torque calculation unit 805 determines whether or not the request mode is 4 or more and 6 or less. The process proceeds to step S2506 when the determination is established, otherwise the process proceeds to step S2511.

(FIG. 25: Steps S2505 and S2506)

In step S2505, the follow-up traveling control target engine torque calculation unit 805 adds the powering torque to the high-efficiency engine torque. In step S2506, the follow-up traveling control target engine torque calculation unit 805 adds the regenerative torque to the high-efficiency engine torque.

(FIG. 25: Steps S2507 and S2508)

In step S2507, the follow-up traveling control target engine torque calculation unit 805 subtracts the addition value of step S2505 from the requested acceleration torque. In step S2508, the follow-up traveling control target engine torque calculation unit 805 subtracts the addition value of step S2506 from the requested acceleration torque.

(FIG. 25: Steps S2509 and S2510)

In step S2509, the follow-up traveling control target engine torque calculation unit 805 outputs the addition value of the subtraction value in step S2507 and the high-efficiency engine torque, as a follow-up traveling target engine torque. In step S2510, the follow-up traveling control target engine torque calculation unit 805 outputs the addition value of the subtraction value in step S2508 and the high-efficiency engine torque, as the follow-up traveling target engine torque.

(FIG. 25: Step S2511)

The follow-up traveling control target engine torque calculation unit 805 outputs the high-efficiency engine torque as the follow-up traveling target engine torque.

Figure 26:
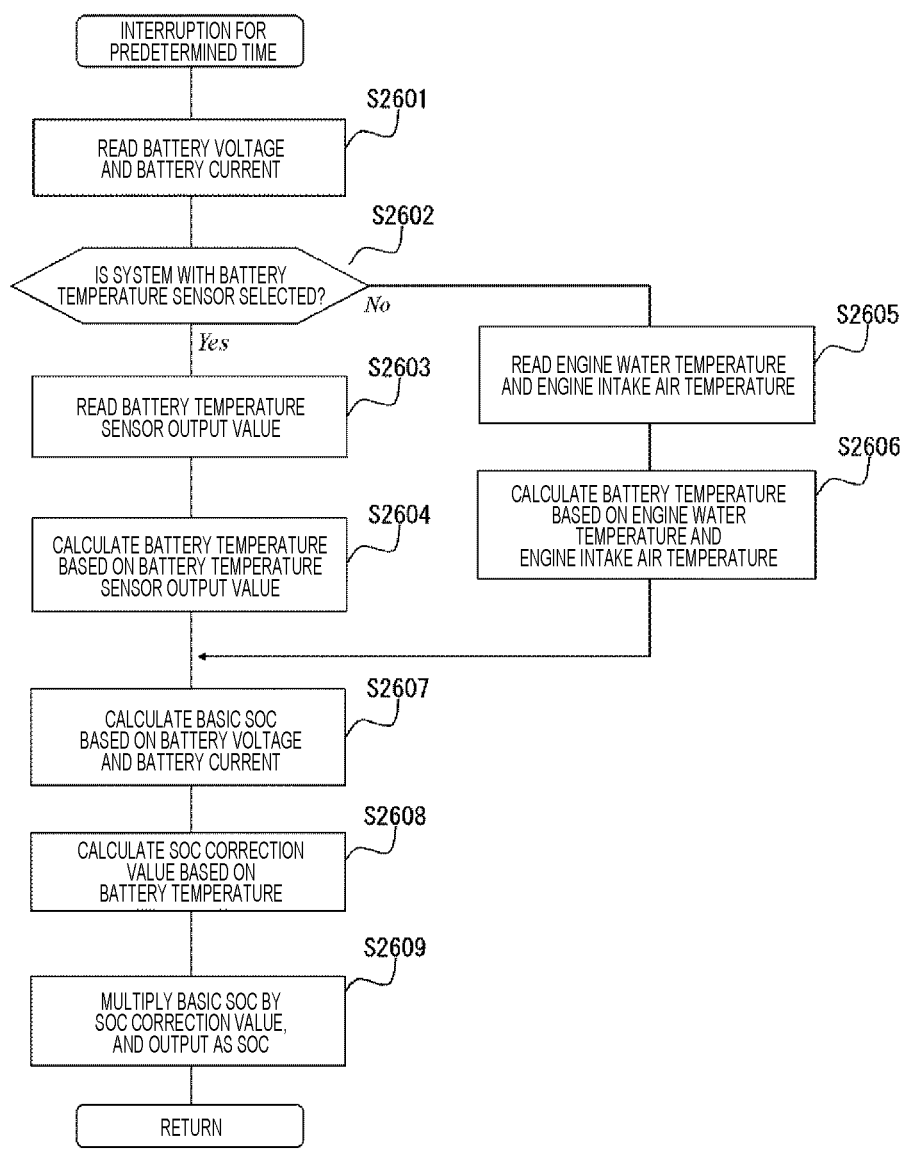
FIG. 26 is a flowchart for explaining an operation of an SOC calculation unit 603.

FIG. 26 is a flowchart for explaining an operation of the SOC calculation unit 603. The SOC calculation unit 603 executes this flowchart by, for example, interruption processing at predetermined time intervals.

Each step of FIG. 26 is described below.

(FIG. 26: Step S2601)

The SOC calculation unit 603 reads a battery voltage and a battery current.

(FIG. 26: Step S2602)

The SOC calculation unit 603 determines whether or not a system with a battery temperature sensor is selected, on the basis of a system selection signal. The process proceeds to step S2603 when the determination is established, otherwise the process proceeds to step S2605.

(FIG. 26: Steps S2603 and S2604)

In step 2603, the SOC calculation unit 603 reads a battery temperature sensor output value. In step 2604, the SOC calculation unit 603 calculates a battery temperature from the battery temperature sensor output value.

(FIG. 26: Steps S2605 and S2606)

In step 2605, the SOC calculation unit 603 reads an engine water temperature and an engine intake air temperature. In step 2606, the SOC calculation unit 603 calculates a battery temperature by using the engine water temperature and the engine intake air temperature. The battery temperature may be obtained by setting and describing a value in advance for each set of an engine water temperature and an engine intake air temperature as a map and referring to the map.

(FIG. 26: Step S2607)

The SOC calculation unit 603 calculates a basic SOC by using the battery voltage and the battery current. The basic SOC may be obtained by setting and describing a value in advance for each set of a battery voltage and a battery current as a map and referring to this map.

(FIG. 26: Step S2608)

The SOC calculation unit 603 calculates an SOC correction value by using the battery temperature. The SOC correction value may be obtained by describing a value in advance as a table for each battery temperature and referring to this table.

(FIG. 26: Step S2609)

The SOC calculation unit 603 multiplies the basic SOC by the SOC correction value, and outputs as the SOC.

Figure 27:
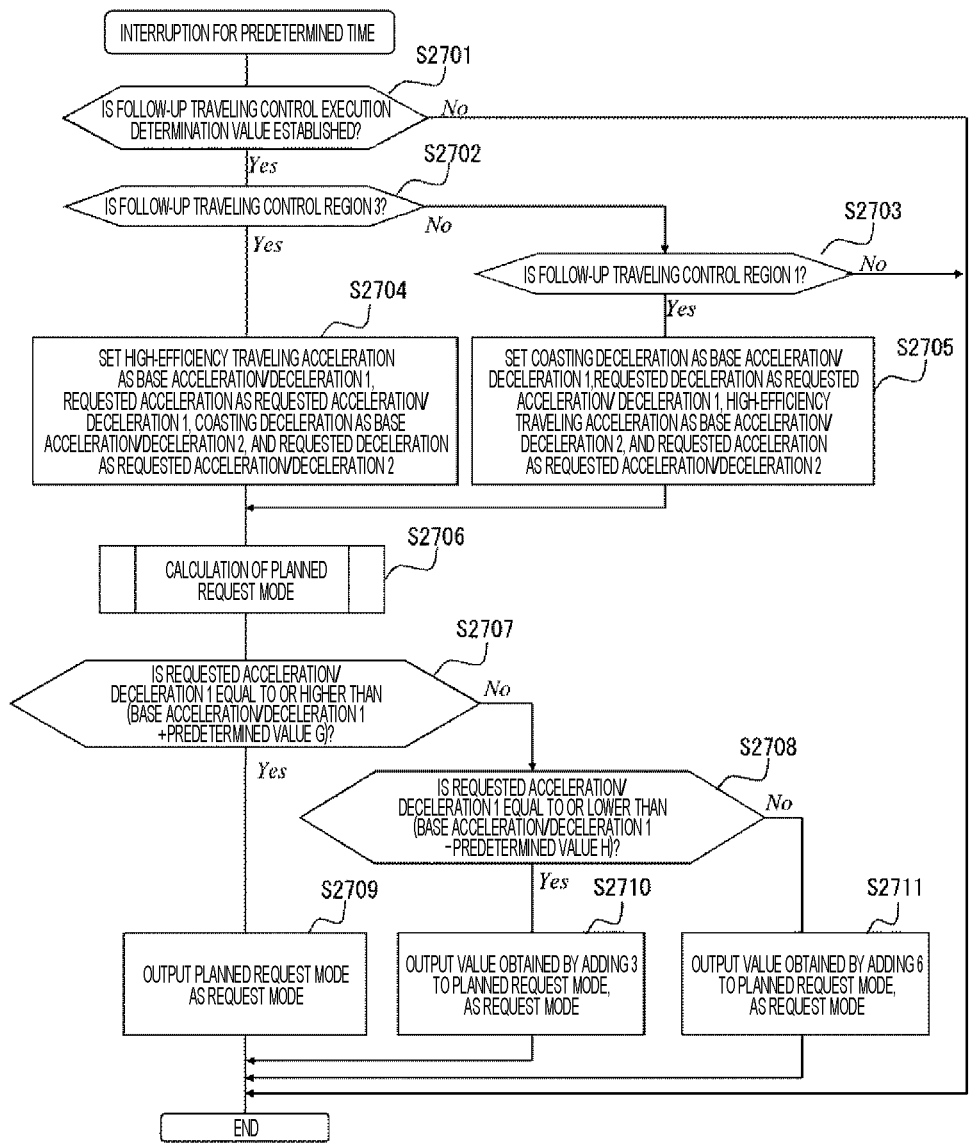
FIG. 27 is a flowchart for explaining an operation of a request mode calculation unit 604.

FIG. 27 is a flowchart for explaining an operation of the request mode calculation unit 604. The request mode calculation unit 604 executes this flowchart by, for example, interruption processing at predetermined time intervals. Each step of FIG. 27 is described below.

(FIG. 27: Step S2701)

The request mode calculation unit 604 determines whether or not the follow-up traveling control execution determination value is established.

The process proceeds to step S2702 when the determination is established, otherwise this flowchart is ended.

(FIG. 27: Step S2702)

The request mode calculation unit 604 determines whether or not the follow-up traveling control region is 3. The process proceeds to step S2704 when the determination is established, otherwise the process proceeds to step S2703.

(FIG. 27: Step S2703)

The request mode calculation unit 604 determines whether or not the follow-up traveling control region is 1. The process proceeds to step S2705 when the determination is established, otherwise this flowchart is ended.

(FIG. 27: Steps S2704 and S2705)

In step S2704, the request mode calculation unit 604 individually sets a high-efficiency traveling acceleration as a base acceleration/deceleration 1, a requested acceleration as a requested acceleration/deceleration 1, a coasting deceleration as a base acceleration/deceleration 2, and a requested deceleration as a requested acceleration/deceleration 2. The coasting deceleration can be calculated in accordance with the following Equation 2 with the above Equation 1 as a base.

[Formula 2]

$$\alpha_s = -\frac{1}{M}C_d S V^2 - \mu g - g\sin\theta \quad \text{(Equation 2)}$$

Here, $\alpha_s$ represents a coasting deceleration, M represents a vehicle weight, $C_d$ represents an air resistance coefficient, S represents a front projection area, V represents a vehicle speed, p represents a rolling resistance coefficient, g represents an acceleration of gravity, and θ represents a road surface gradient. In step S2705, the request mode calculation unit 604 individually sets a coasting deceleration as the base acceleration/deceleration 1, a requested deceleration as the requested acceleration/deceleration 1, a high-efficiency traveling acceleration as the base acceleration/deceleration 2, and a requested acceleration as the requested acceleration/deceleration 2.

(FIG. 27: Step S2706)

Figure 28:
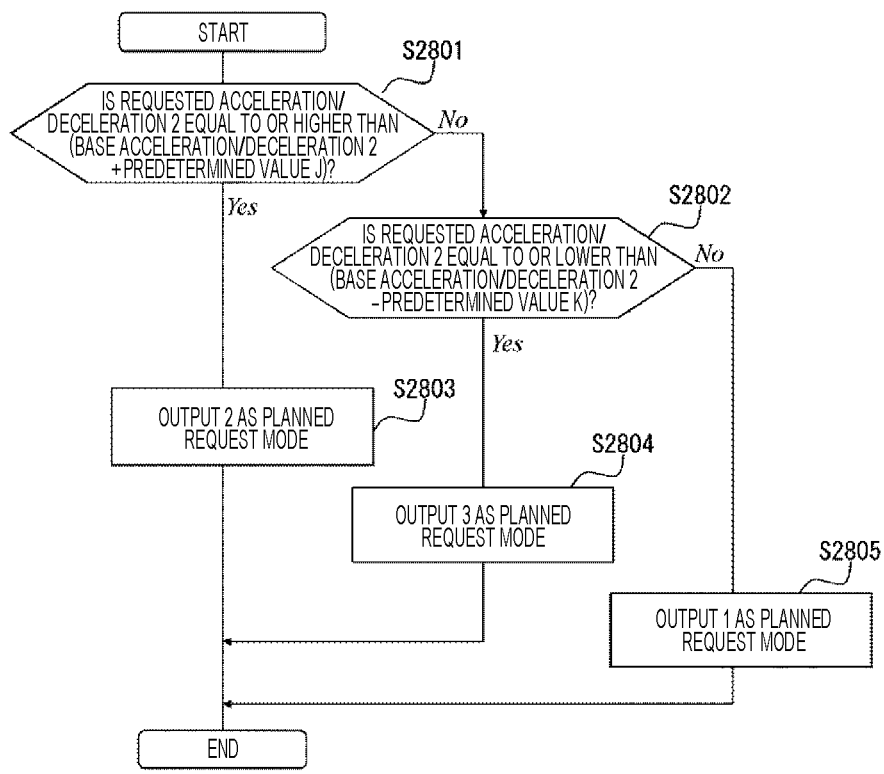
FIG. 28 is a flowchart for explaining details of step S2706.

The request mode calculation unit 604 calculates a planned request mode. Details of the calculation of the planned request mode are shown in the flowchart of FIG. 28.

(FIG. 27: Step S2707)

The request mode calculation unit 604 determines whether or not the requested acceleration/deceleration 1 is equal to or higher than (base acceleration/deceleration 1+predetermined value G). The process proceeds to step S2709 when the determination is established, otherwise the process proceeds to step S2708. The predetermined value G is a value that can be determined that, for example, an increase of acceleration or a decrease of deceleration is certainly requested for the base acceleration/deceleration 1.

(FIG. 27: Step S2708)

The request mode calculation unit 604 determines whether or not the requested acceleration/deceleration 1 is equal to or lower than (base acceleration/deceleration 1−predetermined value H). The process proceeds to step S2710 when the determination is established, otherwise the process proceeds to step S2711. The predetermined value H is a value that can be determined that, for example, a decrease of acceleration or an increase of deceleration is certainly requested for the base acceleration/deceleration 1.

(FIG. 27: Steps S2709 to S2711)

In step S2709, the request mode calculation unit 604 outputs a planned request mode, as the request mode. In step S2710, the request mode calculation unit 604 outputs a value obtained by adding 3 to the planned request mode, as the request mode. In step 2711, the request mode calculation unit 604 outputs a value obtained by adding 6 to the planned request mode, as the request mode.

FIG. 28 is a flowchart for explaining details of step S2706. This flowchart is to calculate the acceleration/deceleration requested in the next traveling mode, as the planned request mode. Each step of FIG. 28 is described below.

(FIG. 28: Step S2801)

The request mode calculation unit 604 determines whether or not the requested acceleration/deceleration 2 is equal to or higher than (base acceleration/deceleration 2+predetermined value J). The process proceeds to step S2803 when the determination is established, otherwise the process proceeds to step S2802. The predetermined value J is a value that can be determined that, for example, those such as an increase of acceleration or a decrease of deceleration are certainly requested for the base acceleration/deceleration 2, and may be the same value as the predetermined value G of step S2707.

(FIG. 28: Step S2802)

The request mode calculation unit 604 determines whether or not the requested acceleration/deceleration 2 is equal to or lower than (base acceleration/deceleration 2−predetermined value K). The process proceeds to step S2804 when the determination is established, otherwise the process proceeds to step S2805. The predetermined value K is a value that can be determined that, for example, those such as a decrease of acceleration or an increase of deceleration are certainly requested for the base acceleration/deceleration 2, and may be the same value as the predetermined value H of step S2708.

(FIG. 28: Steps S2803 to S2805)

In step 2803, the request mode calculation unit 604 outputs 2 as the planned request mode. In step 2804, the request mode calculation unit 604 outputs 3 as the planned request mode. In step 2805, the request mode calculation unit 604 outputs 1 as the planned request mode.

FIG. 29 is a table showing request modes calculated by the request mode calculation unit 604. The ECU 110 individually determines that, firstly, the current traveling mode is acceleration and the next traveling mode is deceleration when the follow-up traveling control region is 3, and that the current traveling mode is deceleration and the next traveling mode is acceleration when the follow-up traveling control region is 1. Next, the request mode is determined from the presence or absence of the requested acceleration/deceleration in each traveling mode and the increase/decrease amount, and the ISG 105 is controlled on the basis of this mode.

Figure 30:
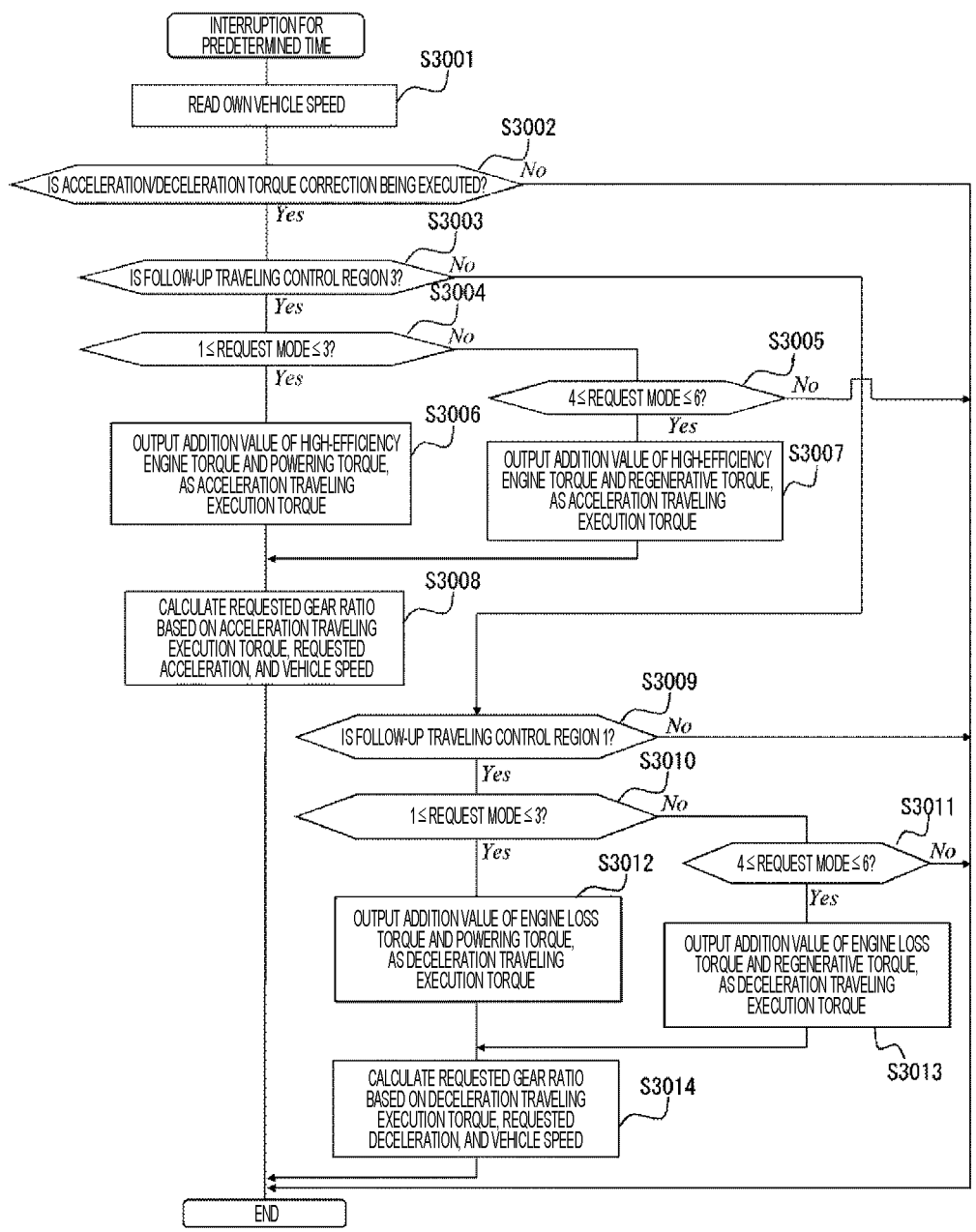
FIG. 30 is a flowchart for explaining an operation of a requested gear ratio calculation unit 901.

FIG. 30 is a flowchart for explaining an operation of the requested gear ratio calculation unit 901. The requested gear ratio calculation unit 901 executes this flowchart by, for example, interruption processing at predetermined time intervals. Each step of FIG. 30 is described below.

(FIG. 30: Step S3001)

The requested gear ratio calculation unit 901 reads an own vehicle speed.

(FIG. 30: Step S3002)

The requested gear ratio calculation unit 901 determines whether or not acceleration/deceleration torque correction is being performed. The process proceeds to step S3003 when the determination is established, otherwise this flowchart is ended.

(FIG. 30: Step S3003)

The requested gear ratio calculation unit 901 determines whether or not the follow-up traveling control region is 3. The process proceeds to step S3004 when the determination is established, otherwise the process proceeds to step S3009.

(FIG. 30: Step S3004)

The requested gear ratio calculation unit 901 determines whether or not the request mode is 1 or more and 3 or less. The process proceeds to step S3006 when the determination is established, otherwise the process proceeds to step S3005.

(FIG. 30: Step S3005)

The requested gear ratio calculation unit 901 determines whether or not the request mode is 4 or more and 6 or less. The process proceeds to step S3007 when the determination is established, otherwise this flowchart is ended.

(FIG. 30: Steps S3006 and S3007)

In step S3006, the requested gear ratio calculation unit 901 outputs an addition value of the high-efficiency engine torque and the powering torque, as an acceleration traveling execution torque. In step S3007, the requested gear ratio calculation unit 901 outputs an addition value of the high-efficiency engine torque and the regenerative torque, as the acceleration traveling execution torque.

(FIG. 30: Step S3008)

The requested gear ratio calculation unit 901 calculates the requested gear ratio by using the acceleration traveling execution torque, the requested acceleration, and the own vehicle speed. The requested gear ratio can be calculated, for example, in accordance with the above Equation 1.

(FIG. 30: Step S3009)

The requested gear ratio calculation unit 901 determines whether or not the follow-up traveling control region is 1. The process proceeds to step S3010 when the determination is established, otherwise this flowchart is ended.

(FIG. 30: Step S3010)

The requested gear ratio calculation unit 901 determines whether or not the request mode is 1 or more and 3 or less. The process proceeds to step S3012 when the determination is established, otherwise the process proceeds to step S3011.

(FIG. 30: Step S3011)

The requested gear ratio calculation unit 901 determines whether or not the request mode is 4 or more and 6 or less. The process proceeds to step S3013 when the determination is established, otherwise this flowchart is ended.

(FIG. 30: Steps S3012 and S3013)

In step S3012, the requested gear ratio calculation unit 901 outputs an addition value of the engine loss torque and the powering torque, as a deceleration traveling execution torque. In step S3013, the requested gear ratio calculation unit 901 outputs an addition value of the engine loss torque and the regenerative torque, as the deceleration traveling execution torque.

(FIG. 30: Step S3014)

The requested gear ratio calculation unit 901 calculates the requested gear ratio by using the deceleration traveling execution torque, the requested deceleration, and the own vehicle speed. Similarly to step S3008, the requested gear ratio can be calculated in accordance with the above Equation 1.

Figure 31:
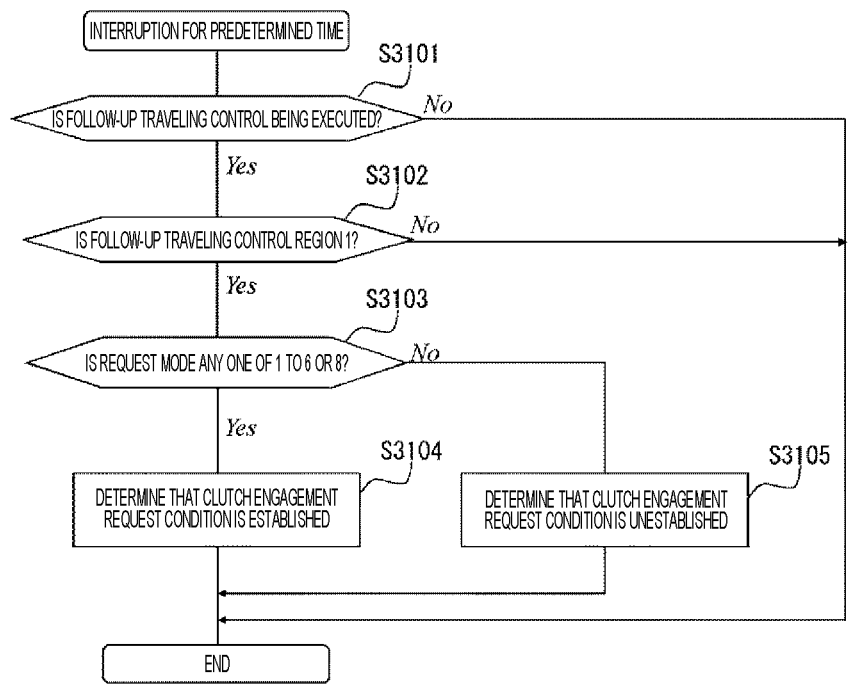
FIG. 31 is a flowchart for explaining an operation of a clutch engagement request determination unit 902.

FIG. 31 is a flowchart for explaining an operation of the clutch engagement request determination unit 902. The clutch engagement request determination unit 902 executes this flowchart by, for example, interruption processing at predetermined time intervals. Each step of FIG. 31 is described below.

(FIG. 31: Step S3101)

The clutch engagement request determination unit 902 determines whether or not follow-up traveling control is being executed. The process proceeds to step S3102 when the determination is established, otherwise this flowchart is ended.

(FIG. 31: Step S3102)

The clutch engagement request determination unit 902 determines whether or not the follow-up traveling control region is 1. The process proceeds to step S3103 when the determination is established, otherwise this flowchart is ended.

(FIG. 31: Step S3103)

The clutch engagement request determination unit 902 determines whether or not the request mode is any one of 1 to 6 or 8. The process proceeds to step S3104 when the determination is established, otherwise the process proceeds to S3105.

(FIG. 31: Steps S3104 and S3105)

In step 3104, the clutch engagement request determination unit 902 determines to execute a clutch engagement request. In step 3105, the clutch engagement request determination unit 902 determines not to request clutch engagement. The clutch engagement request determination unit 902 outputs these determination results as clutch engagement request determination values.

Figure 32:
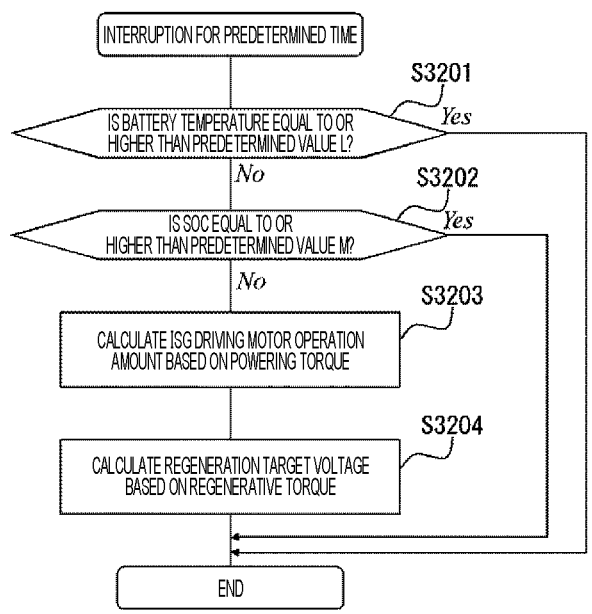
FIG. 32 is a flowchart for explaining an operation of an ISG control unit 606.

FIG. 32 is a flowchart for explaining an operation of the ISG control unit 606.

The ISG control unit 606 executes this flowchart by, for example, interruption processing at predetermined time intervals.

Each step of FIG. 32 is described below.

(FIG. 32: Step S3201)

The ISG control unit 606 determines whether or not a battery temperature is equal to or higher than a predetermined value L.

This flowchart is ended when the determination is established, otherwise the process proceeds to step S3202. The predetermined value L is determined on the basis of a value determined that deterioration of the battery 106 is accelerated when the ISG 105 is activated with the battery temperature being in a high temperature state.

(FIG. 32: Step S3202)

The ISG control unit 606 determines whether or not the SOC is equal to or higher than a predetermined value M. This flowchart is ended when the determination is established, otherwise the process proceeds to step S3203. The predetermined value M is determined on the basis of a value determined that deterioration of the battery 106 is accelerated when the ISG 105 is activated with the battery being in a high voltage state.

(FIG. 32: Step S3203)

The ISG control unit 606 calculates an ISG driving motor operation amount by using the powering torque. The ISG driving motor operation amount may be obtained by describing a value in advance as a table for each powering torque and referring to this table.

(FIG. 32: Step S3204)

The ISG control unit 606 calculates a regeneration target voltage by using the regenerative torque. The regeneration target voltage may be obtained by describing a value in advance as a table for each regenerative torque and referring to this table. The ECU 110 drives the ISG 105 from the crankshaft 107 such that a voltage of the battery 106 becomes the regeneration target voltage.

Figure 33:
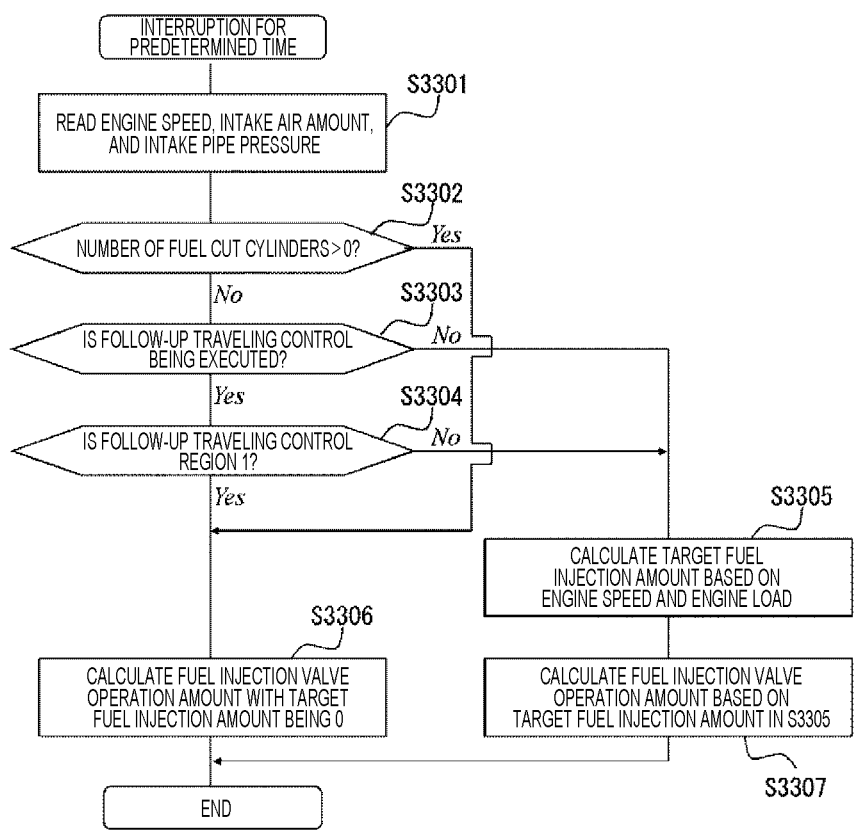
FIG. 33 is a flowchart for explaining an operation of a fuel injection amount control unit 608.

FIG. 33 is a flowchart for explaining an operation of the fuel injection amount control unit 608. The fuel injection amount control unit 608 executes this flowchart by, for example, interruption processing at predetermined time intervals. Each step of FIG. 33 is described below.

(FIG. 33: Step S3301)

The fuel injection amount control unit 608 reads an engine speed, an intake air amount, and an intake pipe pressure.

(FIG. 33: Step S3302)

The fuel injection amount control unit 608 determines whether or not the number of fuel cut cylinders is larger than 0. The process skips to step S3306 when the determination is established, otherwise the process proceeds to step S3303.

(FIG. 33: Step S3303)

The fuel injection amount control unit 608 determines whether or not the follow-up traveling control is being executed. The process proceeds to step S3304 when the determination is established, otherwise the process proceeds to step S3305.

(FIG. 33: Step S3304)

The fuel injection amount control unit 608 determines whether or not the follow-up traveling control region is 1.

The process proceeds to step S3306 when the determination is established, otherwise the process proceeds to step S3305.

(FIG. 33: Step S3305)

The fuel injection amount control unit 608 calculates a target fuel injection amount by using the engine speed and the engine load. The target fuel injection amount can be obtained by, for example, setting and describing a value in advance for each set of an engine speed and an engine load as a map and referring to this map. It is possible to use, as the engine load, one obtained by converting an output of the intake pipe pressure sensor installed in the intake pipe into an intake pipe pressure, or an intake air amount measured by the intake air amount sensor.

(FIG. 33: Steps S3306 and S3307)

In step S3306, the fuel injection amount control unit 608 calculates a fuel injection valve operation amount with the target fuel injection amount being 0, and controls the fuel injection amount of the engine on the basis of this operation amount. In step S3307, the fuel injection amount control unit 608 calculates a fuel injection valve operation amount by using the target fuel injection amount calculated in step S3305, and controls the fuel injection amount of the engine on the basis of this operation amount.

As described above, the vehicle control device according to the present embodiment has the ISG 105 connected to the engine 101, and the battery 106 connected to the ISG 105. Then, the vehicle control device has the ISG control unit 606 that performs at least one of: supplying power from the battery 106 to the motor of the ISG 105 to rotationally drive the ISG 105; or driving the ISG 105 to generate power in order to charge the battery 106. Then, after starting acceleration traveling so as to achieve a target vehicle speed determined on the basis of a follow-up traveling control target engine torque calculated by the follow-up traveling control target engine torque calculation unit 805 in one cycle of a traveling mode until completion of deceleration traveling, the ISG assist torque calculation unit 803 calculates a powering torque or a regenerative torque such that the SOC of the battery 106 falls within a set range at completion of the deceleration traveling, and the traveling acceleration/deceleration in one cycle falls within a requested acceleration/deceleration calculated by the requested acceleration/deceleration torque calculation unit 801, and the ISG control unit 606 drives the ISG 105 on the basis of the calculated powering torque or regenerative torque. As a result, the ISG 105 assists the driving torque by the engine of the own vehicle 100.

According to the above configuration, when a request for increasing the acceleration occurs in the follow-up traveling mode in FIG. 4, the ISG control unit 606 controls the ISG 105 by an ISG operation command quantity 420. This control enables torque assist by the ISG 105, so that the vehicle driving torque 406 can be realized with a target engine torque 419 being the set value of the high-efficiency engine torque. Therefore, acceleration of the request can be realized and drivability can be improved, without deterioration of fuel consumption. Furthermore, in switching from acceleration traveling to deceleration traveling at a time 417, in a case where the SOC 421 of the battery 106 decreases and falls below the SOC control target value 422 due to the assist (powering) of the ISG 105 before switching, the SOC 421 is increased during deceleration traveling after switching. For this purpose, the SOC 421 is controlled to be equal to or higher than the control target value 422, by causing the ISG 105 to generate power (regenerate) with the ISG operation command quantity 420<0, while keeping a clutch engagement command 418 ON. This control can prevent decrease of the SOC, enables suitable operation of each electrical component of the vehicle 100, and can ensure activation of the ISG 105 in a case where assistance of the ISG 105 is required in the next and subsequent cycles. Further, at this time, since the deceleration is increased by the regeneration, deterioration of drivability can be prevented by setting in advance the regeneration dead zone SOC with which the driver can tolerate the increase of deceleration due to the regeneration of the ISG 105, and performing regeneration within the range of this set amount, as explained in S1808 of FIG. 18 described above.

Further, according to the above configuration, when a request for decreasing the acceleration occurs in the follow-up traveling mode in FIG. 5, the ISG control unit 606 controls the ISG 105 by an ISG operation command quantity 518. That is, the acceleration is decreased by causing the ISG 105 to generate power (regenerate) with the ISG operation command quantity 518<0. This control enables torque assist by the ISG 105, so that the vehicle driving torque 506 can be realized with a target engine torque 517 being the set value of the high-efficiency engine torque. Therefore, acceleration of the request can be realized and drivability can be improved, without deterioration of fuel consumption.

Further, in the vehicle control device of the present embodiment, the base control engine torque calculation unit 802 calculates the high-efficiency engine torque such that the engine 101 is driven in the high-efficiency range during acceleration traveling. The torque-based control unit 607 may control the engine 101 on the basis of the calculated high-efficiency engine torque. Further, the high-efficiency range may be set by the base control engine torque calculation unit 802 with an allowable output torque range based on an optimum fuel economy curve.

According to the above configuration, reduction of fuel consumption can be achieved by driving the engine 101 in a region with high combustion efficiency (high-efficiency range) in the acceleration traveling in the follow-up traveling mode in FIG. 4 or FIG. 5. Furthermore, in a case of driving with the engine torque based on the optimum fuel economy curve, acceleration traveling with optimum fuel consumption can be realized.

Further, in the deceleration traveling, the vehicle control device of the present embodiment may perform control such that the clutch 130 between the own vehicle 100 and the engine 101 is disconnected to allow the own vehicle 100 to travel, on the basis of the clutch engagement request determination value determined by the clutch engagement request determination unit 902.

According to the above configuration, during deceleration traveling in the follow-up traveling mode in FIG. 4 or FIG. 5, the deceleration becomes smaller than that when the clutch 130 is engaged, since the deceleration is only by a traveling resistance. As a result, since it is possible to lengthen the traveling distance and time until switching to acceleration traveling, it is possible to reduce the total number of times of acceleration traveling in a case of repeating the follow-up traveling mode. This can suppress an increase of fuel injection at the time of switching to acceleration traveling, so that fuel consumption can be reduced.

Moreover, the vehicle control device of the present embodiment may have the follow-up traveling control execution determination unit 701 that controls the own vehicle 100 to travel such that, in the traveling mode, an inter-vehicle distance between with the preceding vehicle traveling in front of the own vehicle 100 falls within a set range calculated by the follow-up traveling control region calculation unit 703.

According to the above configuration, in the follow-up traveling mode of FIG. 3, a relative vehicle speed becomes a behavior of a relative vehicle speed 315 during deceleration traveling, and becomes a behavior a relative vehicle speed 316 during acceleration traveling. In the follow-up traveling mode, these behaviors are repeated. When the behavior is viewed in terms of a change in inter-vehicle distance, the behavior corresponds to that the inter-vehicle distance falls between an inter-vehicle distance 317 and an inter-vehicle distance 318. Therefore, since the vehicle 100 can travel within a range in which the driver can tolerate a change of the inter-vehicle distance, deterioration of drivability can be prevented.

In addition, the vehicle control device of the present embodiment may further include the external information recognition sensor 132 that detects external information of the own vehicle 100. The requested acceleration/deceleration torque calculation unit 801 may set the requested acceleration/deceleration on the basis of at least one of: a depression amount of the accelerator pedal 115 detected by the accelerator pedal sensor 116; a depression amount of the brake pedal 117 detected by the brake pedal sensor 118; and external information recognized by the external information recognition device 131 on the basis of a detection signal of the external information recognition sensor 132.

According to the above configuration, in the follow-up traveling mode of FIG. 4 or FIG. 5, since the vehicle 100 can travel at the own vehicle speed 402 or 502 such that the acceleration calculated on the basis of the driver or external information is achieved for the own vehicle speed 401 or 501, drivability can be improved.

Further, in the vehicle control device according to the present embodiment, the fuel injection amount control unit 608 may stop fuel injection to the engine 101 during deceleration traveling.

According to the above configuration, in the follow-up traveling mode of FIG. 4 or FIG. 5, in a case where the vehicle 100 releases the clutch 130 by the clutch engagement command 418 or 504 and performs coasting during the deceleration traveling, since the fuel consumption of the engine 101 becomes 0 in accordance with the traveling distance and time until switching to the acceleration traveling by the fuel injection command 405 or 505, the fuel consumption can be reduced.

Further, in the vehicle control device of the present embodiment, the ISG assist torque calculation unit 803 may set the set range of the SOC of the battery 106 on the basis of the requested acceleration/deceleration calculated by the requested acceleration/deceleration torque calculation unit 801.

According to the above configuration, the SOC of the entire battery 106 is controlled in accordance with the SOC required for outputting the torque, with respect to the assist torque of the ISG 105 required for realizing the requested acceleration/deceleration from the driver or outside. Therefore, since this control allows the SOC of the battery 106 to be secured with a stable value after one cycle of the traveling mode is completed, each electrical component including the ISG 105 can be suitably operated.

Further, in the vehicle control device of the present embodiment, the ISG control unit 606 may inhibit driving of the ISG 105 in a case where the SOC of the battery 106 is equal to or higher than a predetermined value, or the temperature of the battery 106 is equal to or higher than a predetermined value.

According to the above configuration, since it is possible to prevent activation of the ISG 105 with deterioration of the battery 106 being accelerated, deterioration of battery performance can be prevented, and each electrical component including the ISG 105 can be suitably operated.

Further, in the vehicle control device according to the present embodiment, the ISG control unit 606 may be set to rotationally drive the ISG 105 to perform torque assist of the powering torque or the regenerative torque set by the ISG assist torque calculation unit 803, or to drive the ISG 105 to generate power, when a predetermined condition is satisfied. One of the predetermined conditions is a case where a high-efficiency traveling acceleration/deceleration torque of the own vehicle 100 in the traveling mode is different from the requested acceleration/deceleration torque calculated by the requested acceleration/deceleration torque calculation unit 801. Whether the ISG 105 is rotationally driven or driven to generate power is determined by the request mode calculation unit 604 calculating and specifying the request mode.

The ISG assist torque calculation unit 803 sets the powering torque or the regenerative torque on the basis of the request mode.

According to the above configuration, in order to control the vehicle 100 in accordance with an increase or decrease degree of the acceleration/deceleration for the traveling speed on the basis of the driver or external information, it is possible to realize a traveling mode adapted to those such as characteristics of the driver or external changes, and to improve drivability.

Moreover, in the vehicle control device of the present embodiment, in a case where the ISG 105 is rotationally driven so as to perform torque assist of the powering torque or the regenerative torque set by the ISG assist torque calculation unit 803, or is driven to generate power, when it is detected that a remaining charge amount (SOC) of the battery 106 is out of a set range, the ISG assist torque calculation unit 803 adjusts the powering torque or the regenerative torque such that the remaining charge amount (SOC) of the battery 106 falls within the set range, and the ISG control unit 606 controls the ISG 105 on the basis of the adjusted set torque amount. During execution of acceleration traveling, the torque-based control unit 607 controls the engine 101 to output a torque based on the follow-up traveling target engine torque adjusted by the follow-up traveling control target engine torque calculation unit 805, on the basis of the acceleration/deceleration torque correction determination value calculated by the acceleration/deceleration torque correction determination unit 804.

According to the above configuration, in a case where the assist torque increases or decreases due to activation of the ISG 105 in order to an achieve acceleration/deceleration for the traveling speed on the basis of the driver or external information, the engine torque is increased to achieve the requested acceleration/deceleration when the assist torque is insufficient. As a result, deterioration of fuel economy can be minimized while deterioration of drivability is prevented, as compared with a case of coping with only by increasing/decreasing the engine torque.

Second Embodiment

Hereinafter, a second embodiment of the present invention will be described with reference to FIGS. 34 and 35.

FIG. 34 is an example of a traveling behavior in a case where deceleration of a vehicle 100 increases in a follow-up traveling mode. Here, there is shown a behavior in a case where a deceleration increase request occurs in deceleration traveling after a preceding vehicle decelerates. Horizontal and vertical axes in FIG. 34(A) and horizontal and vertical axes in FIG. 34(B) each are similar to those in FIG. 3.

In FIG. 34(A), an own vehicle speed 3401 is an own vehicle speed in a case where no deceleration increase request occurs, and an own vehicle speed 3402 is an own vehicle speed in a case where the deceleration increase request occurs. A preceding vehicle speed 3403, a clutch engagement command 3404, a fuel injection command 3405, a vehicle driving torque 3406, a target engine torque 3407, an ISG operation command quantity 3408, and an SOC 3409 of a battery 106 each are similar to those in FIG. 3. Further, in FIG. 34(B), relative vehicle speeds 3410 and 3411 are set similarly to the relative vehicle speeds 309 and 310 in FIG. 3, respectively.

The preceding vehicle speed 3403 is decelerated at a time 3412 in traveling in the follow-up traveling mode. Thereafter, when a deceleration increase request occurs at a time 3413 in deceleration traveling of the vehicle 100, the vehicle driving torque 3406 can be decreased by decreasing the target engine torque 3407, and the own vehicle speed 3402 can be decelerated further than the own vehicle speed 3401. However, in a case where a clutch 130 is released by turning OFF the clutch engagement command 3404, and the engine stops by turning OFF the fuel injection command 3405, the target engine torque 3407 cannot be decreased. Further, even in a case where the preceding vehicle speed 3403 is not decelerated, the vehicle driving torque 3406 and the target engine torque 3407 behave similarly when the deceleration increase request occurs.

At a time 3414, when a relative vehicle speed becomes the relative vehicle speed 3411, deceleration traveling is switched to acceleration traveling. At a time 3415, a relative vehicle speed becomes the relative vehicle speed 3410, and deceleration traveling is switched to acceleration traveling. At a time 3416, the deceleration increase request occurs similarly to the time 3413, and a scene in which the deceleration cannot be increased repeatedly occurs in response to the subsequent deceleration increase request similarly in the subsequent deceleration traveling, which leads to deterioration of drivability during deceleration traveling.

FIG. 35 is an example of a traveling behavior in a case where deceleration of the vehicle 100 decreases in the follow-up traveling mode. Here, there is shown a behavior in a case where a deceleration decrease request occurs in deceleration traveling after the preceding vehicle decelerates. Horizontal and vertical axes in FIG. 35(A) and horizontal and vertical axes in FIG. 35(B) each are similar to those in FIG. 3.

In FIG. 35(A), an own vehicle speed 3501 is an own vehicle speed in a case where no deceleration decrease request occurs, and an own vehicle speed 3502 is an own vehicle speed in a case where the deceleration decrease request occurs. A preceding vehicle speed 3503, a clutch engagement command 3504, a fuel injection command 3505, a vehicle driving torque 3506, a target engine torque 3507, an ISG operation command quantity 3508, and an SOC 3509 of the battery 106 are similar to those in FIG. 3. Further, in FIG. 35(B), relative vehicle speeds 3510 and 3511 are set similarly to the relative vehicle speeds 309 and 310 in FIG. 3, respectively.

The preceding vehicle speed 3503 is accelerated at a time 3512 in traveling in the follow-up traveling mode. Thereafter, at a time 3513 during acceleration traveling of the vehicle 100, in a case where a relative vehicle speed becomes the relative vehicle speed 3510, acceleration traveling is switched to deceleration traveling, and the deceleration decrease request occurs, then the vehicle driving torque 3506 is increased by increasing the target engine torque 3507, and the own vehicle speed 3502 cannot be decelerated further than the own vehicle speed 3501. However, when the clutch engagement command 3504 is turned OFF to release the clutch 130, the target engine torque 3507 cannot be increased. Further, even in a case where the preceding vehicle speed 3503 is not accelerated, the vehicle driving torque 3506 and the target engine torque 3507 behave similarly when the deceleration decrease request occurs.

At a time 3514, when a relative vehicle speed becomes the relative vehicle speed 3511, deceleration traveling is switched to acceleration traveling. At a time 3515, similarly to the time 3513, a deceleration decrease request occurs in switching from acceleration traveling to deceleration traveling, and a scene in which the deceleration cannot be decreased repeatedly occurs in response to the deceleration decrease request similarly in the subsequent deceleration traveling, which leads to deterioration of drivability during deceleration traveling.

In view of the above problems, in the present embodiment, an object is to provide a vehicle control device capable of achieving a requested acceleration/deceleration and preventing deterioration of fuel consumption when an increase or decrease occurs from the driver or external information for a set acceleration/deceleration in the traveling mode.

In the present embodiment, when the vehicle control device causes an ISG control unit 606 to rotationally drive an ISG 105 or to drive the ISG 105 to generate power during deceleration traveling, the clutch 130 may be engaged on the basis of a determination result of a clutch engagement request by a clutch engagement request determination unit 902.

According to the above configuration, when the deceleration increases in the follow-up traveling mode of FIG. 34, a clutch engagement command 3417 is turned ON to engage the clutch 130 with the fuel injection command 3405 kept OFF, at the time 3413. At this time, a target engine torque 3419 is reduced and a vehicle driving torque 3418 is also reduced by the engine loss torque generated accompanying a mechanical loss and an intake loss of an engine 101, so that the deceleration can be increased. In a case of further increasing the deceleration, the vehicle driving torque 3418 can be further reduced to increase the deceleration by controlling (causing regeneration of) the ISG 105 with an ISG operation command quantity 3420, so that drivability can be improved.

Further, according to the above configuration, when the deceleration decreases in the follow-up traveling mode of FIG. 35, a clutch engagement command 3516 is turned ON to engage the clutch 130 with the combustion injection command 3505 kept OFF, at the time 3513. At this time, a target engine torque 3518 is reduced and a vehicle driving torque 3517 is also reduced by the engine loss torque generated accompanying a mechanical loss and an intake loss of the engine 101, and the deceleration is increased, so that the ISG 105 is controlled (caused to perform powering) by an ISG operation command quantity 3519. This control can reduce the deceleration by controlling a reduction amount of the vehicle driving torque 3517, and improves the drivability.

Third Embodiment

Hereinafter, a third embodiment of the present invention will be described with reference to FIGS. 36 to 38.

FIG. 36 is an example of a traveling behavior in a case where acceleration of a vehicle 100 increases in a follow-up traveling mode. Here, there is shown a behavior in a case where an acceleration increase request occurs in acceleration traveling after the preceding vehicle accelerates. Horizontal axes in FIG. 36(A) indicate time, while vertical axes individually indicate an own vehicle speed 3601, a preceding vehicle speed 3603, a clutch engagement command 3604, a fuel injection command 3605, a vehicle driving torque 3606, a target engine torque 3607, an ISG operation command quantity 3609, and a requested gear ratio 3610. An own vehicle speed 3602 is an own vehicle speed in a case where an acceleration increase request occurs.

Further, in FIG. 36(B), relative vehicle speeds 3611 and 3612 are set similarly to the relative vehicle speeds 309 and 310 in FIG. 3, respectively.

The preceding vehicle speed 3603 is accelerated at a time 3613 in traveling in the follow-up traveling mode. Thereafter, at a time 3614 during deceleration traveling of the vehicle 100, in a case where a relative vehicle speed becomes the relative vehicle speed 3612, deceleration traveling is switched to acceleration traveling, and an acceleration increase request occurs, then the vehicle driving torque 3606 is increased by increasing to a target engine torque 3608 from the target engine torque 3607, which is a high-efficiency engine torque, and adding assist (powering) of an ISG 105 by the ISG operation command quantity 3609 to this, and the own vehicle speed 3602 is accelerated further than the own vehicle speed 3601. Further, even in a case where the preceding vehicle speed 3603 is not accelerated, the vehicle driving torque 3606, the target engine torque 3608, and the ISG operation command quantity 3609 behave similarly when the acceleration increase request occurs.

When a relative vehicle speed becomes the relative vehicle speed 3611 at a time 3615, acceleration traveling is switched to deceleration traveling. At a time 3616, similarly to the time 3614, an acceleration increase request occurs in switching from deceleration traveling to acceleration traveling, and an increase from the target engine torque 3607, which is a high-efficiency engine torque, to the target engine torque 3608 repeatedly occurs in response to the acceleration increase request similarly during subsequent acceleration traveling, which leads to deterioration of the fuel consumption during acceleration traveling.

FIG. 37 is an example of a traveling behavior in a case where acceleration of the vehicle 100 decreases in the follow-up traveling mode. Here, there is shown a behavior in a case where an acceleration decrease request occurs in acceleration traveling after the preceding vehicle accelerates. Horizontal axes in FIG. 37(A) indicate time, while vertical axes individually indicate an own vehicle speed 3701, a preceding vehicle speed 3703, a clutch engagement command 3704, a fuel injection command 3705, a vehicle driving torque 3706, a target engine torque 3707, an ISG operation command quantity 3709, and a requested gear ratio 3710. An own vehicle speed 3702 is an own vehicle speed in a case where an acceleration decrease request occurs. Further, in FIG. 37(B), relative vehicle speeds 3711 and 3712 are set similarly to the relative vehicle speeds 309 and 310 in FIG. 3, respectively.

The preceding vehicle speed 3703 is accelerated at a time 3713 in traveling in the follow-up traveling mode. Thereafter, at a time 3714 during deceleration traveling of the vehicle 100, in a case where a relative vehicle speed becomes the relative vehicle speed 3712, deceleration traveling is switched to acceleration traveling, and an acceleration decrease request occurs, then the vehicle driving torque 3706 is reduced by reducing to a target engine torque 3708 from the target engine torque 3707, which is a high-efficiency engine torque, and adding assist (regeneration) of the ISG 105 by the ISG operation command quantity 3709 to this, and the own vehicle speed 3702 is decelerated further than the own vehicle speed 3701. Further, even in a case where the preceding vehicle speed 3703 is not accelerated, the vehicle driving torque 3706, the target engine torque 3708, and the ISG operation command quantity 3709 behave similarly when the acceleration decrease request occurs.

When a relative vehicle speed becomes the relative vehicle speed 3711 at a time 3715, acceleration traveling is switched to deceleration traveling. At a time 3716, similarly to the time 3714, an acceleration decrease request occurs in switching from deceleration traveling to acceleration traveling, and a decrease to the target engine torque 3708 from the target engine torque 3707, which is a high-efficiency engine torque repeatedly occurs in response to the acceleration decrease request similarly during subsequent acceleration traveling, which leads to the deterioration of the fuel consumption during acceleration traveling.

FIG. 38 is an example of a traveling behavior in a case where deceleration of the vehicle 100 decreases in the follow-up traveling mode. Here, there is shown a behavior in a case where a deceleration decrease request occurs in deceleration traveling after the preceding vehicle accelerates. Horizontal axes in FIG. 38(A) indicate time, while vertical axes individually indicate an own vehicle speed 3801, a preceding vehicle speed 3803, a clutch engagement command 3804, a fuel injection command 3805, a vehicle driving torque 3806, a target engine torque 3807, an ISG operation command quantity 3808, and a requested gear ratio 3809. An own vehicle speed 3802 is an own vehicle speed in a case where a deceleration decrease request occurs.

Further, in FIG. 38(B), relative vehicle speeds 3810 and 3811 are set similarly to the relative vehicle speeds 309 and 310 in FIG. 3, respectively.

The preceding vehicle speed 3803 is accelerated at a time 3812 in traveling in the follow-up traveling mode. Thereafter, at a time 3813 during deceleration traveling of the vehicle 100, in a case where a relative vehicle speed becomes the relative vehicle speed 3810, acceleration traveling is switched to deceleration traveling, and the deceleration decrease request occurs, then the vehicle driving torque 3806 is increased by increasing the target engine torque 3807, so that the own vehicle speed 3802 cannot be decelerated further than the own vehicle speed 3801. Therefore, the deceleration is decreased by controlling a reduction amount of the vehicle driving torque 3806 accompanying a decrease of the target engine torque 3807, which is the engine loss torque generated accompanying a mechanical loss and an intake loss of an engine 101, by engaging a clutch 130 by turning ON the clutch engagement command 3804 with the fuel injection command 3805 kept OFF when the clutch 130 is OFF, and adding assist (powering) of the ISG 105 by the ISG operation command quantity 3808 to this. Further, even in a case where the preceding vehicle speed 3803 is not accelerated, the vehicle driving torque 3806, the target engine torque 3807, and the ISG operation command quantity 3808 behave similarly when the deceleration decrease request occurs.

However, when a deceleration decrease request further occurs for the own vehicle speed 3802 at a time 3013, since the ISG operation command quantity cannot be increased further than the ISG operation command quantity 3808, the assist (powering) of the ISG 105 cannot be increased. Therefore, since the vehicle driving torque 3806 cannot be further increased, the deceleration of the vehicle 100 cannot be decreased, leading to deterioration of drivability.

In view of the above problems, in the present embodiment, an object is to provide a vehicle control device capable of achieving a requested acceleration/deceleration and preventing deterioration of fuel consumption when an increase or decrease occurs from the driver or external information for a set acceleration/deceleration in the traveling mode.

Then, in the vehicle control device of the present embodiment, in a case where, under a set condition, an ISG control unit 606 rotationally drives the ISG 105 to perform torque assist of a powering torque or a regenerative torque set by an ISG assist torque calculation unit 803, or drives the ISG 105 to generate power, the ISG assist torque calculation unit 803 determines whether or not a remaining charge amount (SOC) of a battery 106 becomes out of a set range. When it is detected that the remaining charge amount (SOC) of the battery 106 is out of a set range, the ISG assist torque calculation unit 803 adjusts the powering torque or the regenerative torque such that the remaining charge amount (SOC) of the battery 106 falls within the set range. During execution of acceleration traveling, a requested gear ratio calculation unit 901 controls a transmission 103 to output the adjusted powering torque or regenerative torque, on the basis of an acceleration/deceleration torque correction determination value calculated by an acceleration/deceleration torque correction determination unit 804.

According to the above configuration, when an acceleration increases in the follow-up traveling mode of FIG. 36, deceleration traveling is switched to acceleration traveling, and the requested gear ratio is increased from the requested gear ratio 3610 to a requested gear ratio 3619 during deceleration traveling at a time 3617 before the time 3614 when the acceleration increase request occurs. As a result, the acceleration of the vehicle 100 is increased at the time 3614 when the clutch 130 is engaged due to the ON of the clutch engagement command 3604. Therefore, even when the target engine torque is reduced from the target engine torque 3608 to a target engine torque 3618 in a case where the acceleration increase request occurs, the vehicle driving torque 3606 can be achieved, so that deterioration of fuel economy can be minimized while deterioration of drivability is prevented.

Further, according to the above configuration, when an acceleration decreases in the follow-up traveling mode of FIG. 37, deceleration traveling is switched to acceleration traveling, and the requested gear ratio is reduced from the requested gear ratio 3710 to a requested gear ratio 3719 during deceleration traveling at a time 3717 before the time 3714 when the acceleration decrease request occurs. As a result, the acceleration of the vehicle 100 is decreased at the time 3714 when the clutch 130 is engaged due to the ON of the clutch engagement command 3704. Therefore, even when the target engine torque is increased from the target engine torque 3708 to a target engine torque 3718 in a case where the acceleration decrease request occurs, the vehicle driving torque 3706 can be achieved, so that deterioration of fuel economy can be minimized while deterioration of drivability is prevented.

Further, according to the above configuration, when the deceleration decreases in the follow-up traveling mode of FIG. 38, at the time 3813, a clutch engagement command 3818 is turned OFF, and the requested gear ratio is reduced from the requested gear ratio 3809 to a requested gear ratio 3823. Then, since a target engine torque 3821 increases further than the target engine torque 3807 by turning ON the clutch engagement command 3818 at a time 3814 after decrease, a vehicle driving torque 3820 can be increased further than the vehicle driving torque 3806. This can reduce the deceleration of the vehicle 100 from the own vehicle speed 3802 to an own vehicle speed 3817, so that deterioration of drivability can be prevented. Furthermore, at a time 3816, a relative vehicle speed becomes the relative vehicle speed 3811, and at a time 3815 before switching from deceleration traveling to acceleration traveling, the clutch engagement command 3818 is turned OFF, the requested gear ratio is increased to the requested gear ratio 3823, and the target engine torque 3821 is set to a high-efficiency engine torque to perform acceleration traveling. This can prevent deterioration of fuel consumption during acceleration traveling.

Fourth Embodiment

Hereinafter, a fourth embodiment of the present invention will be described with reference to FIGS. 39 to 42. A vehicle control device according to the present embodiment controls traveling of a vehicle 100 in a constant-speed traveling mode.

An internal configuration of an ECU 110 according to the present embodiment can be obtained by replacing the follow-up traveling control unit 601 with a constant-speed traveling control unit, in FIG. 6 of the first embodiment. In this case, in the internal configuration, the follow-up traveling control determination value is replaced with a constant-speed traveling control determination value, and the follow-up traveling control region is replaced with a constant-speed traveling control region, and the rest is similar to that in the follow-up traveling mode. Further, a traveling behavior of the vehicle 100 in the constant-speed traveling mode is also similar to that in the follow-up traveling mode. While acceleration traveling and deceleration traveling are repeated on the basis of a preceding vehicle speed and an inter-vehicle distance in the follow-up traveling mode, acceleration traveling and deceleration traveling are repeated on the basis of a target vehicle speed described later, in the constant-speed traveling mode.

Figure 39:
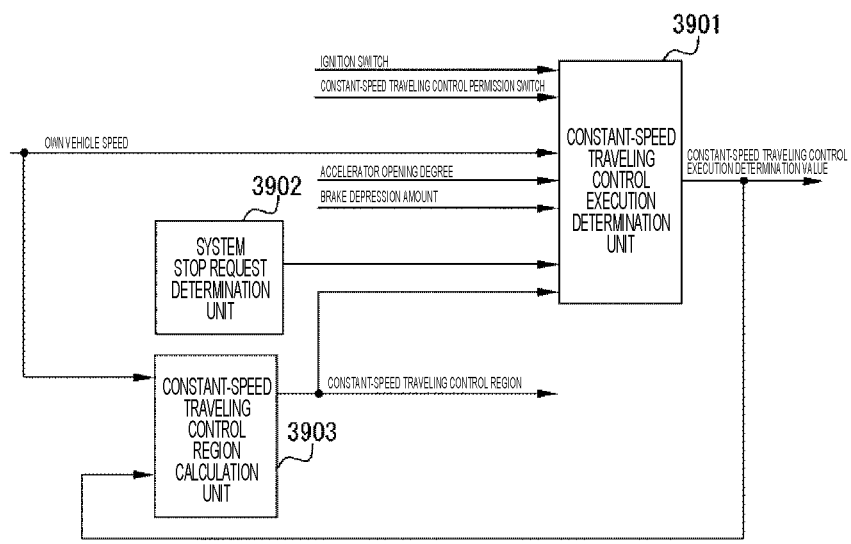
FIG. 39 is a detailed diagram of a constant-speed traveling control unit in place of the follow-up traveling control unit 601.

FIG. 39 is a detailed diagram of the constant-speed traveling control unit in place of the follow-up traveling control unit 601, according to the present embodiment. The constant-speed traveling control unit of the present embodiment includes a constant-speed traveling control execution determination unit 3901, a system stop request determination unit 3902, and a constant-speed traveling control region calculation unit 3903. That is, the follow-up traveling control execution determination unit 701 of the first embodiment is replaced with the constant-speed traveling control execution determination unit 3901, and the follow-up traveling control region calculation unit 703 is replaced with the constant-speed traveling control region calculation unit 3903.

In an input value of the constant-speed traveling control execution determination unit 3901, among the input value of the follow-up traveling control execution determination unit 701 in the first embodiment, the follow-up traveling control permission switch is replaced with a constant-speed traveling control permission switch, and the follow-up control region is replaced with a constant-speed traveling control region, which is a calculation result of the constant-speed traveling control region calculation unit 3903. Other input values are similar to those of the follow-up traveling control execution determination unit 701. Further, an operation of the constant-speed traveling control execution determination unit 3901 is also similar to that of the follow-up traveling control execution determination unit 701, that is, similar to the flowchart of FIG. 10.

The system stop request determination unit 3902 operates similarly to the system stop request determination unit 702.

The constant-speed traveling control region calculation unit 3903 calculates a low speed traveling control region by using an own vehicle speed and a constant-speed traveling control execution determination value. Similarly to the above-described follow-up traveling control region described in FIG. 15, in the constant-speed traveling control region, control is performed in a case of being in either control region 1 or 3, and control is not performed in regions 10 and 20.

Figure 40:
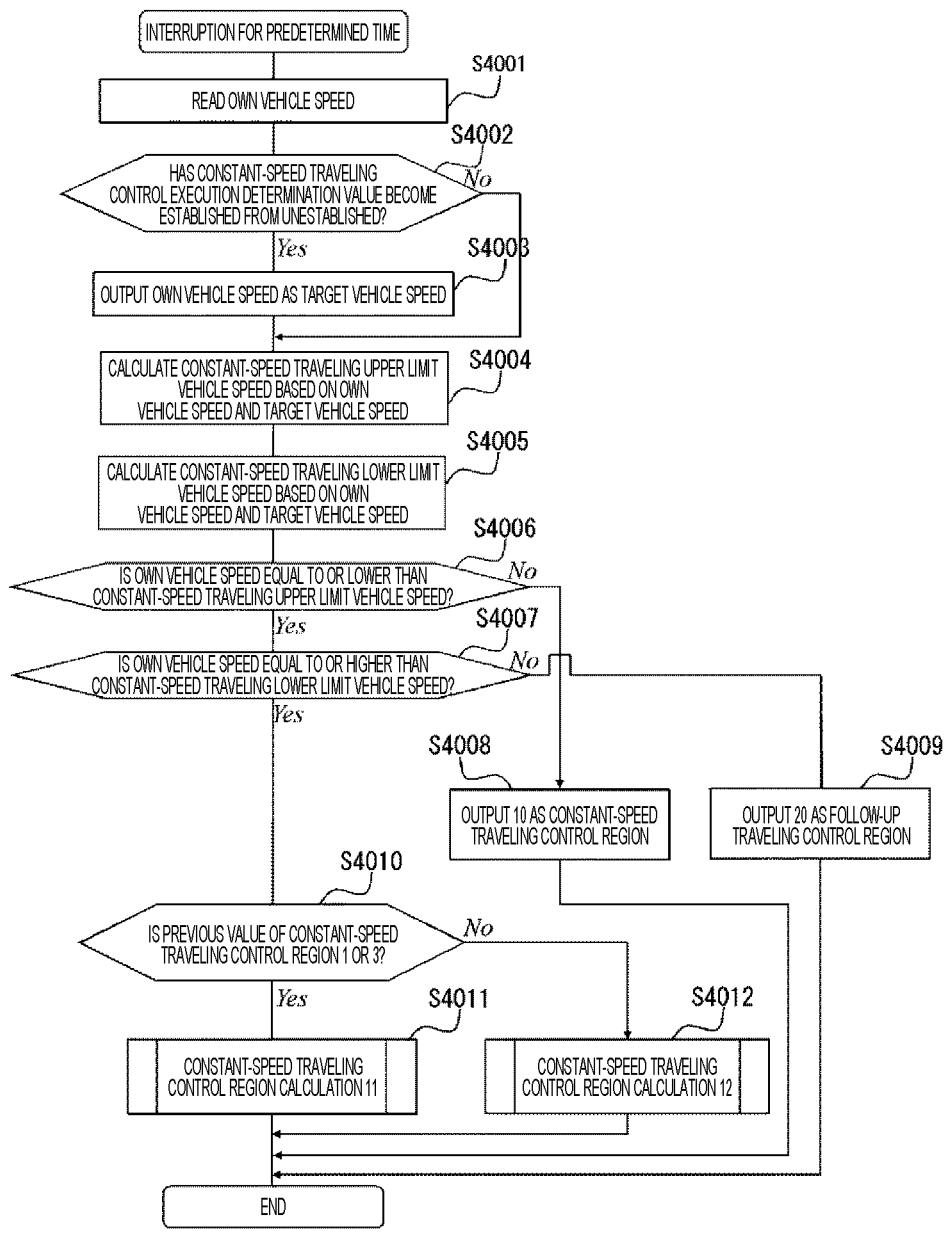
FIG. 40 is a flowchart for explaining an operation of a constant-speed traveling control region calculation unit 3903.

FIG. 40 is a flowchart for explaining an operation of the constant-speed traveling control region calculation unit 3903.

The constant-speed traveling control region calculation unit 3903 executes this flowchart by, for example, interruption processing at predetermined time intervals. Each step of FIG. 40 is described below.

(FIG. 40: Step S4001)

The constant-speed traveling control region calculation unit 3903 reads an own vehicle speed.

(FIG. 40: Step S4002)

The constant-speed traveling control region calculation unit 3903 determines whether or not the constant-speed traveling control execution determination value has become established from unestablished. The process proceeds to step S4003 when the determination is established, otherwise the process skips to step S4004.

(FIG. 40: Step S4003)

The constant-speed traveling control region calculation unit 3903 outputs the own vehicle speed as a target vehicle speed.

(FIG. 40: Steps S4004 and S4005)

In step S4004, the constant-speed traveling control region calculation unit 3903 calculates a constant-speed traveling upper limit vehicle speed by using the own vehicle speed and the target vehicle speed. The constant-speed traveling upper limit vehicle speed may be obtained by describing a value in advance as a map for each set of an own vehicle speed and a target vehicle speed and referring to this map. The constant-speed traveling upper limit vehicle speed is set to such a value that the driver can tolerate a speed change accompanying the vehicle speed increase from the target vehicle speed during the constant-speed traveling control. In step S4005, the constant-speed traveling control region calculation unit 3903 calculates a constant-speed traveling lower limit vehicle speed by using the own vehicle speed and the target vehicle speed. The constant-speed traveling lower limit vehicle speed may be obtained by describing a value in advance as a map for each set of an own vehicle speed and a target vehicle speed and referring to this map. Further, the constant-speed traveling lower limit vehicle speed is set to such a value that the driver can tolerate a speed change accompanying the vehicle speed decrease from the target vehicle speed during the constant-speed traveling control.

(FIG. 40: Step S4006)

The constant-speed traveling control region calculation unit 3903 determines whether or not the own vehicle speed is equal to or lower than the constant-speed traveling upper limit vehicle speed. The process proceeds to step S4007 when the determination is established, otherwise the process proceeds to step S4008.

(FIG. 40: Step S4007)

The constant-speed traveling control region calculation unit 3903 determines whether or not the own vehicle speed is equal to or higher than the constant-speed traveling lower limit vehicle speed. The process proceeds to step S4010 when the determination is established, otherwise the process proceeds to step S4009.

(FIG. 10: Steps S4008 and S4009)

In step S4008, the constant-speed traveling control region calculation unit 3903 outputs 10 as the constant-speed traveling control region. In step S4009, the constant-speed traveling control region calculation unit 3903 outputs 20 as the constant-speed traveling control region.

(FIG. 40: Step S4010)

The constant-speed traveling control region calculation unit 3903 determines whether or not a previous value of the constant-speed traveling control region is 1 or 3. The process proceeds to step S4011 when the determination is established, otherwise the process proceeds to step S4012.

(FIG. 40: Steps S4011 and S4012)

Figure 41:
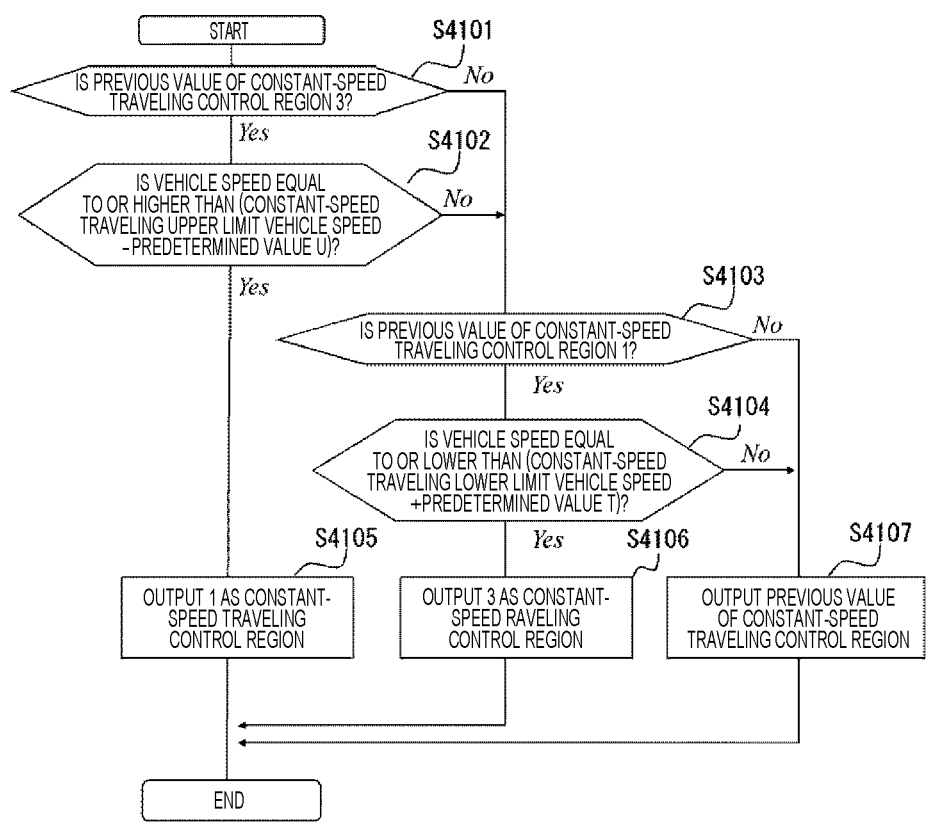
FIG. 41 is a flowchart for explaining details of step S4011.

In step S4011, the constant-speed traveling control region calculation unit 3903 executes the flowchart of FIG. 41. In step S4012, the constant-speed traveling control region calculation unit 3903 executes the flowchart of FIG. 42.

FIG. 41 is a flowchart for explaining details of step S4011. This flowchart is to determine to which region the current transition has been made, in a case where the previous constant-speed traveling control region is either 1 or 3. Each step of FIG. 41 is described below.

(FIG. 41: Step S4101)

The constant-speed traveling control region calculation unit 3903 determines whether or not a previous value of the constant-speed traveling control region is 3. The process proceeds to step S4102 when the determination is established, otherwise the process proceeds to step S4103.

(FIG. 41: Step S4102)

The constant-speed traveling control region calculation unit 3903 determines whether or not the own vehicle speed is equal to or higher than (constant-speed traveling upper limit vehicle speed−predetermined value U). The process proceeds to step 4105 when the determination is established, otherwise the process proceeds to step S4103. The predetermined value U is, for example, such a value that the own vehicle speed becomes equal to or lower than the constant-speed traveling upper limit vehicle speed when acceleration traveling is switched to deceleration traveling during the constant-speed traveling control.

(FIG. 41: Step S4103)

The constant-speed traveling control region calculation unit 3903 determines whether or not a previous value of the constant-speed traveling control region is 1. The process proceeds to step S4104 when the determination is established, otherwise the process proceeds to step S4107.

(FIG. 41: Step S4104)

The constant-speed traveling control region calculation unit 3903 determines whether or not the own vehicle speed is equal to or higher than (constant-speed traveling lower limit vehicle speed+predetermined value T). The process proceeds to step S4106 when the determination is established, otherwise the process proceeds to step S4107. The predetermined value T is, for example, such a value that the own vehicle speed becomes equal to or higher than the constant-speed traveling lower limit vehicle speed when deceleration traveling is switched to acceleration traveling during the constant-speed traveling control.

(FIG. 41: Steps S4105 and S4106)

In step S4105, the constant-speed traveling control region calculation unit 3903 outputs 1 as the constant-speed traveling control region. In step 4106, the constant-speed traveling control region calculation unit 3903 outputs 3 as the constant-speed traveling control region.

(FIG. 41: Step S4107)

In a case where the constant-speed traveling control region cannot be determined by the above procedure, the constant-speed traveling control region calculation unit 3903 outputs the previous value.

Figure 42:
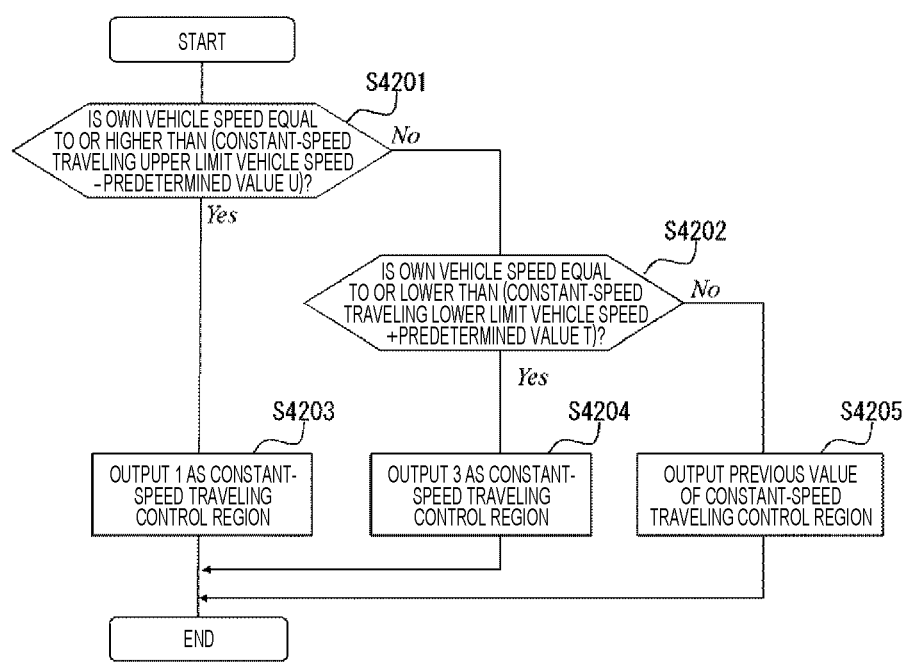
FIG. 42 is a flowchart for explaining details of step S4012.

FIG. 42 is a flowchart for explaining details of step S4012.

This flowchart is to determine to which region the current transition has been made, in a case where the previous constant-speed traveling control region is either 10 or 20. Each step of FIG. 42 is described below.

(FIG. 42: Step S4201)

The constant-speed traveling control region calculation unit 3903 determines whether or not the own vehicle speed is equal to or higher than (constant-speed traveling upper limit vehicle speed−predetermined value U). The process proceeds to step S4203 when the determination is established, otherwise the process proceeds to step S4202. The predetermined value U is to be the same value as in step S4102.

(FIG. 42: Step S4202)

The constant-speed traveling control region calculation unit 3903 determines whether or not the own vehicle speed is equal to or lower than (constant-speed traveling lower limit vehicle speed+predetermined value T). The process proceeds to step S4204 when the determination is established, otherwise the process proceeds to step S4205. The predetermined value T is to be the same value as in step S4104.

(FIG. 42: Steps S4203 and S4204)

In step S4203, the constant-speed traveling control region calculation unit 3903 outputs 1 as the constant-speed traveling control region. In step 4204, the constant-speed traveling control region calculation unit 3903 outputs 3 as the constant-speed traveling control region.

(FIG. 42: Step S4205)

In a case where the constant-speed traveling control region cannot be determined by the above procedure, the constant-speed traveling control region calculation unit 3903 outputs the previous value.

The vehicle control device of the present embodiment includes the constant-speed traveling control execution determination unit 3901 that controls the own vehicle 100 to travel such that the traveling speed of the own vehicle 100 falls within the set range calculated by the constant-speed traveling control region calculation unit 3903 in the traveling mode.

According to the above configuration, in the constant-speed traveling mode, since the vehicle 100 can travel within a range in which the driver can tolerate a speed change accompanying an increase or decrease of the vehicle speed from the target vehicle speed, deterioration of drivability is prevented.

<Modification of the Present Invention>

The present invention is not limited to the above-described embodiments, but also includes various modifications. For example, the embodiments described above have been illustrated in detail to facilitate description for easy understanding of the present invention, and are not necessarily limited to the embodiments that include all the configurations. Additionally, a part of a configuration of an embodiment may be replaced with a configuration of another embodiment, and a configuration of an embodiment may be added with a configuration of another embodiment. Moreover, a part of a configuration of each embodiment may be deleted, replaced, or added with another configuration.

Each of the above-described configurations, functions, processing parts, processing units, and the like may be realized by hardware, for example, by designing part or all of them with an integrated circuit or the like. In addition, each of the above-described configurations, functions, and the like may be realized by software by interpreting and executing a program in which a processor realizes each function. Information such as a program, a table, a file, and the like that realizes each function can be stored in a storage device such as a memory, a hard disk, or a solid state drive (SSD), or in a storage medium such as an IC card, an SD card, or a DVD.

According to an embodiment of the present invention, when an acceleration increase/decrease request occurs from a driver or external information for a set acceleration/deceleration in the traveling mode, the requested acceleration/deceleration can be achieved and deterioration of fuel consumption can be prevented.

REFERENCE SIGNS LIST 100 vehicle
105 ISG
106 battery
110 ECU
601 follow-up traveling control unit
602 SOC-based ISG assist torque calculation unit
603 SOC calculation unit
604 request mode calculation unit
605 transmission command value calculation unit
606 ISG control unit
608 fuel injection amount control unit

The invention claimed is:

1. A vehicle control device for controlling a vehicle comprising a motor generator connected to an engine and a battery connected to the motor generator, the vehicle control device comprising:
   a motor generator controller configured to perform control for rotationally driving the motor generator by supplying power from the battery to the motor generator, or for driving the motor generator to generate power in order to charge the battery, wherein
   in one cycle of a traveling mode until completion of deceleration traveling after acceleration traveling is started to achieve a target vehicle speed, the motor generator controller is configured to drive the motor generator to allow a remaining charge amount of the battery to fall within a set range at completion of the deceleration traveling, and allow a traveling acceleration/deceleration in the one cycle to fall within a requested acceleration/deceleration that is predetermined,
   wherein the motor generator controller is configured to:
      set a required acceleration/deceleration based on (i) the amount of increase/decrease of the battery scheduled to increase/decrease in the acceleration traveling in one cycle and the next deceleration traveling which has not been carried out, and (ii) a difference between the charge amount of the battery and a target value within the set range, and determine a charge amount of increase/decrease of the battery in the one cycle; and
drive the motor generator according to the determined charge amount of increase/decrease of the battery, such that the remaining charge of the battery falls within the set range when the deceleration traveling is completed.

2. The vehicle control device according to claim 1, further comprising:
an engine controller configured to control the engine to allow the engine to be driven within a set high-efficiency range in the acceleration traveling.

3. The vehicle control device according to claim 1, further comprising:
a power transmission mechanism controller configured to cut connection between the engine and a wheel by a power transmission mechanism that transmits power of the engine to the wheel, in the deceleration traveling.

4. The vehicle control device according to claim 1, further comprising:
a controller configured to control the vehicle to travel to allow an inter-vehicle distance between the vehicle and a preceding vehicle traveling in front of the vehicle to fall within a set range in the traveling mode.

5. The vehicle control device according to claim 1, further comprising:
a controller configured to control the vehicle to travel to allow a traveling speed of the vehicle to fall within a set range in the traveling mode.

6. The vehicle control device according to claim 1, further comprising:
an external information detects detector configured to detect external information of the vehicle, wherein
the requested acceleration/deceleration is set based on at least one of a depression amount of an accelerator pedal, a depression amount of a brake pedal, or external information detected by the external information detector.

7. The vehicle control device according to claim 1, wherein
a set range of a remaining charge amount of the battery is set based on the requested acceleration/deceleration.

8. The vehicle control device according to claim 1, wherein
the motor generator controller is configured to inhibit driving of the motor generator when a remaining charge amount of the battery is equal to or higher than a predetermined value or when a temperature of the battery is equal to or higher than a predetermined value.

9. The vehicle control device according to claim 1, wherein
the motor generator controller is configured to perform control for rotationally driving the motor generator to perform torque assist of a torque amount determined based on a difference between a torque for a traveling acceleration/deceleration in the set high-efficiency range and a torque for the requested acceleration/deceleration, or for driving the motor generator to generate power.

10. The vehicle control device according to claim 1, wherein
in a case where a remaining charge amount of the battery is out of a set range by rotationally driving the motor generator to perform torque assist of a set torque amount under a predetermined condition, or driving the motor generator to generate power, the motor generator controller is configured to adjust the set torque amount to allow a remaining charge amount of the battery to fall within a set range, and to perform control based on an adjusted set torque amount, and
a transmission is controlled to output a difference torque by adjustment in the motor generator controller.

11. A vehicle control device for controlling a vehicle comprising a motor generator connected to an engine and a battery connected to the motor generator, the vehicle control device comprising:
an engine controller configured to control the engine;
a power transmission mechanism controller configured to control a power transmission mechanism that transmits power of the engine to a wheel; and
a motor generator controller configured to perform control for rotationally driving the motor generator by supplying power from the battery to the motor generator, or for driving the motor generator to generate power in order to charge the battery, wherein
in one cycle of a traveling mode until completion of deceleration traveling after acceleration traveling is started to achieve a target vehicle speed,
the engine controller is configured to control the engine to allow the engine to be driven within a set high-efficiency range during execution of the acceleration traveling,
the power transmission mechanism controller is configured to cut connection between the engine and the wheel by the power transmission mechanism during execution of the deceleration traveling, and
the motor generator controller is configured to drive the motor generator to allow a remaining charge amount of the battery to fall within a set range at completion of the deceleration traveling, and allow a traveling acceleration/deceleration in the one cycle to fall within a requested acceleration/deceleration that is predetermined,
wherein the motor generator controller is configured to:
set a required acceleration/deceleration based on (i) the amount of increase/decrease of the battery scheduled to increase/decrease in the acceleration traveling in one cycle and the next deceleration traveling which has not been carried out, and (ii) a difference between the charge amount of the battery and a target value within the set range, and
determine a charge amount of increase/decrease of the battery in the one cycle; and
drive the motor generator according to the determined charge amount of increase/decrease of the battery, such that the remaining charge of the battery falls within the set range when the deceleration traveling is completed.

12. The vehicle control device according to claim 11, wherein the set high-efficiency range is set by an allowable output torque range based on an optimum fuel economy curve.

13. The vehicle control device according to claim 11, wherein
the engine controller is configured to stop fuel injection to the engine during the deceleration traveling.

14. The vehicle control device according to claim 11, wherein
in a case where the motor generator is rotationally driven or is driven to generate power by control of the motor generator controller during the deceleration traveling, the power transmission mechanism controller controls the power transmission mechanism to engage the engine and the wheel.

15. The vehicle control device according to claim 11, wherein
- in a case where a remaining charge amount of the battery is out of a set range by rotationally driving the motor generator to perform torque assist of a set torque amount under a predetermined condition, or driving the motor generator to generate power, the motor generator controller is configured to adjust the set torque amount to allow a remaining charge amount of the battery to fall within a set range, and to perform control based on an adjusted set torque amount, and
- the engine controller is configured to control the engine to increase an output torque of the engine to output a difference torque by adjustment in the motor generator controller.

* * * * *